United States Patent
Shundo et al.

(10) Patent No.: US 7,381,350 B2
(45) Date of Patent: Jun. 3, 2008

(54) FLUORENE DERIVATIVES AND POLYMERS THEREOF

(75) Inventors: Ryushi Shundo, Chiba (JP); Tomohiro Etou, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 382 days.

(21) Appl. No.: 11/176,328

(22) Filed: Jul. 8, 2005

(65) Prior Publication Data

US 2006/0006364 A1   Jan. 12, 2006

(30) Foreign Application Priority Data

Jul. 8, 2004   (JP)   ............................. 2004-201562

(51) Int. Cl.
    C09K 19/34   (2006.01)
    C09K 19/38   (2006.01)
    C09K 19/32   (2006.01)
    C07D 303/02  (2006.01)
    C07D 305/02  (2006.01)
    C07C 23/08   (2006.01)
    C08G 65/04   (2006.01)

(52) U.S. Cl. ................. 252/299.01; 549/510; 549/512; 528/421; 570/187; 252/299.61; 252/299.62; 252/299.67

(58) Field of Classification Search ................. 428/1.1, 428/413; 252/299.01, 299.61, 299.62, 299.63, 252/299.67; 549/510, 512; 570/187; 528/421
See application file for complete search history.

(56) References Cited

U.S. PATENT DOCUMENTS 6,824,709 B2 * 11/2004 Shundo ................. 252/299.62

7,101,595 B2 * 9/2006 Shundo et al. ............... 428/1.1
2005/0031801 A1   2/2005 Shundo et al. ............... 428/1.1

FOREIGN PATENT DOCUMENTS

JP   2001-055573   2/2001
JP   2001-154019   6/2001

* cited by examiner

*Primary Examiner*—Shean C Wu
(74) *Attorney, Agent, or Firm*—Hogan & Hartson LLP

(57) ABSTRACT

The compound (1) or (2), a composition containing the compound and a polymer obtained by polymerizing the composition.

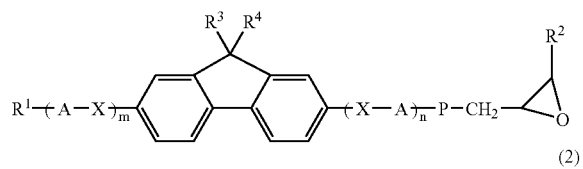

(1)

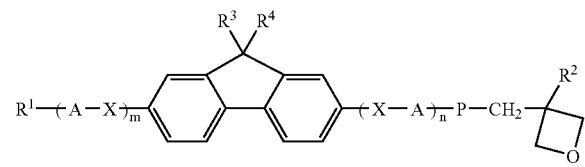

(2)

$R^1$ is fluorine, cyano, alkyl, and so forth; $R^2$ is hydrogen, alkyl, and so forth; $R^3$ and $R^4$ are independently hydrogen, fluorine, alkyl, and so forth; A is 1,4-cyclohexylene, 1,4-phenylene, and so forth; X is a single bond, —COO—, —OCO—, and so forth; P is alkylene and so forth; m and n are independently 0, 1 or 2.

27 Claims, No Drawings

FLUORENE DERIVATIVES AND POLYMERS THEREOF

BACKGROUND OF THE INVENTION

1. Field of the Invention

The present invention relates to a fluorene derivative having an oxirane ring or an oxetane ring, a polymer obtained from the derivative and uses thereof

2. Related Art

It is known that when a polymerizable compound is liquid crystals, a polymer having an optical anisotropy is obtained by polymerizing the compound. See JP 2001-055573 A/2001. This is because orientation of molecules in the liquid crystals is fixed by polymerization. The examples of such compound are liquid crystal compounds having an acryloyloxy group. See JP 2001-154019 A/2001. Further desired is a liquid crystal compound having characteristics such that it is polymerized at room temperature, that it is are polymerized even in the air, and that it is readily polymerized by irradiation with UV rays. See JP 2005-60373 A/2005 (US 2005/0031801 A).

SUMMARY OF THE INVENTION

The present invention includes at least one compound represented by formulae (1) and (2), a composition containing these compounds and polymers obtained by polymerizing these compounds and/or compositions.

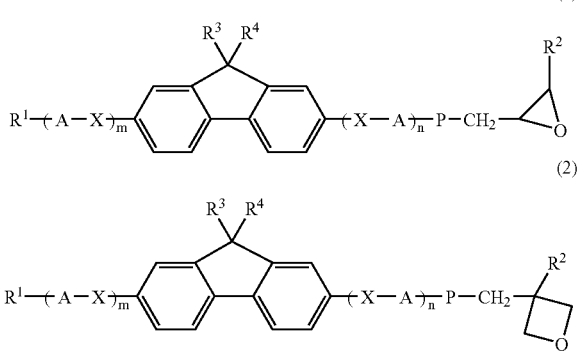

In formulae (1) and (2), $R^1$ is hydrogen, fluorine, chlorine, cyano, nitro, or alkyl having 1 to 20 carbons; any hydrogen in this alkyl may be replaced by fluorine or chlorine, and any one or two —$CH_2$— may be replaced by —O—, —S—, —COO—, —OCO—, —CO—, —CH=CH—, or —C≡C—; $R^2$ is hydrogen or alkyl having of 1 to 8 carbons, and any hydrogen may in this alkyl be replaced by fluorine or chlorine; $R^3$ and $R^4$ are independently hydrogen, fluorine, chlorine, or alkyl having 1 to 10 carbons, any hydrogen in this alkyl may be replaced by fluorine or chlorine, and any one or two —$CH_2$— in this alkyl may be replaced by —O—, —S—, —COO—, —OCO—, —CO—, —CH=CH—, or —C≡C—; A is 1,4-cyclohexylene, 1,4-phenylene, pyridine-2,5-diyl, pyridazine-3,6-diyl, pyrimidine-2,5-diyl, naphthalene-2,6-diyl, or tetrahydronaphthalene-2,6-diyl; any hydrogen in this 1,4-phenylene may be replaced by fluorine or chlorine, and any one or two hydrogen in this 1,4-phenylene may be replaced by cyano, methyl, ethyl, methoxy, hydroxy, formyl, acetoxy, acetyl, trifluoroacetyl, difluoromethyl, or trifluoromethyl; X is a single bond, —$(CH_2)_2$—, —CH=CH—, —C≡C—, —$CH_2$O—, —$OCH_2$—, —$CF_2$O—, —$OCF_2$—, —COO—, —OCO—, —CONH—, —NHCO—, —$(CH_2)_4$—, —$(CH_2)_2COO$—, —$OCO(CH_2)_2$—, —CH=CH—COO—, or —OCO—CH=CH—; P is —O— or alkylene having 1 to 20 carbons, any hydrogen in this alkylene may be replaced by fluorine or chlorine, any —$CH_2$— in this alkylene may be replaced by —O—, any one or two —$CH_2$— in this alkylene may be replaced by —COO— or —OCO—, and any one —$CH_2$— in this alkylene may be replaced by —$CH_2$—, —CH=CH— or —C≡C—; and m and n are independently 0, 1 or 2, and the sum of m and n is 1, 2, 3, or 4.

DETAILED DESCRIPTION

In the present specification, terms are used in the following manners. A liquid crystal compound is a general term of compounds having a liquid crystal phase and compounds which do not have a liquid crystal phase but are useful as components for liquid crystal compositions. A liquid crystal phase includes a nematic phase, a smectic phase and a cholesteric phase, and it means a nematic phase in many cases. Polymerizability means ability in which monomers are polymerized by means such as light, heat and catalysts to provide polymers. Compounds represented by formula (1), formula (M1), and so forth shall be exhibited by the compound (1), the compound (M1), and so forth, respectively. A polymer obtained from a composition containing the compound (1) shall be exhibited by the polymer (1). The polymer obtained from a composition containing the compound (2) shall be exhibited by the polymer (2). Percentage by weight (wt %) of a polymerizable compound is the ratio based on the total weight of polymerizable compounds contained in a composition. Percentage by weight (wt %) of an additive is the ratio based on the total weight of polymerizable compounds.

In formulae (1) and (2), the code of $R^1$ was used. The meanings of two codes $R^1$ may be the same or different. For example, there is a case in which $R^1$ in formulae (1) and (2) is methyl, and there is a case in which $R^1$ in Formula (1) is methyl and $R^1$ in formula (2) is ethyl. In formula (1), the codes of A, X, and so forth were used. In -(A-X)$_m$— and -(A-X)$_n$— in formula (1), the meanings of two codes A may be the same or different. The -(A-X)$_m$— in formula (1) means -A-X-A-X— when m is 2. In this case, the meanings of two codes A may be the same or different. Such rule shall be applied to the meaning of the code X. The above rule shall be applied to the meanings of the other codes.

An advantage of the present invention is to provide a liquid crystal compound which satisfies at least two characteristics out of the characteristics that it is polymerized at room temperature; it is polymerized even in the air; it is liable to be polymerized; it has a broad temperature range of a liquid crystal phase; it is chemically stable; it is colorless; it is liable to be dissolved in solvents; it has a good miscibility with other polymerizable compounds; and it has a small adhesion tension to a supporting substrate. One aspect of the invention is to provide a compound having suitable balance in the at least two characteristics. A further aspect is to provide a polymer obtained from the above liquid crystal compound.

A further aspect is to provide a polymer which satisfies at least two characteristics out of the characteristics such that it has an optical anisotropy; it is less liable to peel off from a supporting substrate; it has a satisfactory hardness; it is colorless and transparent; it has a large heat resistance; it has a large weatherability; and it has a small photoelasticity.

The present invention includes 1) a polymer having an optical anisotropy that is obtained by polymerizing a polymerizable liquid crystal compound and 2) a monomer having an oxirane ring or an oxetane ring that is readily subjected to ring-opening polymerization and 3) combinations of item 1) and item 2).

Thus, the invention provides:

1. A compound represented by formulae (1) or (2):

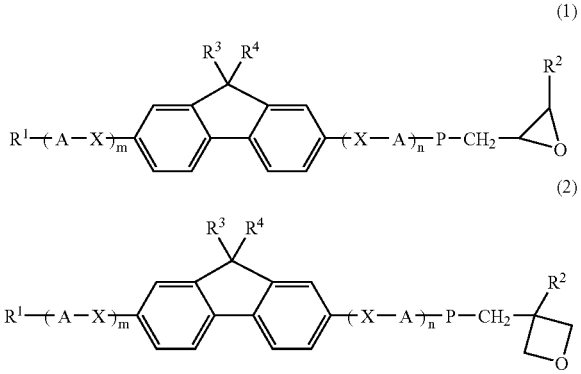

wherein $R^1$ is hydrogen, fluorine, chlorine, cyano (—CN), nitro (—NO$_2$), or alkyl having 1 to 20 carbons, any hydrogen in this alkyl may be replaced by fluorine or chlorine, and any one or two —CH$_2$— in this alkyl may be replaced by —O—, —S—, —COO—, —OCO—, —CO—, —CH═CH—, or —C≡C—.

In the above alkyl, hydrogen may be replaced by fluorine and so forth, and —CH$_2$— may be replaced by —O— and so forth simultaneously. That is, $R^1$ includes alkyl in which hydrogen is replaced by fluorine and so forth and in which —CH$_2$— is replaced by —O— and so forth. The meaning of the term "any one or two —CH$_2$— in the alkyl may be replaced by —O—, —CH═CH—, and so forth" shall be shown by one example. The examples of a group in which any one or two —CH$_2$— in butyl (C$_4$H$_9$—) are replaced by —O— or —CH═CH— are C$_3$H$_7$O—, CH$_3$—O—(CH$_2$)$_2$—, CH$_3$—O—CH$_2$—O—, H$_2$C═CH—(CH$_2$)$_3$—, CH$_3$—CH═CH—(CH$_2$)$_2$—, CH$_3$—CH═CH—CH$_2$—O—, and so forth. Thus, "any" means randomly selected. When any two —CH$_2$— are replaced by —O—, CH$_3$—O—CH$_2$—O— in which oxygen is not adjacent is preferred more than CH$_3$—O—O—CH$_2$— in which oxygen is adjacent considering the stability of the compound. The expression of "may be replaced" has the same meaning as well in the other cases.

Preferred $R^1$ is hydrogen, fluorine, chlorine, cyano (—CN), nitro (—NO$_2$), trifluoromethoxy (—OCF$_3$), difluoromethoxy (—OCF$_2$H), fluoromethoxy (—OCFH$_2$), tetrafluoroethyl (—CF$_2$CF$_2$H), hexafluoropropyl (—CF$_2$CHFCF$_3$), alkyl having 1 to 15 carbons, alkoxy having 1 to 15 carbons, or alkoxyalkyl having 2 to 15 carbons. More preferred $R^1$ is fluorine, chlorine, cyano, trifluoromethoxy, difluoromethoxy, fluoromethoxy, tetrafluoroethyl, hexafluoropropyl, alkyl having 1 to 15 carbons, alkoxy having 1 to 15 carbons, or alkoxyalkyl having a 2 to 15 carbons. A particularly preferred $R^1$ is alkyl having 1 to 15 carbons.

$R^2$ is hydrogen or alkyl having 1 to 8 carbons, in which any hydrogen in this alkyl may be replaced by fluorine or chlorine. Preferred $R^2$ is hydrogen or alkyl having 1 to 5 carbons. More preferred $R^2$ is hydrogen or alkyl having 1 to 4 carbons. Particularly preferred $R^2$ is hydrogen, methyl or ethyl. $R^3$ and $R^4$ are independently hydrogen, fluorine, chlorine, or alkyl having 1 to 10 carbons, any hydrogen in this alkyl may be replaced by fluorine or chlorine, and any one or two —CH$_2$— in this alkyl may be replaced by —O—, —S—, —COO—, —OCO—, —CO—, —CH═CH—, or —C≡C—. Preferred $R^3$ and $R^4$ are independently hydrogen, fluorine, chlorine or alkyl having 1 to 8 carbons. More preferred $R^3$ and $R^4$ are independently hydrogen, fluorine, chlorine, or alkyl having 1 to 6 carbons. Particularly preferred $R^3$ and $R^4$ are independently hydrogen, methyl or ethyl. Preferred combinations of $R^3$ and $R^4$ are hydrogen and hydrogen, hydrogen and fluorine, fluorine and fluorine, hydrogen and chlorine, hydrogen and methyl, hydrogen and ethyl, methyl and methyl, methyl and ethyl, or ethyl and ethyl. More preferred combinations of $R^3$ and $R^4$ are hydrogen and hydrogen, hydrogen and methyl, hydrogen and ethyl, methyl and methyl, methyl and ethyl, or ethyl and ethyl. Particularly preferred combinations of $R^3$ and $R^4$ are hydrogen and hydrogen, hydrogen and methyl, or methyl and methyl.

A is 1,4-cyclohexylene, 1,4-phenylene, pyridine-2,5-diyl, pyridazine-3,6-diyl, pyrimidine-2,5-diyl, naphthalene-2,6-diyl, or tetrahydronaphthalene-2,6-diyl, any hydrogen in this 1,4-phenylene may be replaced by fluorine or chlorine, and any one or two hydrogen in this 1,4-phenylene may be replaced by cyano (—CN), methyl (—CH$_3$), ethyl (—CH$_2$CH$_3$), methoxy (—OCH$_3$), hydroxy (—OH), formyl (—CHO), acetoxy (—OCOCH$_3$), acetyl (—COCH$_3$), trifluoroacetyl (—COCF$_3$), difluoromethyl (—CF$_2$H), or trifluoromethyl (—CF$_3$). Preferred A is 1,4-cyclohexylene, 1,4-phenylene or pyridine-2,5-diyl. In this 1,4-phenylene, any hydrogen may be replaced by fluorine, and any one hydrogen may be replaced by methyl, ethyl, methoxy, acetoxy, or acetyl. When A is 1,4-cyclohexylene, the preferred configuration thereof is trans rather than cis. More preferred A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, 2,3,5,6-tetrafluoro-1,4-phenylene, 2-methyl-1,4-phenylene, or 2-methoxy-1,4-phenylene. Particularly preferred A is 1,4-cyclohexylene, 1,4-phenylene, 2-fluoro-1,4-phenylene, 2,3-difluoro-1,4-phenylene, 2,5-difluoro-1,4-phenylene, or 2,6-difluoro-1,4-phenylene. A most preferred A is 1,4-cyclohexylene.

X is a single bond, —(CH$_2$)$_2$—, —CH═CH—, —C≡C—, —CH$_2$O—, —OCH$_2$—, —CF$_2$O—, —OCF$_2$—, —COO—, —OCO—, —CONH—, —NHCO—, —(CH$_2$)$_4$—, —(CH$_2$)$_2$COO—, —OCO(CH$_2$)$_2$—, —CH═CH—COO—, or —OCO—CH═CH—. Preferred X is a single bond, —(CH$_2$)$_2$—, —CH═CH—, —C≡C—, —CH$_2$O—, —OCH$_2$—, —CF$_2$O—, —OCF$_2$—, —COO—, —OCO—, or —(CH$_2$)$_4$—. More preferred X is a single bond, —C≡C—, —COO—, or —OCO—. Particularly preferred X is —COO— or —OCO—.

P is —O— or alkylene having 1 to 20 carbons, any hydrogen in this alkylene may be replaced by fluorine or chlorine, any —CH$_2$— in this alkylene may be replaced by —O—, any one or two —CH$_2$— in this alkylene may be replaced by —COO— or —OCO—, and any one —CH$_2$— in this alkylene may be replaced by —CH═CH— or —C≡C—. A preferred P is —O— or alkylene having 1 to 12 carbons, any —CH$_2$— in this alkylene may be replaced by —O—, and any one —CH$_2$— in this alkylene may be replaced by —COO— or —OCO—. More preferred P is —O—, —(CH$_2$)$_d$—, —O—(CH$_2$)$_d$—, —(CH$_2$)$_d$—O—, —O—(CH$_2$)$_d$—O—, or —O—(CH$_2$CH$_2$O)$_s$—, wherein d is an integer of 1 to 10, and s is an integer of 2 to 5. Among these, —O—, —O—(CH$_2$)$_d$—, —O—(CH$_2$)$_d$—O—, and —O—(CH$_2$CH$_2$O)$_s$— are preferable to —(CH$_2$)$_d$— and —(CH$_2$)$_d$—O—. When P is —O—(CH$_2$)$_d$—, this code shows that —O— is bonded to the side of -A- and not to the side of CH$_2$—. An example thereof shall be shown by the compound (3a) which shall be described later. In the compound (1) having oxirane ring, particularly preferred P is —O—(CH$_2$)$_d$— and —O—(CH$_2$)$_d$—O—, wherein d is an integer of 2 to 10. In the compound (2) having oxetane ring, a particularly preferred P is —O—(CH$_2$)$_d$—O—, wherein d is an integer of 2 to 10.

The terms m and n are independently 0, 1 or 2, and the sum of m and n is 1, 2, 3, or 4. The preferred sum of m and n is 1 or 2. A more preferred sum of m and n is 2.

2. The compound according to item 1, wherein in formulae (1) or (2), R$^1$ is hydrogen, fluorine, chlorine, cyano, nitro, trifluoromethoxy, difluoromethoxy, fluoromethoxy, tetrafluoroethyl, hexafluoropropyl, alkyl having 1 to 15 carbons, alkoxy having 1 to 15 carbons, or alkoxyalkyl having 2 to 15 carbons; R$^2$ is hydrogen or alkyl having 1 to 5 carbons; R$^3$ and R$^4$ are independently hydrogen, fluorine, chlorine, or alkyl having 1 to 8 carbons; A is 1,4-cyclohexylene, 1,4-phenylene or pyridine-2,5-diyl, any hydrogen in this 1,4-phenylene may be replaced by fluorine, and any one hydrogen in this 1,4-phenylene may be replaced by methyl, ethyl, methoxy, acetoxy, or acetyl; X is a single bond, —(CH$_2$)$_2$—, —CH=CH—, —CH$_2$O—, —OCH$_2$—, —CF$_2$O—, —OCF$_2$—, —COO—, —OCO—, or —(CH$_2$)$_4$—; P is alkylene having 1 to 10 carbons, any —CH$_2$— in this alkylene may be replaced by —O—, and any one —CH$_2$— in this alkylene may be replaced by —COO— or —OCO—; and m and n are independently 0, 1 or 2; and the sum of m and n is 1, 2 or 3.

3. The compound according to item 1 or 2, wherein in formulae (1) or (2), P is —O—, —(CH$_2$)$_d$—, —O—(CH$_2$)$_d$—, —(CH$_2$)$_d$—O—, —O—(CH$_2$)$_d$—O—, —COO—(CH$_2$)$_d$—O—, —OCO—(CH$_2$)$_d$—O—, or —O—(CH$_2$CH$_2$O)$_s$—, d is an integer of 2 to 10, and s is an integer of 2 to 5; and m and n are independently 0, 1 or 2, and the sum of m and n is 1 or 2.

4. Any one compound represented by formulae (3) to (8):

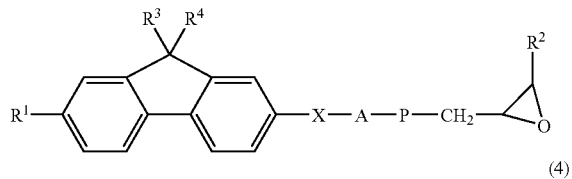

(3)

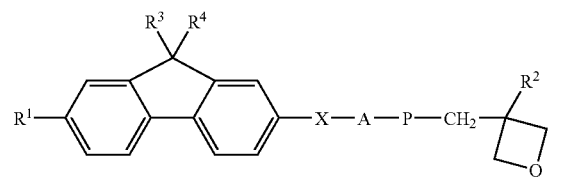

(4)

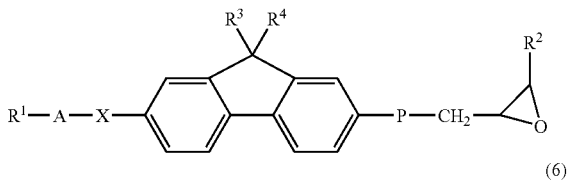

(5)

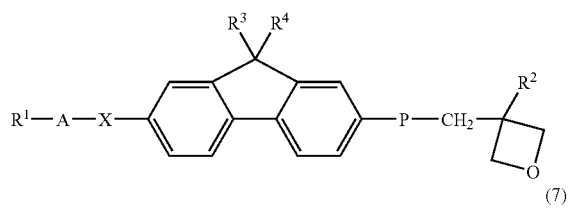

(6)

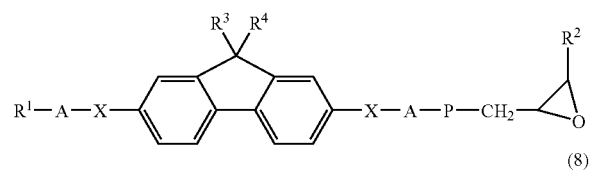

(7)

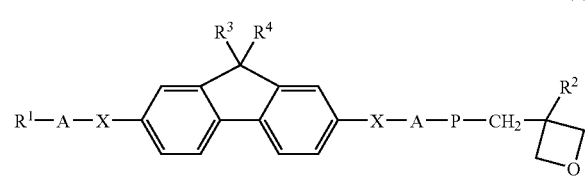

(8)

In formulae (3)-(8) described above, R$^1$ is fluorine, chlorine, cyano, trifluoromethoxy, difluoromethoxy, fluoromethoxy, tetrafluoroethyl, hexafluoropropyl, alkyl having 1 to 15 carbons, alkoxy having 1 to 15 carbons, or alkoxyalkyl having 2 to 15 carbons; R$^2$ is hydrogen or alkyl having 1 to 4 carbons; R$^3$ and R$^4$ are independently hydrogen, fluorine, chlorine, or alkyl having 1 to 4 carbons; A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, or 2,3,5,6-tetrafluoro-1,4-phenylene; X is a single bond, —C≡C—, —COO— or —OCO—; P is —O—, —O—(CH$_2$)$_d$—, —O—(CH$_2$)$_d$—O—, or —O—(CH$_2$CH$_2$O)$_s$—; d is an integer of 1 to 15, and s is an integer of 2 to 5.

5. The compound according to item 4, wherein in formulae (3) to (8), R$^1$ is cyano, trifluoromethoxy, alkyl having 1 to 13 carbons, alkoxy having 1 to 13 carbons, or alkoxyalkyl having 2 to 13 carbons; R$^2$ is hydrogen, methyl or ethyl; the combination of R$^3$ and R$^4$ is hydrogen and hydrogen, hydrogen and fluorine, fluorine and hydrogen, hydrogen and chlorine, hydrogen and methyl, hydrogen and ethyl, methyl and methyl, methyl and ethyl, or ethyl and ethyl; A is 1,4-cyclohexylene, 1,4-phenylene, 2-fluoro-1,4-phenylene, 2,3-difluoro-1,4-phenylene, 2,5-difluoro-1,4-phenylene, or 2,6-difluoro-1,4-phenylene; X is a single bond, —COO— or —OCO—; P is —O—, —O—(CH$_2$)$_d$—, —O—(CH$_2$)$_d$—O—, or —O—(CH$_2$CH$_2$O)$_s$—; d is an integer of 1 to 10, and s is an integer of 2 to 5.

6. The compound represented by formulae (3), (5) or (8) according to item 4 or 5, wherein R$^1$ is alkyl having 1 to 10 carbons; R$^2$ is hydrogen; the combination of R$^3$ and R$^4$ is hydrogen and hydrogen, hydrogen and methyl, hydrogen and ethyl, methyl and methyl, methyl and ethyl, or ethyl and ethyl; A is 1,4-phenylene; X is —COO— or —OCO—; P is —O—, —O—(CH$_2$)$_d$—, or —O—(CH$_2$)$_d$—O—; and d is an integer of 2 to 10.

7. The compound represented by formulae (3), (5) or (8) according to item 4, 5 or 6, wherein P is —O—(CH$_2$)$_d$— or —O—(CH$_2$)$_d$—O—, and d is an integer of 2 to 10.

8. The compound represented by formulae (3), (5) or (8) according to any one of items 4 to 7, wherein the combination of R$^3$ and R$^4$ is hydrogen and hydrogen, hydrogen and methyl, or methyl and methyl.

9. The compound represented by formulae (4), (6) or (8) according to item 4 or 5, wherein R$^1$ is alkyl having 1 to 10 carbons; R$^2$ is methyl or ethyl; the combination of R$^3$ and R$^4$ is hydrogen and hydrogen, hydrogen and methyl, hydrogen and ethyl, methyl and methyl, methyl and ethyl, or ethyl and ethyl; A is 1,4-phenylene; X is —COO— or —OCO—; P is —O—, —O—(CH$_2$)$_d$— or —O—(CH$_2$)$_d$—O—; and r is an integer of 2 to 10.

10. The compound represented by formulae (4), (6) and (8) according to item 4, 5 or 9, wherein P is —O—(CH$_2$)$_d$— or —O—(CH$_2$)$_d$—O—, and d is an integer of 2 to 10.

11. The compound represented by formulae (4), (6) and (8) according to any one of items 4, 5, 9, and 10, wherein the combination of R$^3$ and R$^4$ is hydrogen and hydrogen, hydrogen and methyl, or methyl and methyl.

12. Any one compound represented by formulae (1A) to (2F):

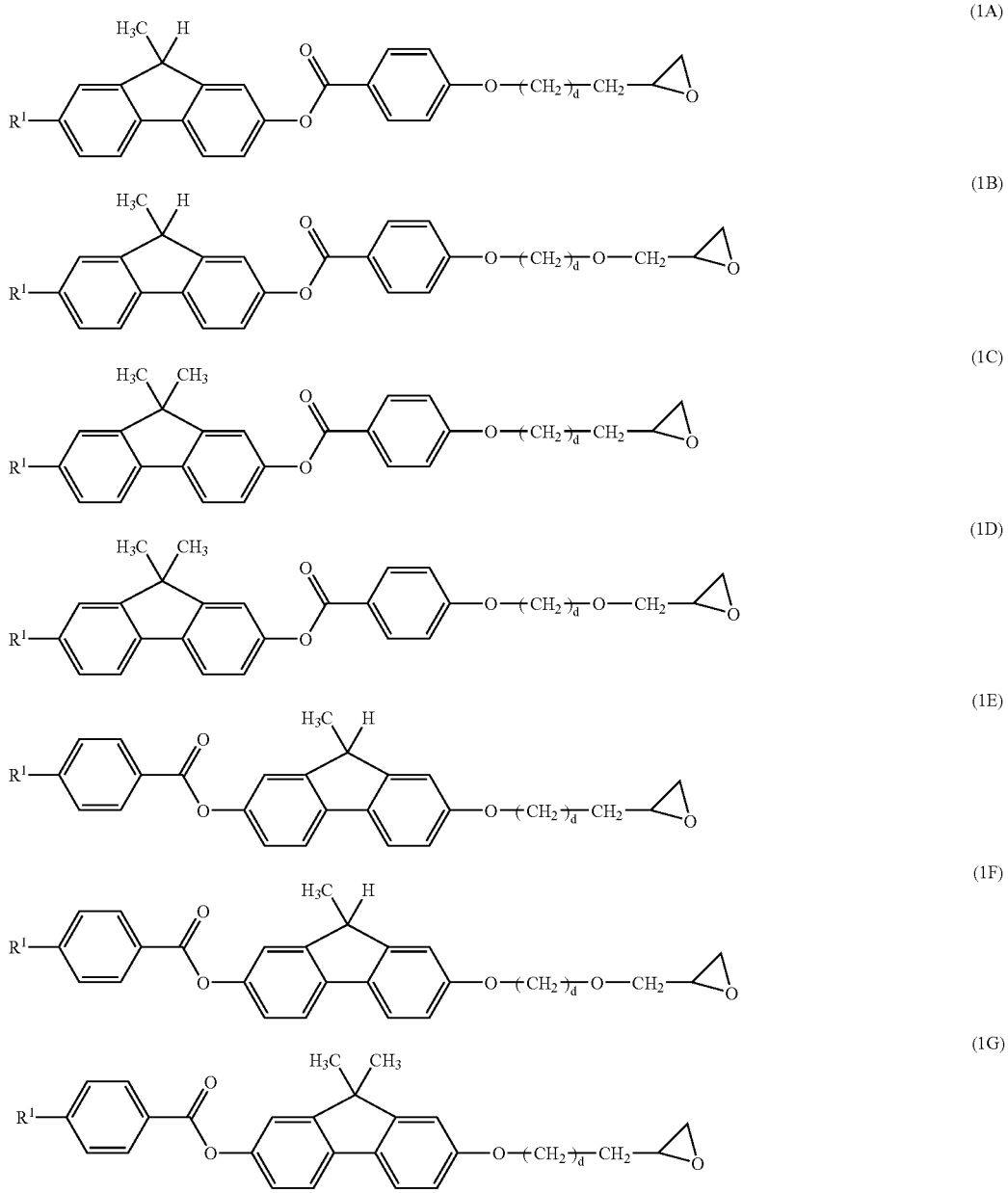

-continued
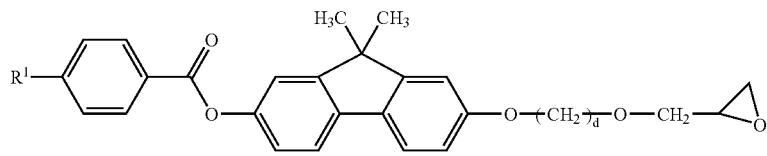
(1H)
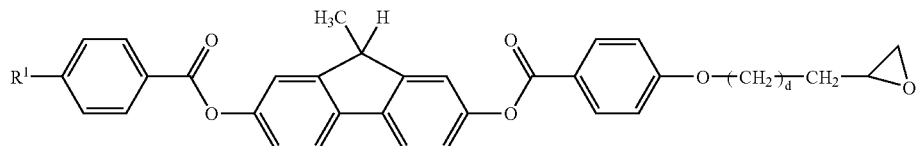
(1I)
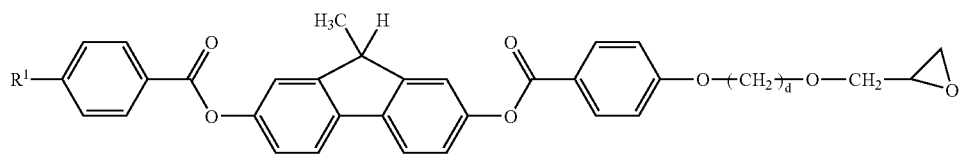
(1J)
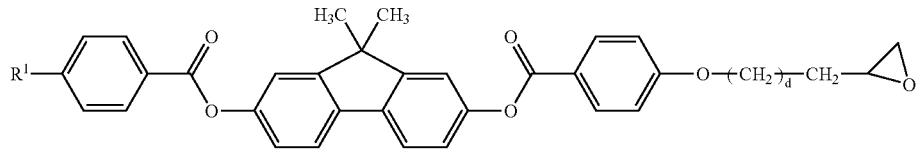
(1K)
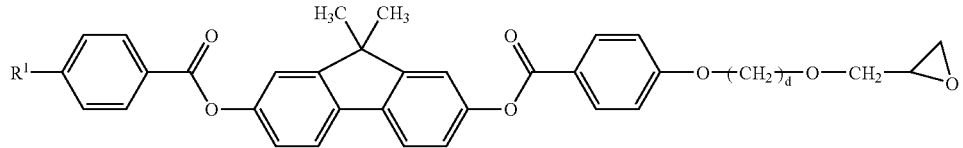
(1L)
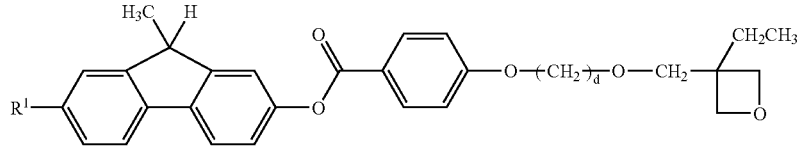
(2A)
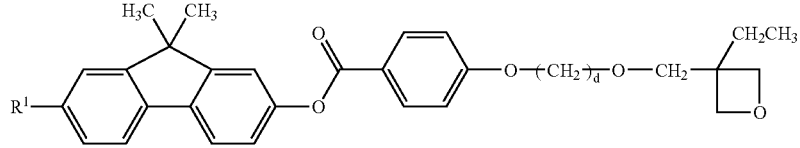
(2B)
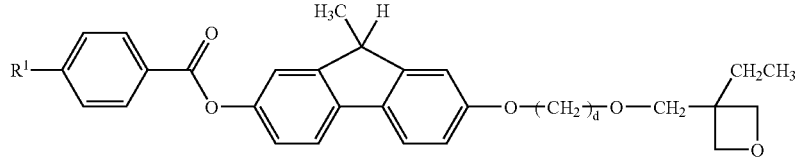
(2C)
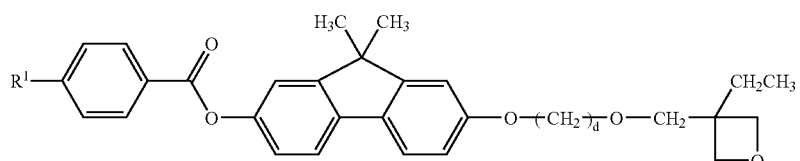
(2D)
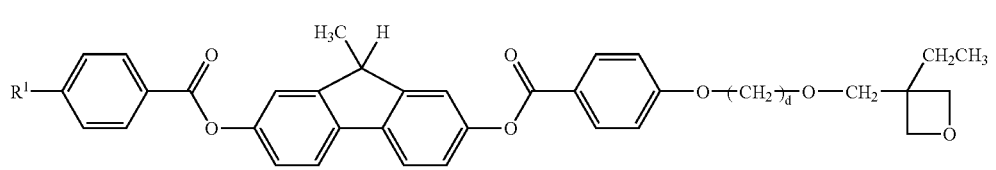
(2E)

-continued

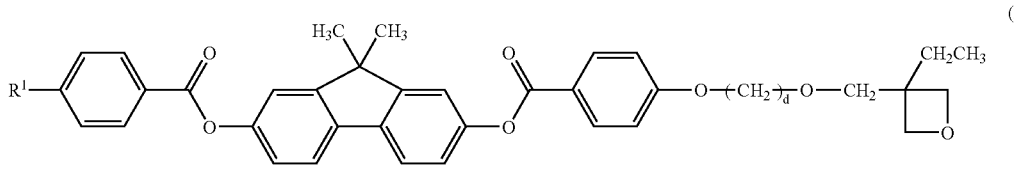

(2F)

In the formulae described above, $R^1$ is cyano, trifluoromethoxy, alkyl having 1 to 10 carbons, or alkoxy having 1 to 15 carbons, and d is an integer of 2 to 10.

13. A composition containing at least one compound according to any of items 1 to 3 as a first component.
14. A composition containing at least one compound according to any of items 4 to 12 as a first component.
15. The composition according to item 14, further containing, as a second component, a polymerizable compound which is different from the compound according to any of items 1 to 12.
16. The composition according to item 15, wherein the second component is at least one of the compounds represented by formula (M1), formula (M2), formula (M3), formula (M4), formula (M5) and formula (M6):

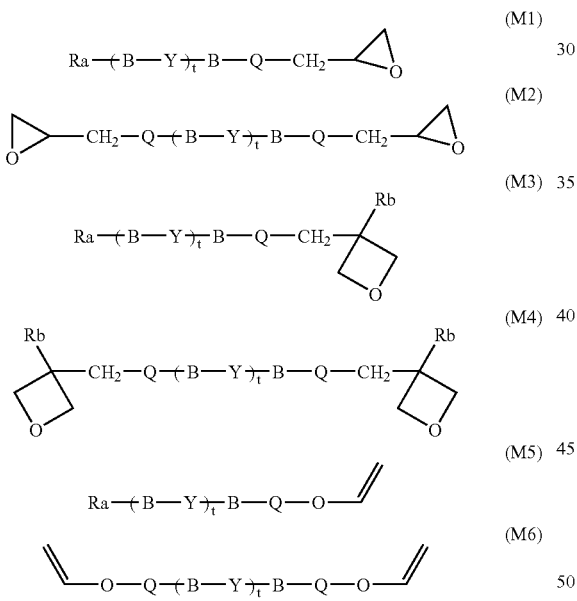

In formulae (M1) to (M6), Ra is hydrogen, fluorine, chlorine, cyano, trifluoromethoxy, alkyl having 1 to 20 carbons, alkoxy having 1 to 20 carbons, alkoxyalkyl having 2 to 20 carbons, alkenyl having 2 to 20 carbons, or alkenyloxy having 2 to 20 carbons; Rb is hydrogen or alkyl having 1 to 5 carbons; B is 1,4-cyclohexylene or 1,4-phenylene; any hydrogen in this 1,4-phenylene may be replaced by fluorine, and any one or two hydrogen in this 1,4-phenylene may be replaced by methyl or trifluoromethyl; one of B may be pyridine-2,5-diyl, pyrimidine-2,5-diyl, naphthalene-2,6-diyl, fluorene-2,7-diyl, 9-methylfluorene-2,7-diyl, 9-ethylfluorene-2,7-diyl, 9,9-dimethylfluorene-2,7-diyl, 9-chlorofluorene-2,7-diyl, or 9,9-difluorofluorene-2,7-diyl; Y is a single bond, —COO—, —OCO—, —(CH$_2$)$_2$—, or —C≡C—; Q is a single bond or alkylene having 1 to 20 carbons, and one or two —CH$_2$— in this alkylene may be replaced by —O—; and t is 1 or 2.

17. The composition according to item 16, wherein in formulae (M1) to (M6), Ra is fluorine, cyano, trifluoromethoxy, alkyl having 1 to 20 carbons, or alkoxy having 2 to 20 carbons; Rb is hydrogen or alkyl having 1 to 2 carbons; B is 1,4-cyclohexylene or 1,4-phenylene; any hydrogen in this 1,4-phenylene may be replaced by fluorine, and any one or two hydrogen in this 1,4-phenylene may be replaced by methyl or trifluoromethyl; one of B may be 9-methylfluorene-2,7-diyl or 9-ethylfluorene-2,7-diyl; Y is a single bond, —COO—, —OCO—, or —C≡C—; Q is a single bond or alkylene having 1 to 10 carbons, and one or two —CH$_2$— in this alkylene may be replaced by —O—; and t is 1 or 2.

18. The composition according to item 16 or 17, wherein the second component is at least one compound selected from the group of the compounds represented by formulae (M1) and (M2) or at least one compound selected from the group of the compounds represented by formulae (M3) and (4) or at least one compound selected from the group of the compounds represented by formulae (M5) and (M6).

19. The composition according to item 16 or 17, wherein the second component is at least one compound represented by formula (M1) and at least one compound represented by formula (M3), or at least one compound represented by formula (M1) and at least one compound represented by formula (M4), or at least one compound represented by formula (M2) and at least one compound represented by formula (M3), or at least one compound represented by formula (M2) and at least one compound represented by formula (M4).

20. A polymer obtained from the compound according to any of items 1 to 12.
21. A polymer obtained by polymerizing the composition according to any of items 13 to 19.
22. An element containing the polymer according to item 20 or 21.
23. The polymer according to item 20 or 21, wherein it is used as a molded matter having an optical anisotropy.

The compounds of the present invention have the following characteristics. These compounds satisfy at least two characteristics out of the following characteristics: they are polymerized at room temperature; they are polymerized even in the air; they are liable to be polymerized; they have broad temperature range of a liquid crystal phase; they are chemically stable; they are colorless; they are liable to be dissolved in solvents; they have good miscibility with other polymerizable compounds; and they have a small adhesion tension to a supporting substrate. The compounds have a liquid crystal phase. This liquid crystal phase has a wide temperature range. The orientation of molecules in this liquid crystal phase is maintained as well by polymerization. That is, the orientation of the molecules is fixed by polymerization. A liquid crystal compound having an acryloyloxy group is polymerized preferably under the atmosphere of nitrogen. The compounds may be polymerized in the air. The compounds are also readily polymerized by irradiation with a small integrated light amount of UV rays. The compounds are chemically stable and therefore have excellent storage stability. The compounds have good miscibility with other polymerizable compounds and therefore provide compositions having various constitutions. The compounds are liable to be wet against a supporting substrate, and therefore an even paint film can be obtained.

Polymers obtained from the above compounds have the following characteristics and satisfy at least two of the following characteristics: they have optical anisotropy; they are less liable to peel off from a supporting substrate; they have satisfactory hardness; they have a large heat resistance; they are colorless and transparent; they have a large weatherability; and they have a small photoelasticity. Such polymers have improved impact resistance, processability and electrical characteristics as well as solvent resistance in certain cases.

The compounds (1) and (2) have one polymerizable group. The compounds have a wide temperature range of a liquid crystal phase in comparison with a compound having two polymerizable group. Although the compound having two polymerizable group gives a polymer having three dimensional structure, the compounds (1) and (2) give a polymer of two dimensional structure. Thus, the polymer(s) of compounds (1) and/or (2) are soft and impact resistant. The polymers can be molded because they have thermoplasticity.

First, the compounds of the present invention shall be explained. Compound (1) is a liquid crystal compound having an oxirane ring. Compound (2) is a liquid crystal compound having an oxetane ring. These compounds have a polymerizability and are stable under ordinary handling conditions. These compounds are readily polymerizable at room temperature even under an air atmosphere by irradiation with UV rays because of the reasons compound (1) is rapid in initiating reaction and compound (2) has a large polymerizing speed. Compound (1) and compound (2) are readily oriented by an orienting film. Accordingly, the polymers obtained have minimal or no orientation defects.

The compound (1) is preferable to compound (2) in view of a rapid rate of polymerization and view of an excellent adhesiveness. The compound (2) is preferable to the compound (1) in view of giving a polymer with a high degree of polymerization and in giving a polymer with a sufficient hardness.

In the compounds (1) and (2), characteristics such as a large dielectric anisotropy, a small dielectric anisotropy, a large optical anisotropy, a small optical anisotropy and a small viscosity can be controlled by suitably selecting the side chains $R^1$, $R^2$, $R^3$, and $R^4$, the ring A, the bonding group X and the bonding group P.

When $R^1$ is fluorine, chlorine, cyano, or trifluoromethoxy, the compound (1) or (2) seems to be reduced in a melting point. When $R^1$ is alkyl, a temperature range of the liquid crystal phase can be controlled by the carbon number. When $R^2$ is alkyl, the monomer having a smaller carbon number tends to provide a polymer having a larger heat resistance. When one or both of $R^3$ and $R^4$ are fluorine or chlorine, the compound (1) or (2) seems to be reduced in a melting point. When one or both of $R^3$ and $R^4$ are alkyl, a temperature range of the liquid crystal phase can be controlled by the carbon number.

When A is 1,4-cyclohexylene, the compound (1) or (2) has a small optical anisotropy. When A is 1,4-phenylene, the compound (1) or (2) has a large optical anisotropy. When at least one of X is —COO— or —OCO—, the compound (1) or (2) has a better liquid crystallinity. When at least one of X is —C≡C—, the compound (1) or (2) has a large optical anisotropy. When P has oxygen (—O—), the compound (1) or (2) has a large optical anisotropy.

The compound (1) or (2) may contain an isotope such as $^2H$ (heavy hydrogen) or $^{12}C$ in a larger proportion than those of the isotopes naturally present. Also in such case, the characteristics of the compound are not varied to a large extent.

The characteristics of the compound (1) or (2) are reflected onto the characteristics of the polymer (1) or (2). Among the characteristics, the optical anisotropy is important for the objects of the present invention. When a composition containing the compounds (1) or (2) is polymerized on a supporting substrate, the polymer obtained is less liable to be peeled off from the supporting substrate. The compounds (3) to (6) have a smaller viscosity, and therefore they are suited to reducing a viscosity of the composition. The compounds (7) and (8) have a broader temperature range of a liquid crystal phase, and therefore it is suited to broadening a temperature range of a liquid crystal phase in the composition.

The preferred compounds of formulae (1) and (2) are the compounds (3) to (8) which have already been described. More preferred compounds of formulae (1) and (2) are the compounds (3a) to (8b) described below. These are the compounds that P is —O—$(CH_2)_d$— or —O—$(CH_2)_d$—O—.

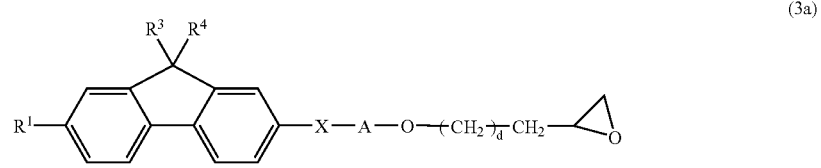

(3a)

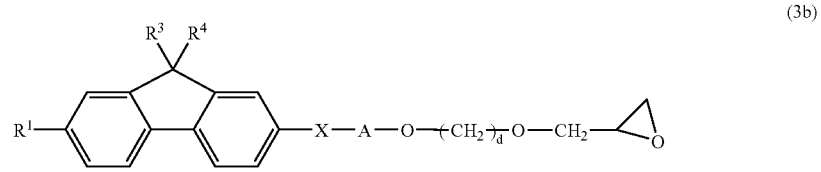

(3b)

-continued
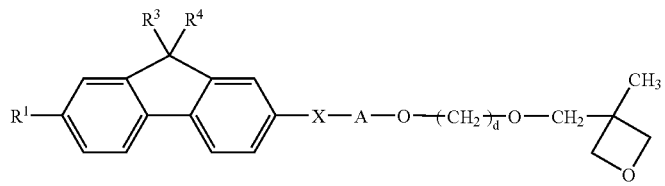
(4a)
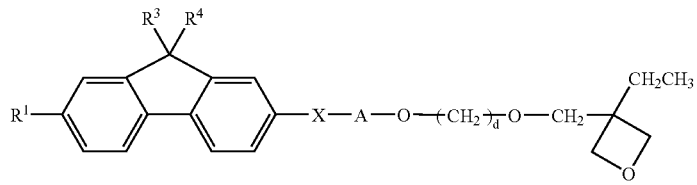
(4b)
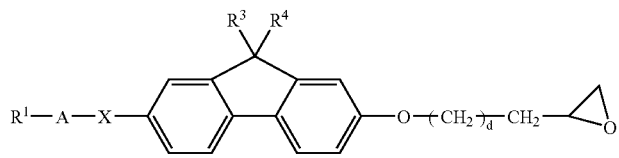
(5a)
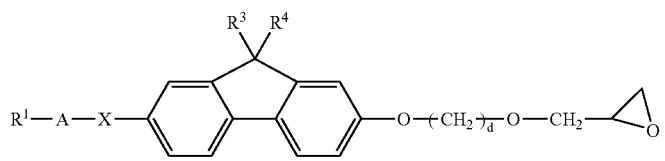
(5b)
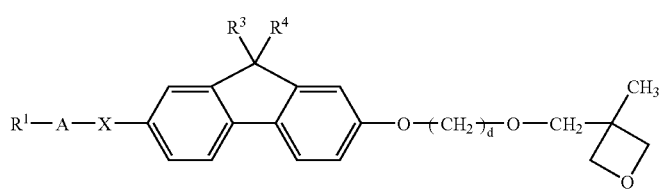
(6a)
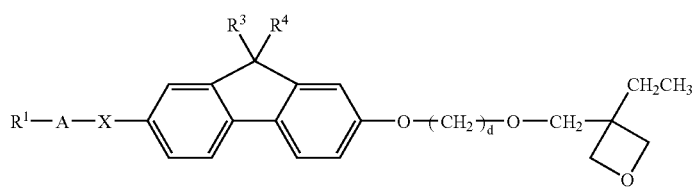
(6b)
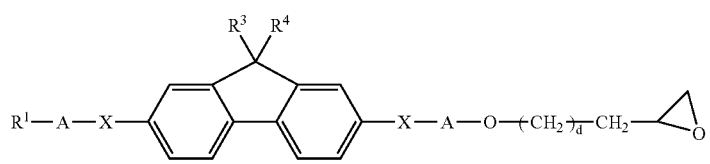
(7a)

-continued

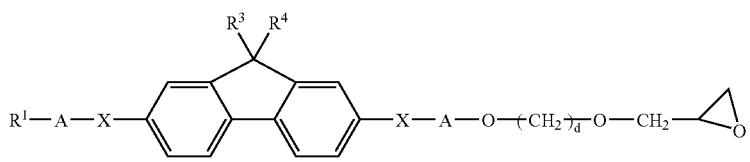
(7b)

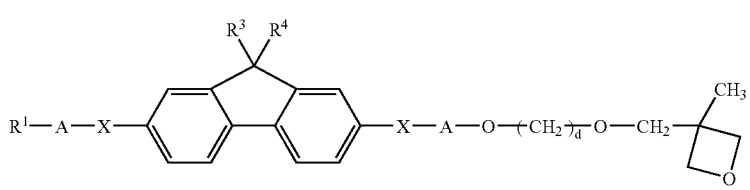
(8a)

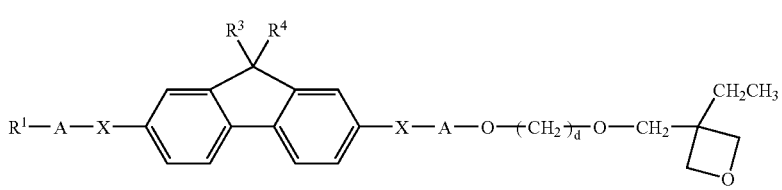
(8b)

In the above formulas, $R^1$ is hydrogen, fluorine, chlorine, cyano (—CN), nitro (—NO$_2$), trifluoromethoxy (—OCF$_3$), or alkyl having 1 to 20 carbons, and in this alkyl, any one or two —CH$_2$— may be replaced by —O—. The combination of $R^3$ and $R^4$ is hydrogen and hydrogen, hydrogen and methyl, hydrogen and ethyl or methyl and methyl. A is 1,4-cyclohexylene or 1,4-phenylene. In the 1,4-phenylene, any hydrogen may be replaced by fluorine or chlorine, and any one or two hydrogen may be replaced by methyl or trifluoromethyl. X is a single bond, —C≡C—, —CH$_2$O—, —OCH$_2$—, —COO—, —OCO—, —CONH—, —NHCO—, —(CH$_2$)$_2$COO—, —OCO(CH$_2$)$_2$—, —CH=CH—COO—, or —OCO—CH=CH— and d is an integer of 1 to 10.

Next, a synthetic process for the compounds (1) and (2) shall be explained. The compound (1) or (2) can be synthesized by suitably combining synthetic processes in organic chemistry which are described in Houben Wyle, Methoden der Organischen Chemie, Georg Thieme Verlag, Stuttgart, Organic Reactions, John Wily & Sons Inc., Organic Syntheses, John Wily & Sons Inc., Comprehensive Organic Synthesis, Pergamon Press and New Experimental Chemical Course (Maruzen).

One of starting materials in the compounds (1) and (2) is fluorenes. The commercially available products which can be used are 2-bromofluorene, 2,7-dibromofluorene, 2-bromo-7-pentylfluorene, and 2-amino-7-bromofluorene. 2-Pentyl-7-hydroxyfluorene and 7-pentylfluorene-2-carboxylic acid are synthesized by a process described in a document. The document is Mol. Cryst. Liq. Cryst., 129, 17 (1985). 2-Bromo-7-pentylfluorene can be synthesized by a process described in JP 2000-178211 A/2000 (see paragraph 0040 in Example 1). 2-Acetyl-7-hydroxyfluorene is described in JP 2001-139525 A/2001 (see paragraph 0051 in Example 1).

A fluorene derivative in which a 9-position is substituted with alkyl is synthesized by the alkylation of a 9-position of a fluorene ring. Fluorene in which a 9-position is substituted with monoalkyl is synthesized by treating fluorene with one equivalent of a base such as n-butyllithium and then reacting it with one equivalent of alkyl bromide. Refer a 9-methylfluorene derivative to Organic Syntheses, Collective Volume 4, page 623 or JP 2003-238491 A/2003 (see paragraphs 0043 to 0044). A fluorene derivative in which a 9-position is substituted with dialkyl is synthesized by the treatment with two equivalents of a base such as n-butyllithium and then by the reaction with two equivalents of alkyl bromide. Refer to a process described in Journal of Polymer Science: Part A: Polymer Chemistry, Vol. 31, 2465 (1993).

A fluorene derivative in which a 9-position is substituted with fluorine is synthesized by the fluorination of a 9-position. A 9,9-difluorofluorene derivative is synthesized by the method described in Synlett, 191 (1991). A synthetic method of 2,7-dihydroxy-9-methylfluorene is described in JP 2003-238491 A/2003 (see paragraphs 0092 to 0095 in Example 4).

An oxirane ring is formed by the epoxidation of olefins with peroxides. The examples of the peroxides are hydrogen peroxide, peracetic acid and m-chloroperbenzoic acid. An oxetane ring can be formed by using 3-alkyl-3-oxetanemethanol as a starting material. 3-Ethyl-3-oxetanemethanol and 3-methyl-3-oxetanemethanol are commercially available. The carbon chain length can be elongated by the reaction of above compounds with α,ω-dibromomethylene such as 1,2-dibromoethane, 1,4-dibromobutane, 1,6-dibromohexane, and 1,8-dibromooctane according to the method described in reference. The reference is Macromolecules, 24, 4531 to 4537 (1991). A method for forming the bonding group X is disclosed in JP 2003-277359 A/2003 (see paragraphs 0040 to 0053). A method for forming the bonding group X connected to a fluorene ring is disclosed in JP 2003-238491 A/2003 (see paragraphs 0019 to 0038). Examples of synthetic schemes for preparing compound of formulae (1) or (2) are illustrated below.

Scheme 1. Synthesis of the compound (7b)

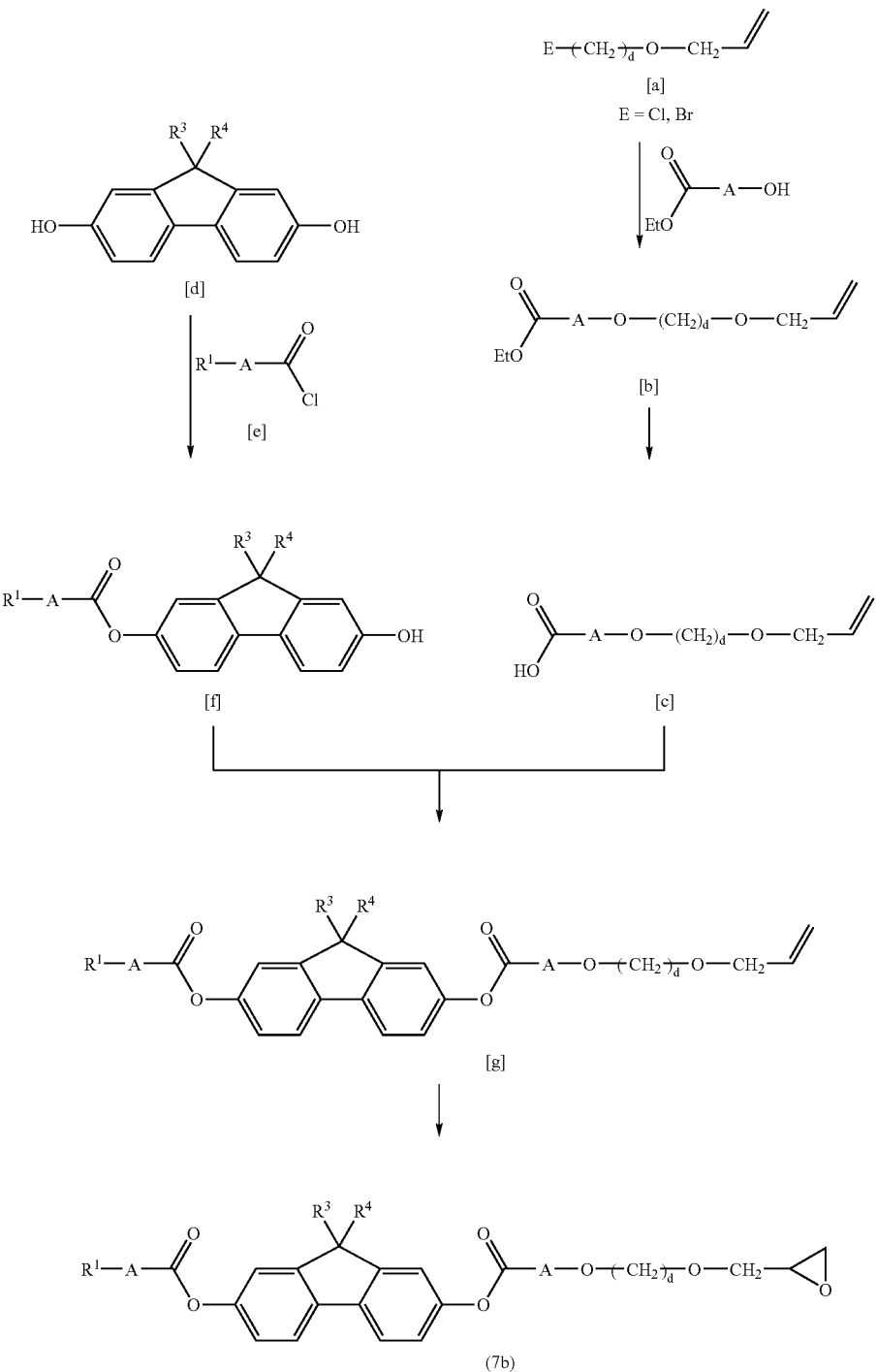

Synthesis of the compound (7b) in which X is —COO— and —OCO— (oxycarbonyl) (Scheme 1): Compound [a] and a hydroxybenzoic acid ester derivative are etherified in the presence of a suitable base to thereby obtain compound [b]. The examples of the base are potassium hydroxide, sodium hydroxide, potassium carbonate and sodium hydride. Compound [c] is obtained by hydrolyzing compound [b]. On the other hand, 2,7-dihydroxyfluorene [d] is reacted with an equivalent of acid chloride [e] to obtain monoester [f]. Diester [g] is obtained by esterifying the above monoester [f] and compound [c] obtained above. Compound (7b) is synthesized by oxidizing the above diester [g] by peroxide. The examples of the peroxide are hydrogen peroxide, performic acid, peracetic acid, and m-chloroperbenzoic acid.

Scheme 2. Synthesis of the compound (8a) or (8b)

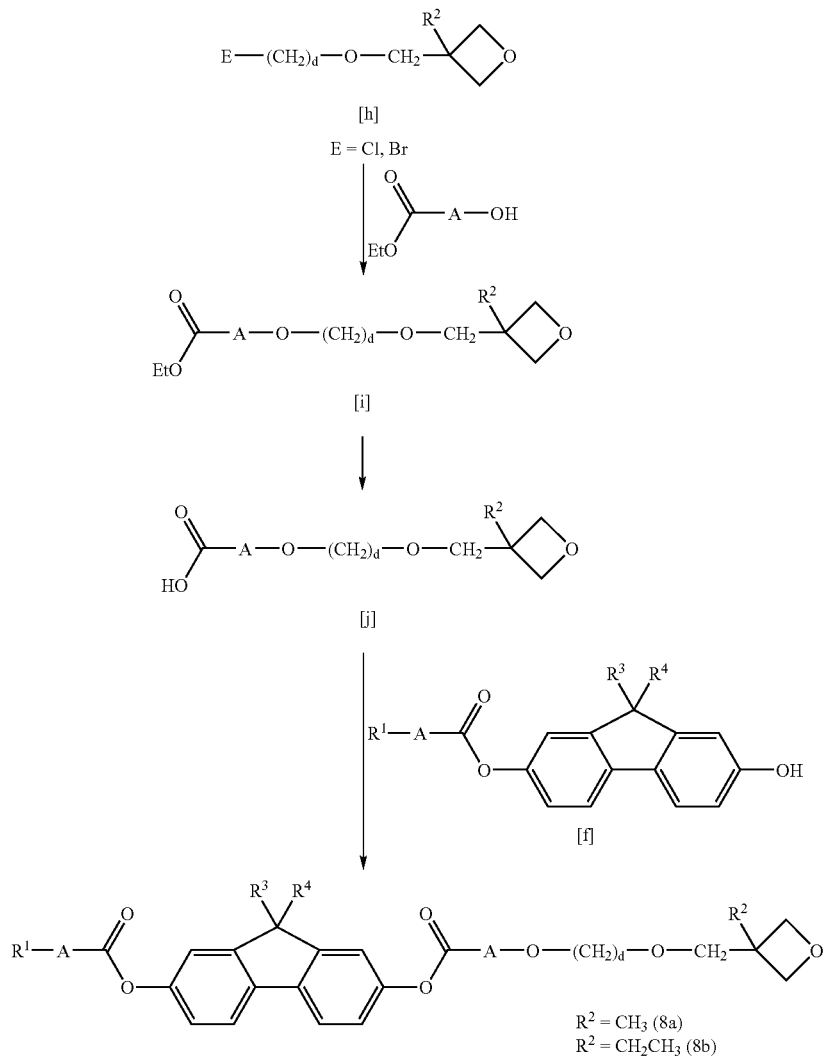

Synthesis of the compound (8a) or (8b) in which X is —COO— and —OCO— (oxycarbonyl) (Scheme 2): Compound [h] and hydroxybenzoic acid ester are etherified in the presence of a suitable base to thereby obtain compound [i]. Examples of the base include potassium hydroxide, sodium hydroxide, potassium carbonate and sodium hydride. Compound [j] is obtained by hydrolyzing compound [i]. Compound (8a) or (8b) is synthesized by esterification of the monoester [f] and compound [j]. Compounds (8a) or (8b), in which X is —C≡C— (triple bond), are synthesized according to Scheme 3 below.

Scheme 3. Synthesis of the compound (8a) or (8b)

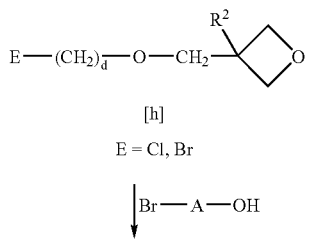

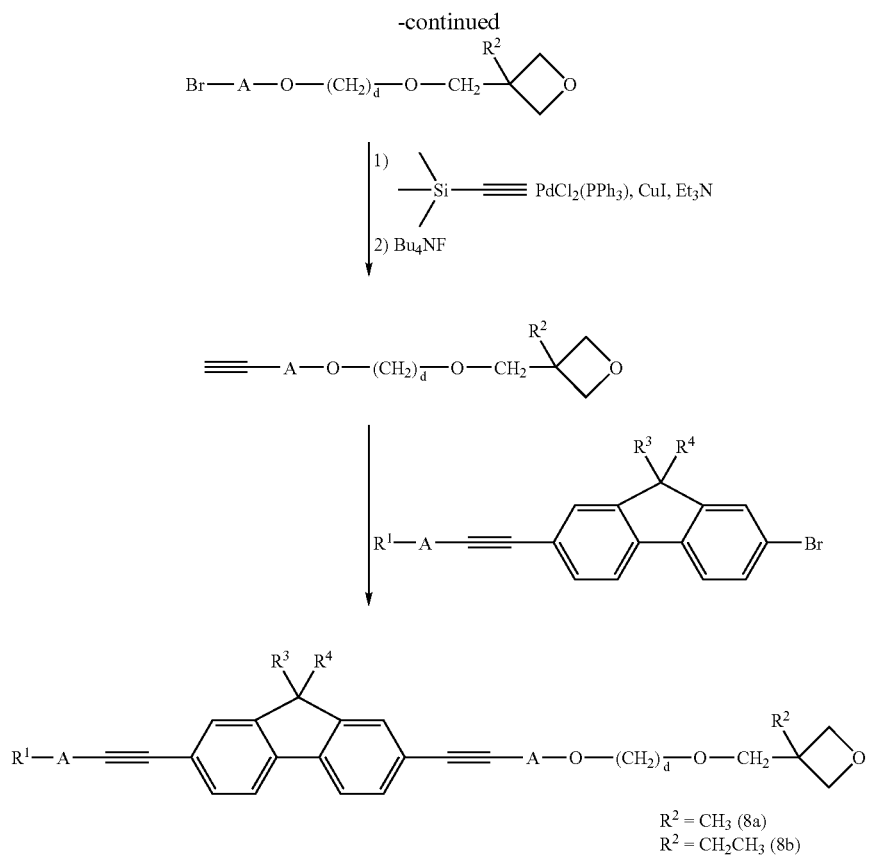
Compound (4) in which X is —OCO—, compound (8) in which X is —COO— and compound (8) in which X is —CH₂O— (methyleneoxy) are synthesized according to the following three schemes. Compound (5) in which X is —OCO— is synthesized according to scheme four and can also be prepared according to scheme five.
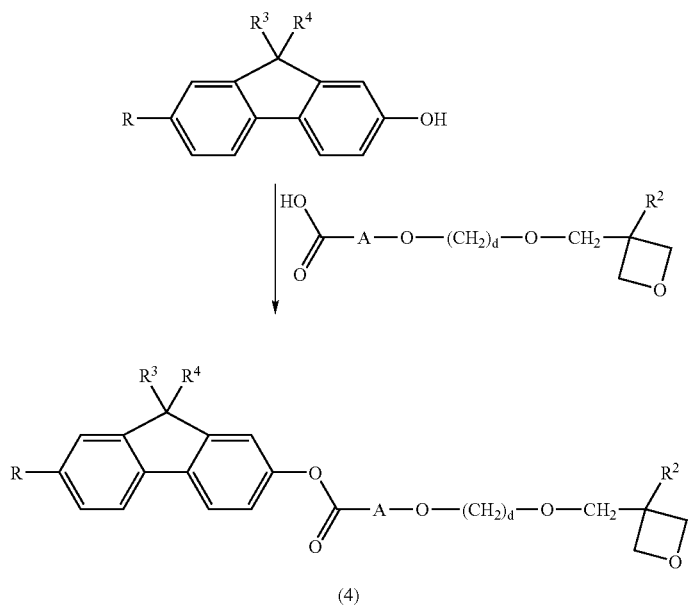
Scheme 4. Synthesis of the compound (4) and (5)

-continued
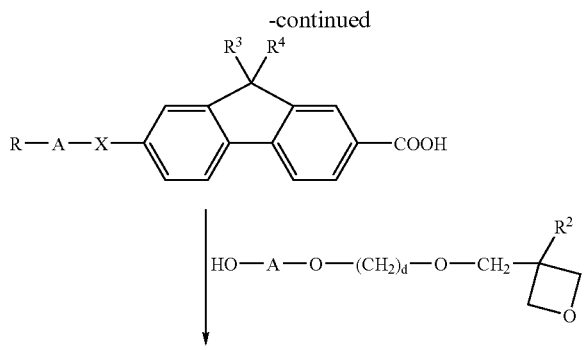
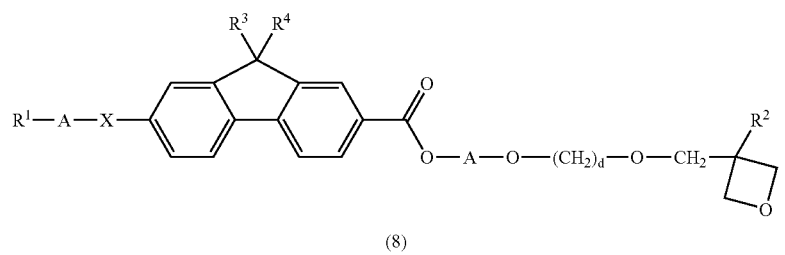
(8)
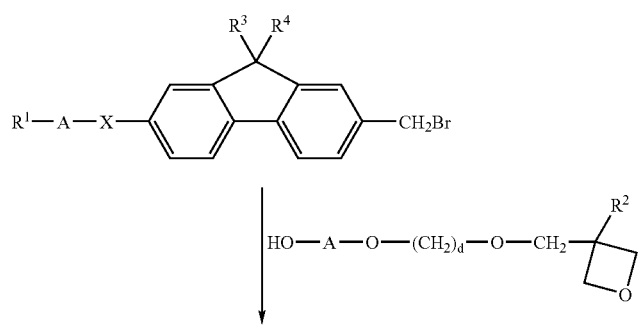
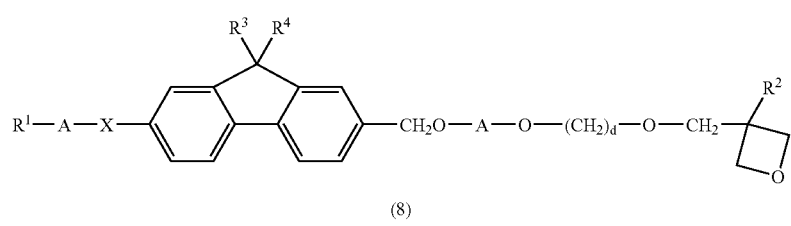
(8)

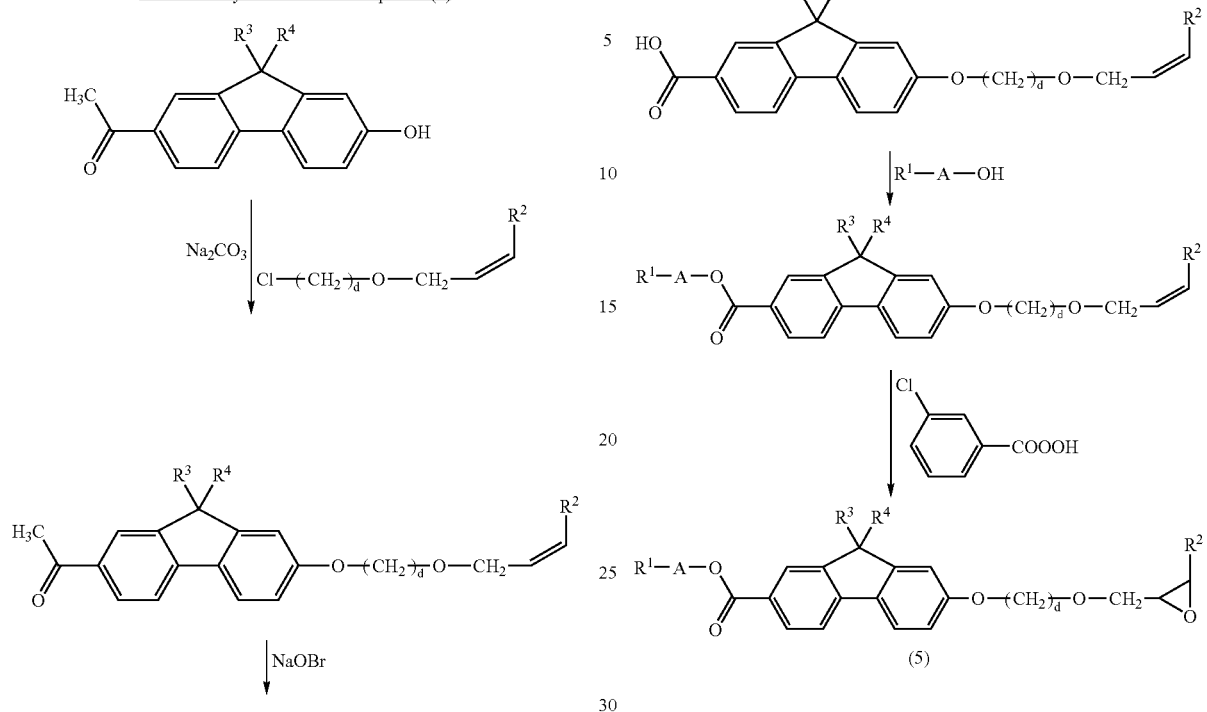
The examples of compounds synthesized by these methods are Compounds No. 1 to No. 190.
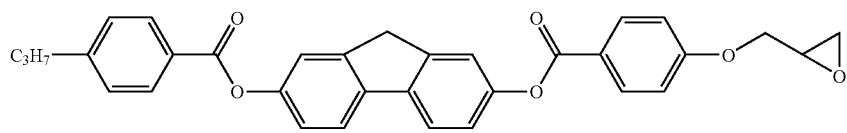
No. 1
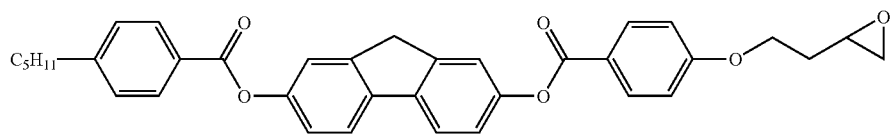
No. 2
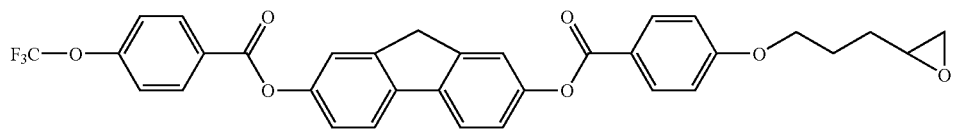
No. 3
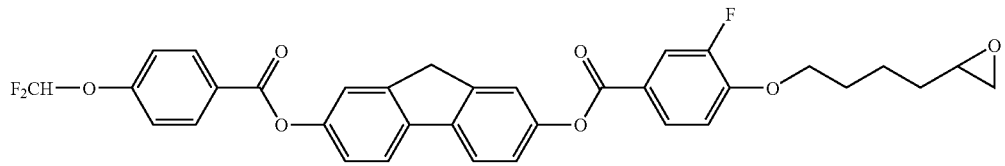
No. 4
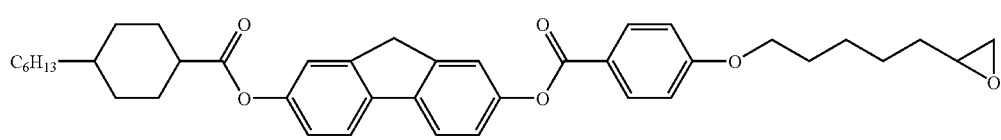
No. 5

-continued
No. 6
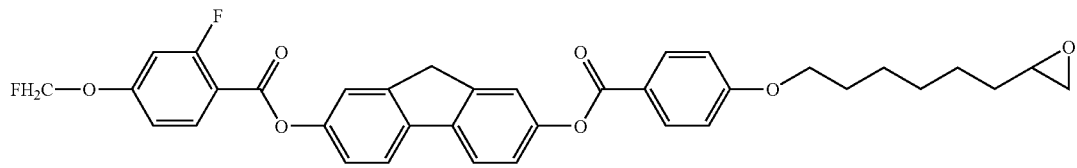
No. 7
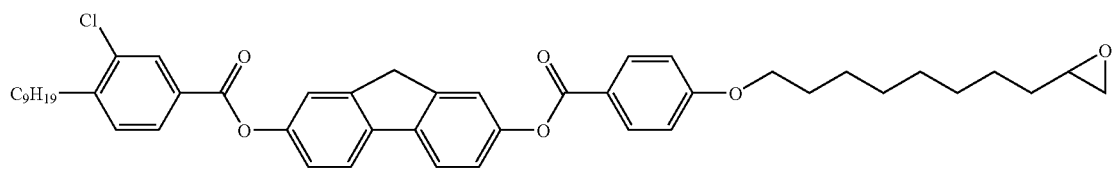
No. 8
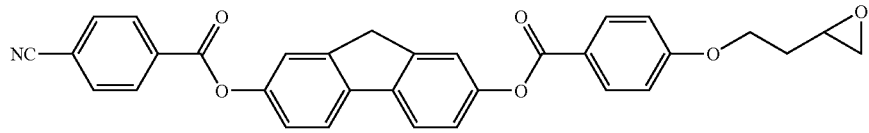
No. 9
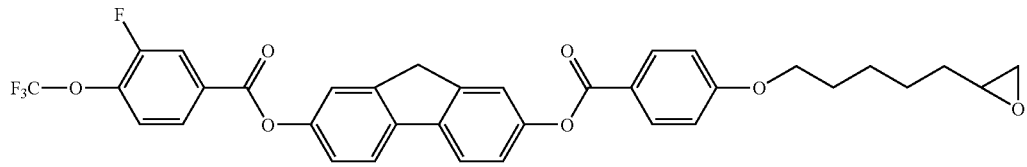
No. 10
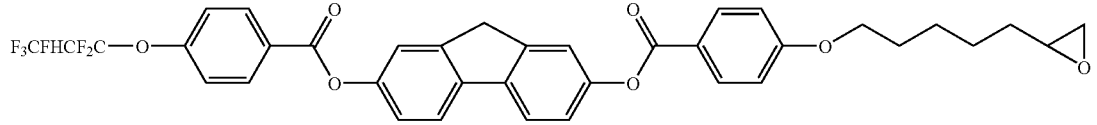
No. 11
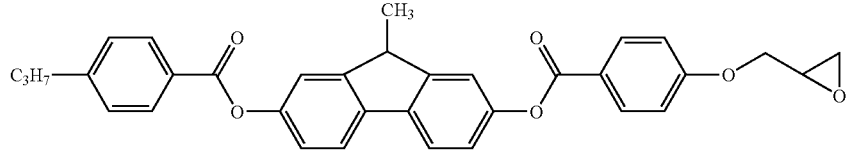
No. 12
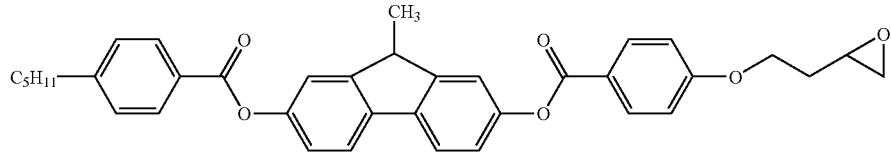
No. 13
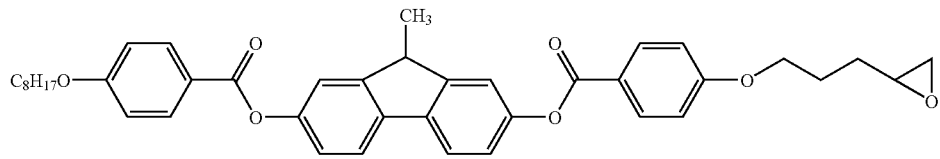
No. 14
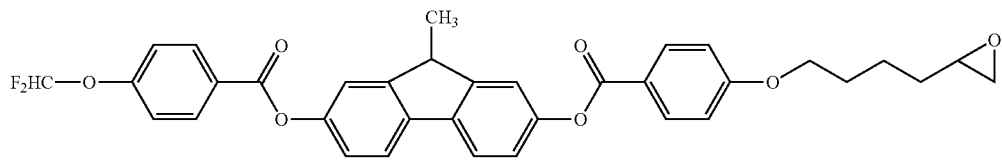

-continued
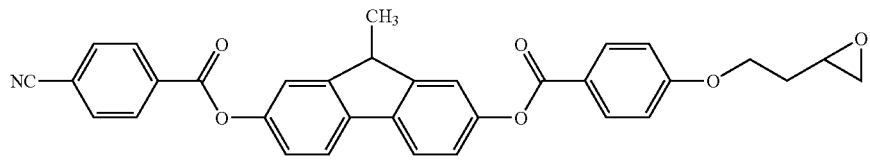
No. 15
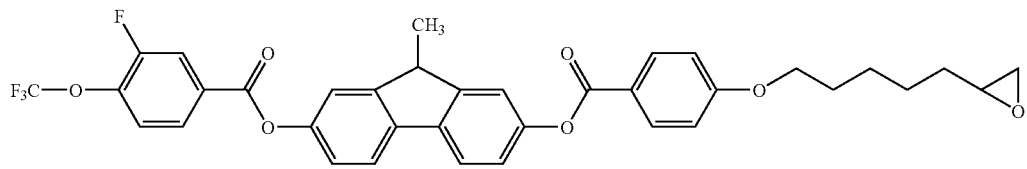
No. 16
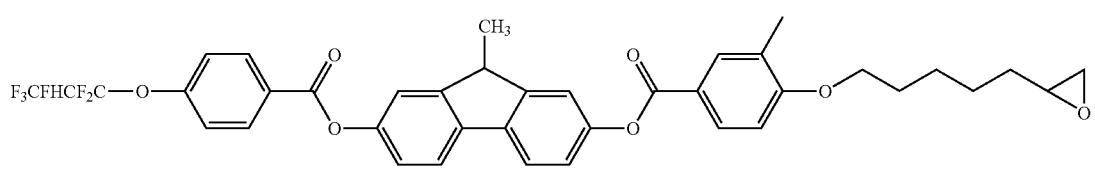
No. 17
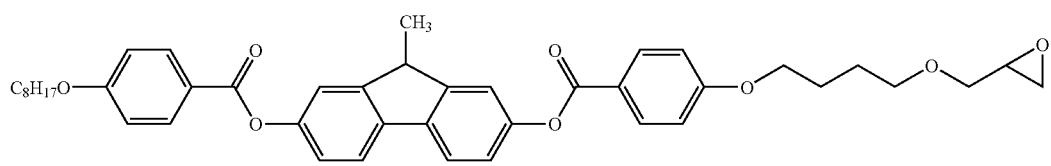
No. 18
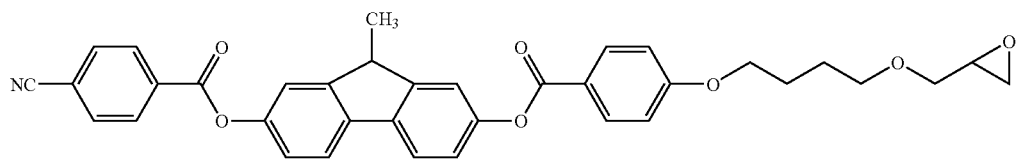
No. 19
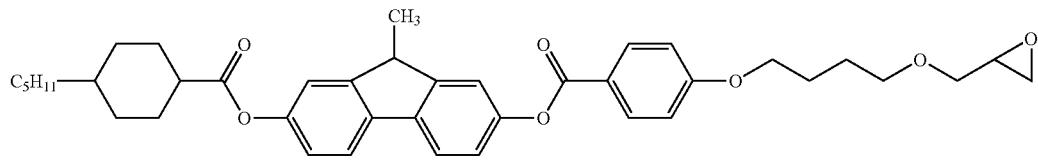
No. 20
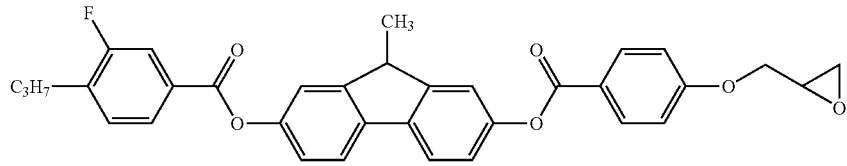
No. 21
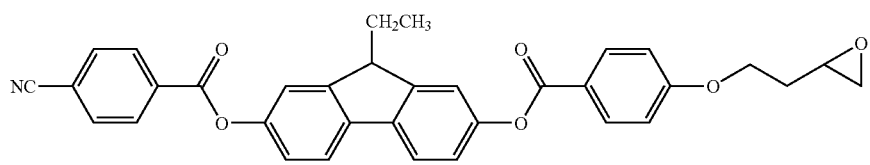
No. 22
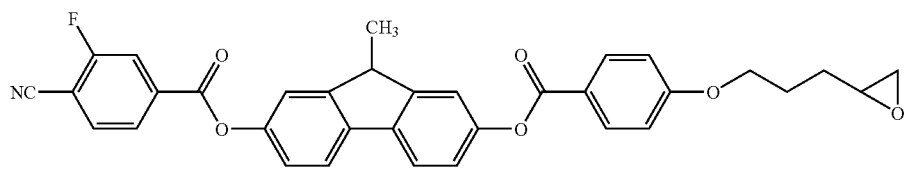
No. 23

-continued
No. 24
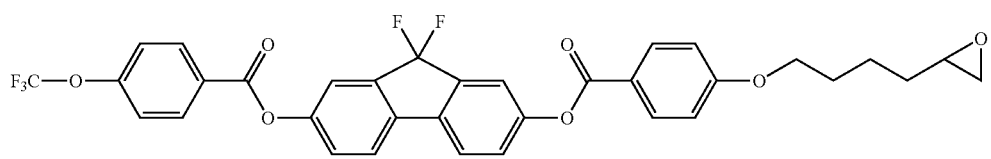
No. 25
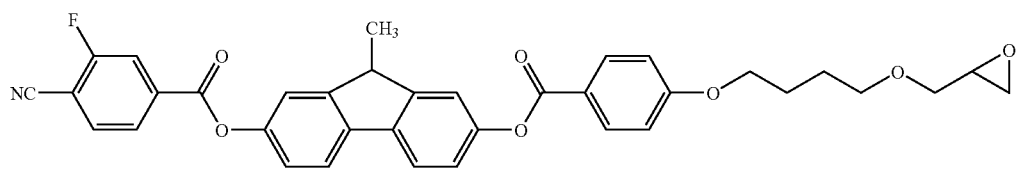
No. 26
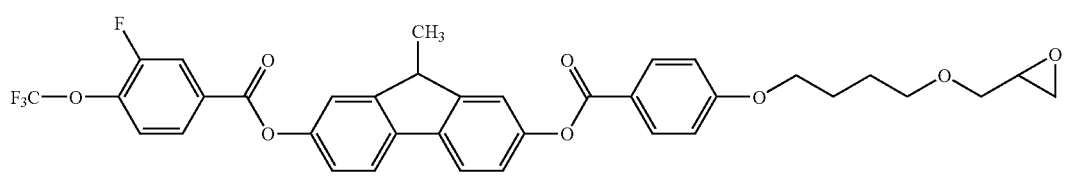
No. 27
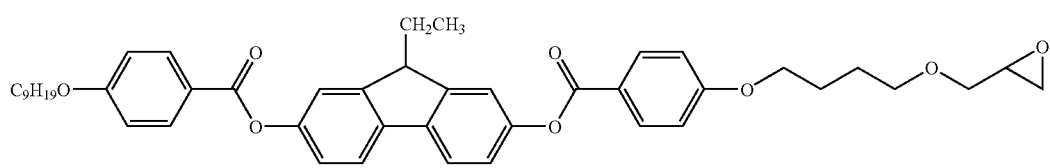
No. 28
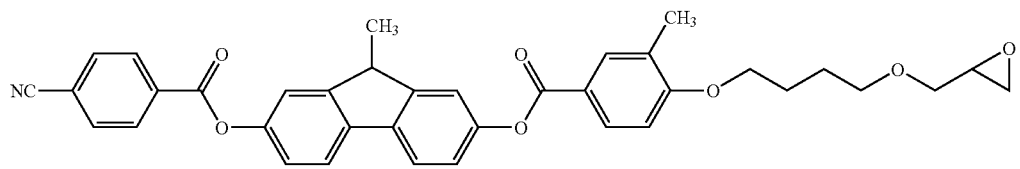
No. 29
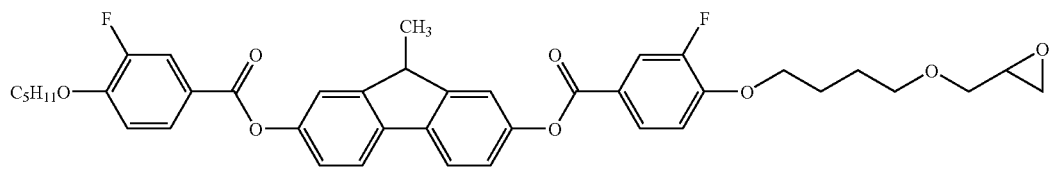
No. 30
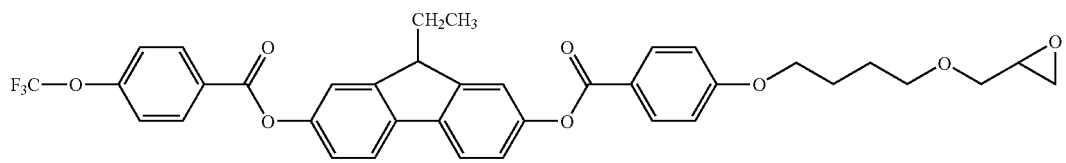
No. 31
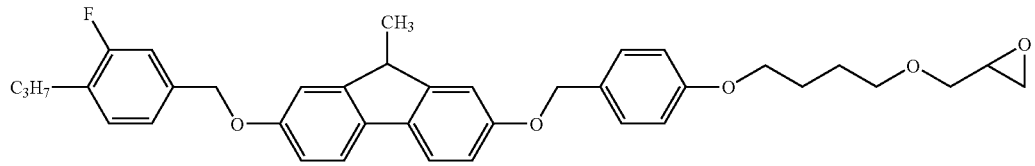
No. 32
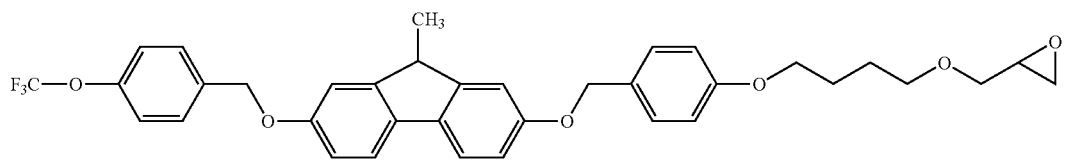

-continued
No. 33
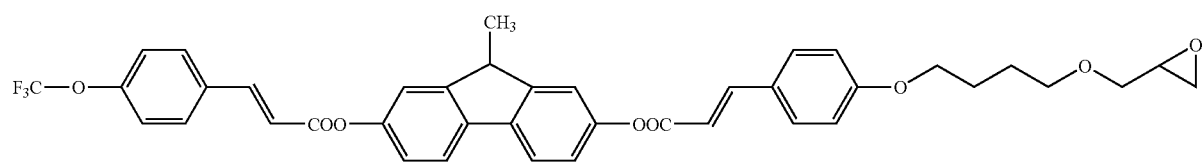
No. 34
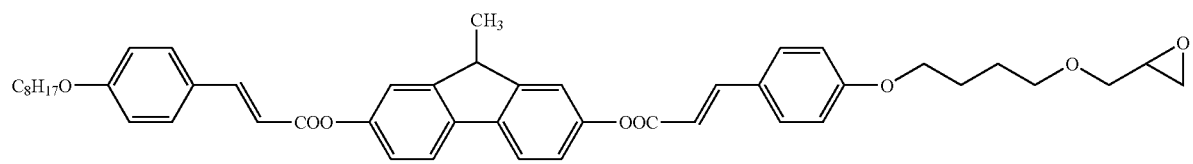
No. 35
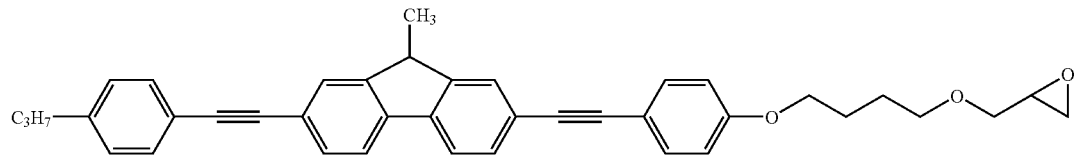
No. 36
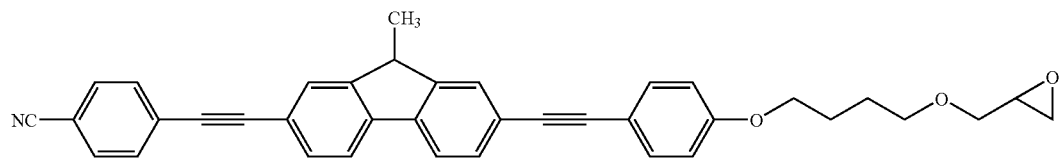
No. 37
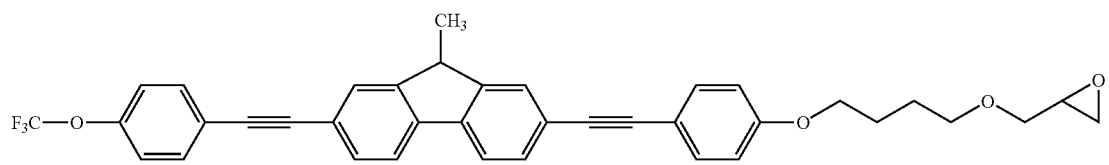
No. 38
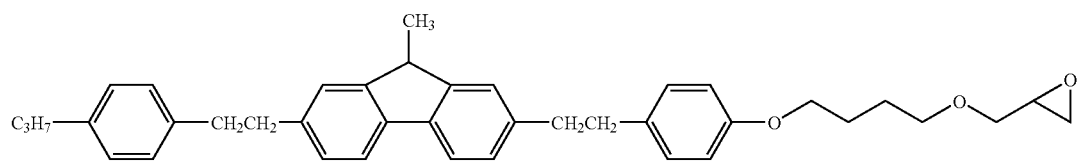
No. 39
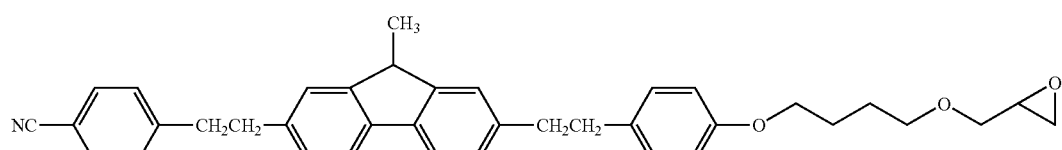
No. 40
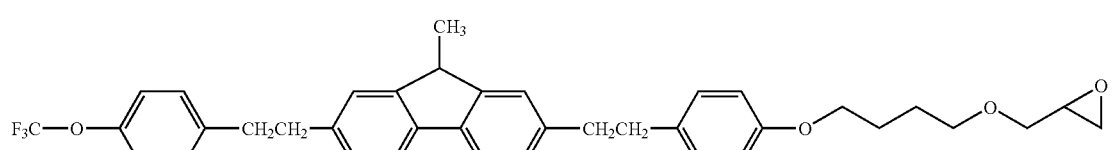
No. 41
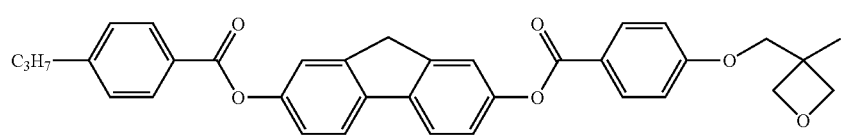

-continued
No. 42
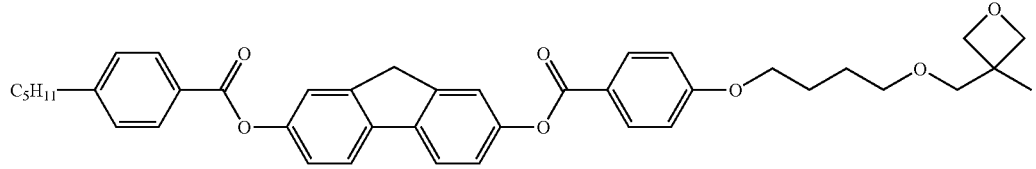
No. 43
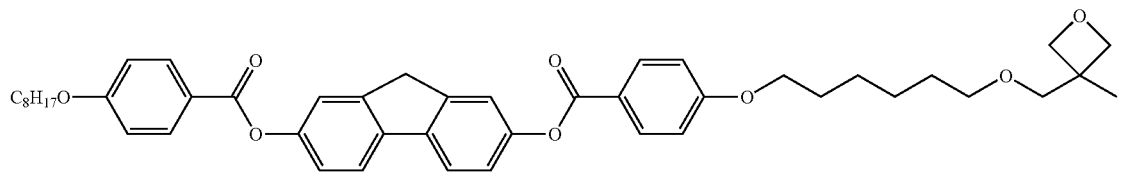
No. 44
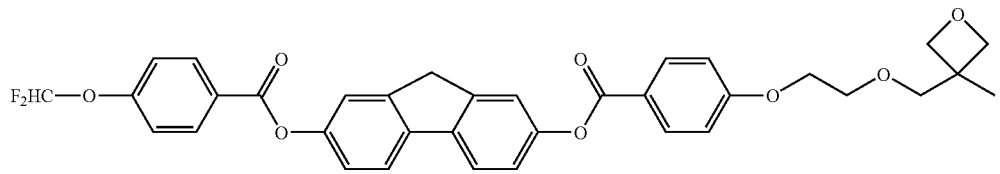
No. 45
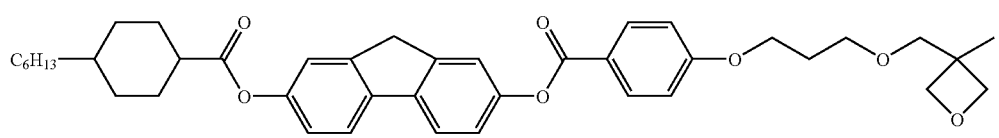
No. 46
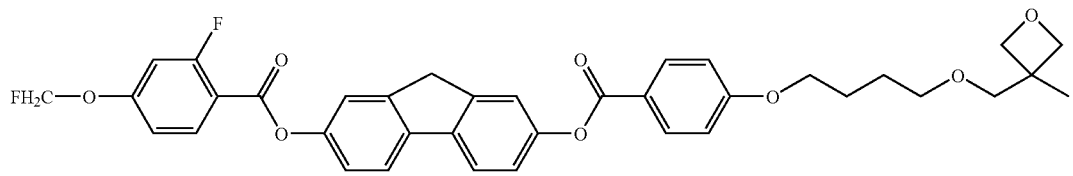
No. 47
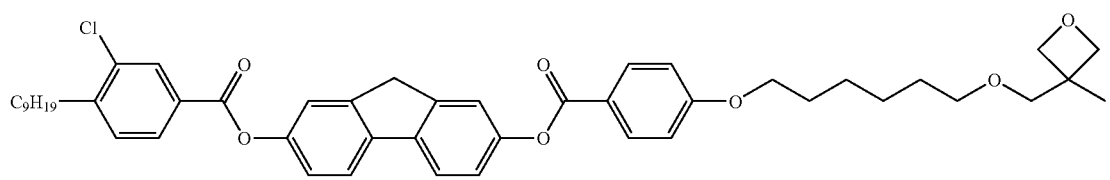
No. 48
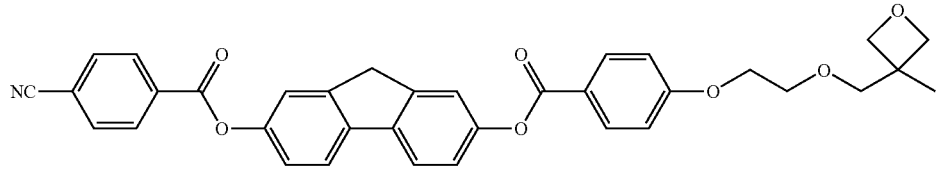
No. 49
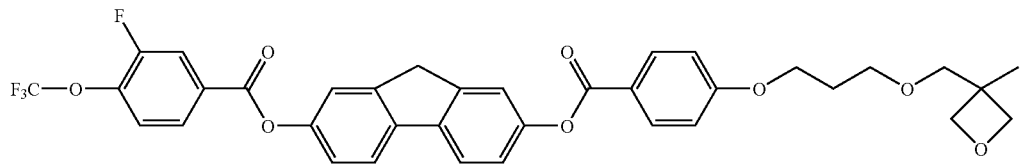
No. 50
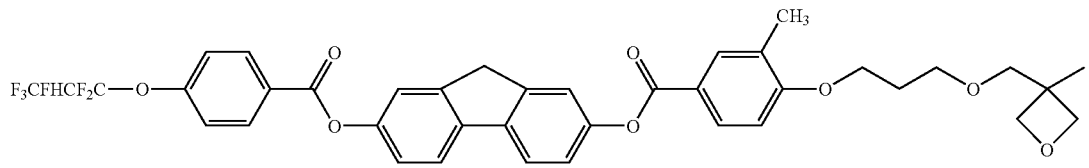

No. 51
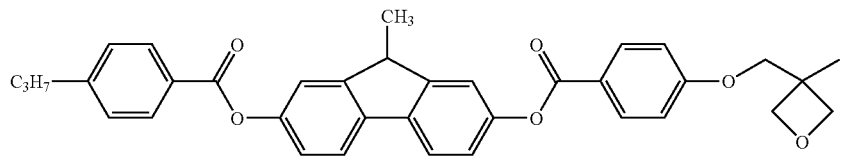
No. 52
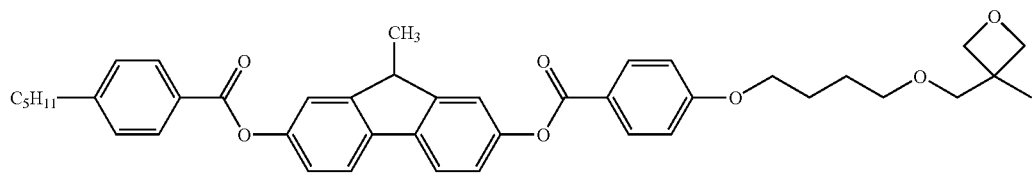
No. 53
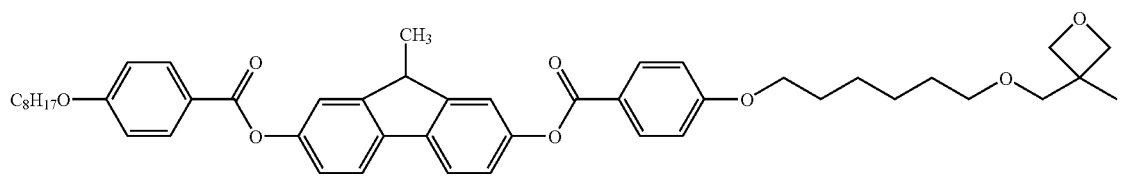
No. 54
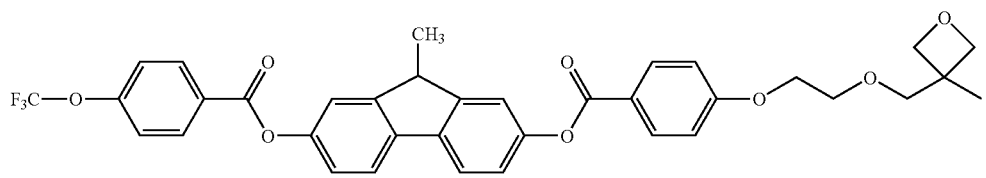
No. 55
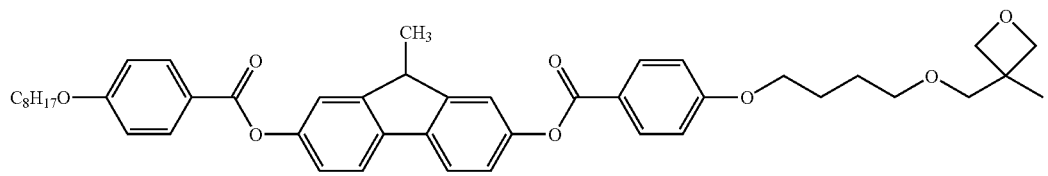
No. 56
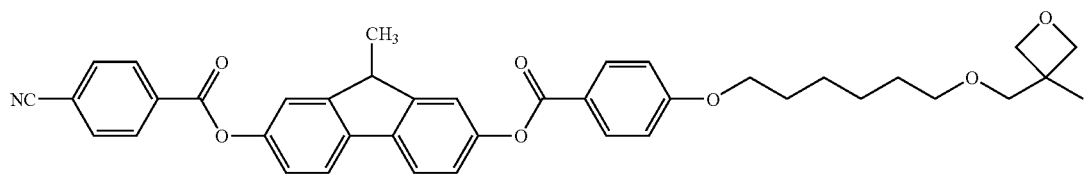
No. 57
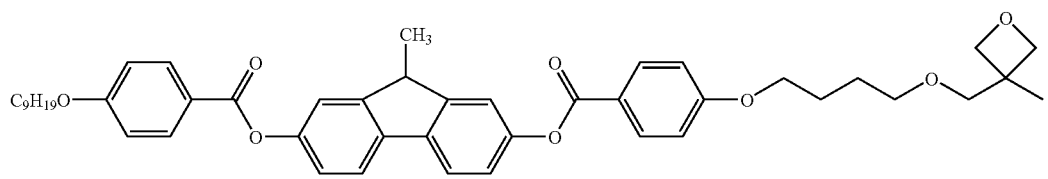
No. 58
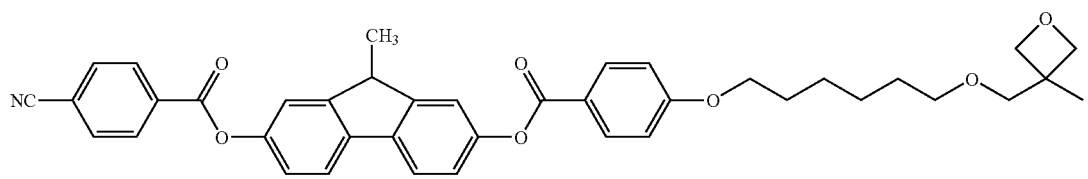

-continued
No. 59
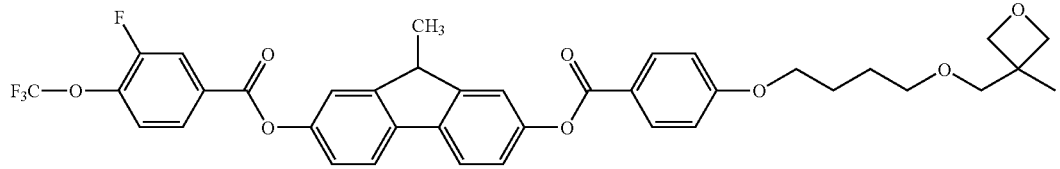
No. 60
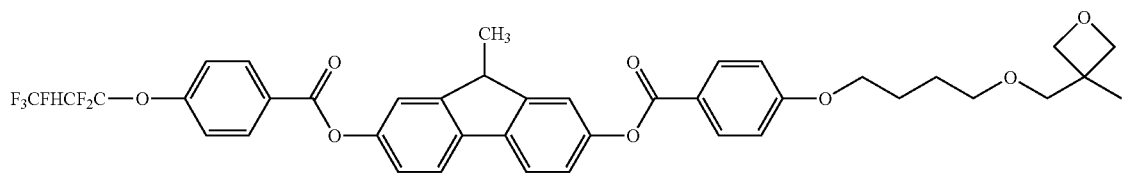
No. 61
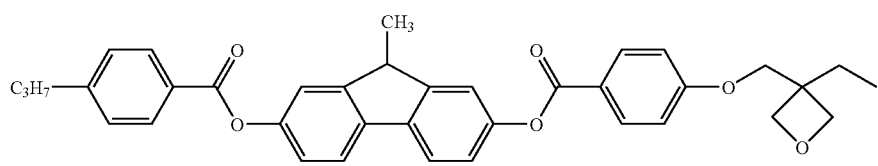
No. 62
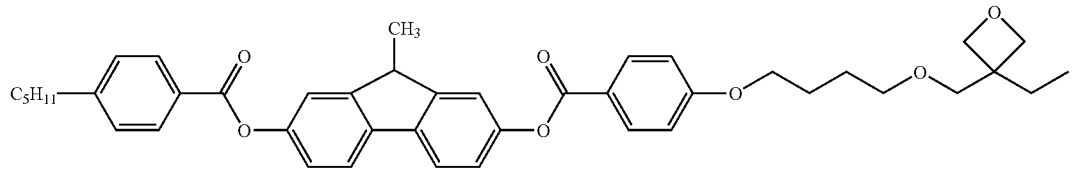
No. 63
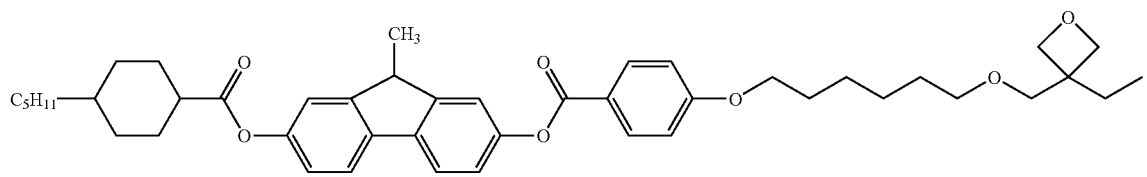
No. 64
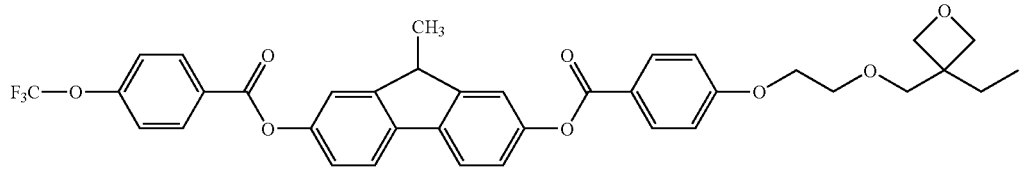
No. 65
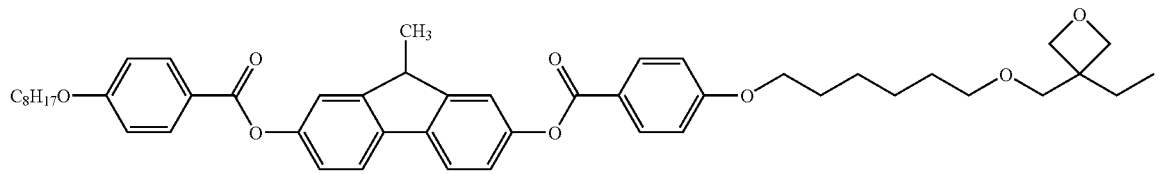
No. 66
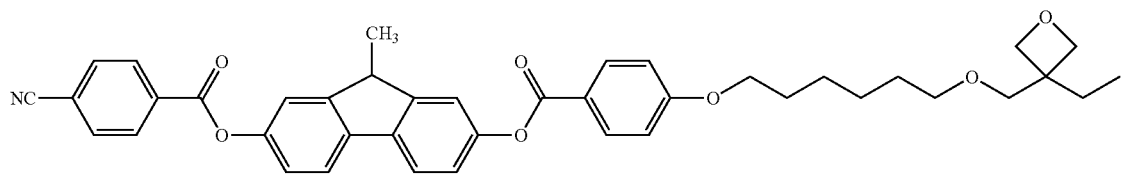

-continued
No. 67
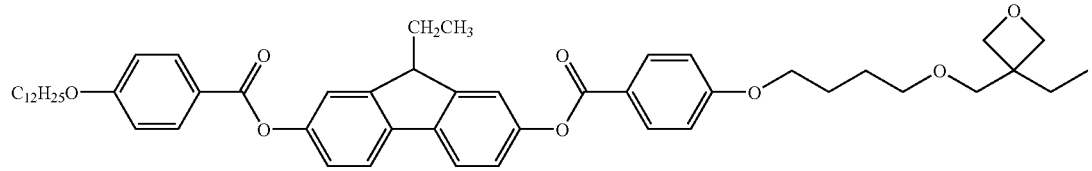
No. 68
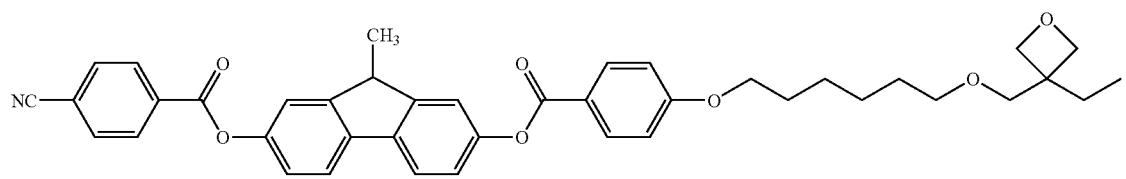
No. 69
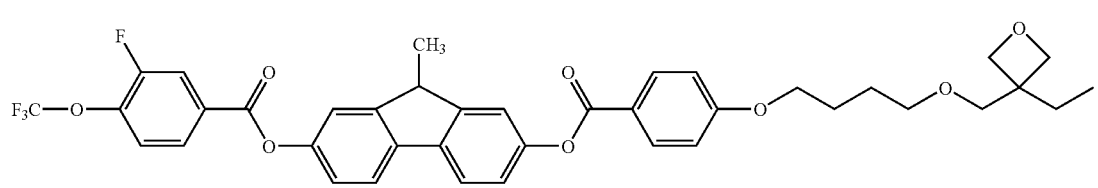
No. 70
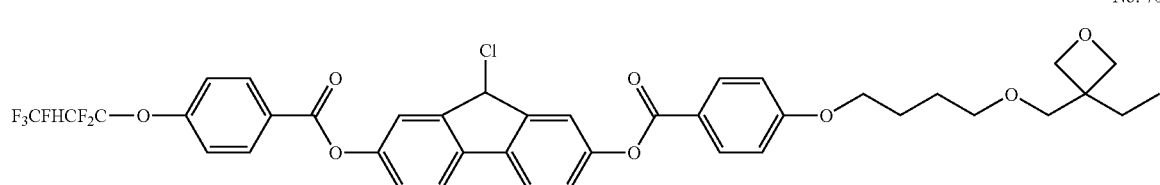
No. 71
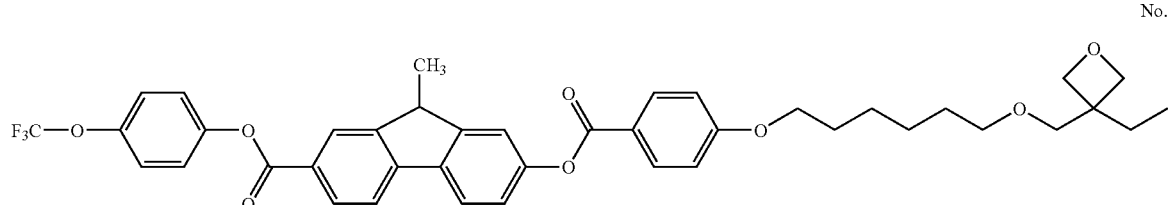
No. 72
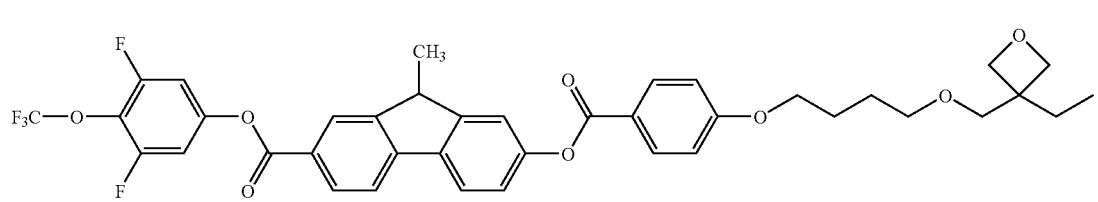
No. 73
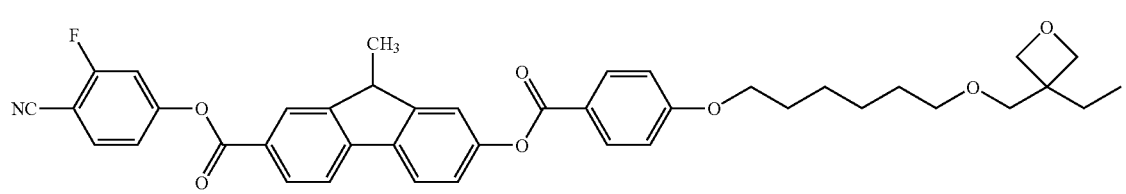
No. 74
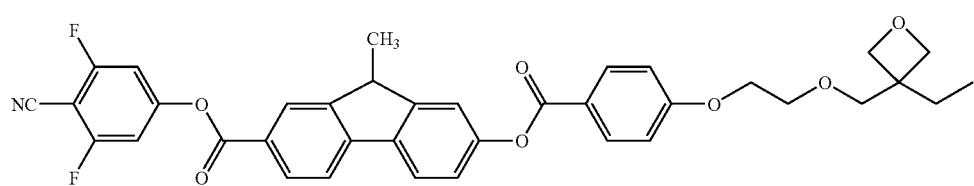

-continued
No. 75
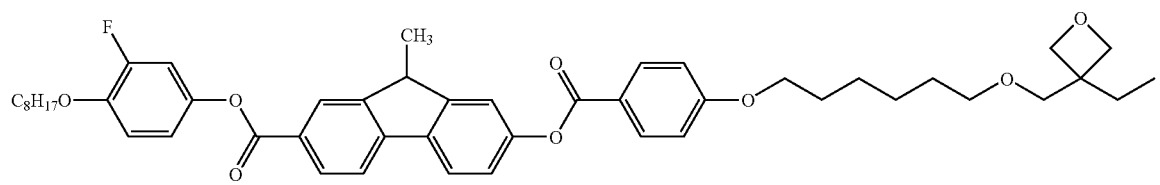
No. 76
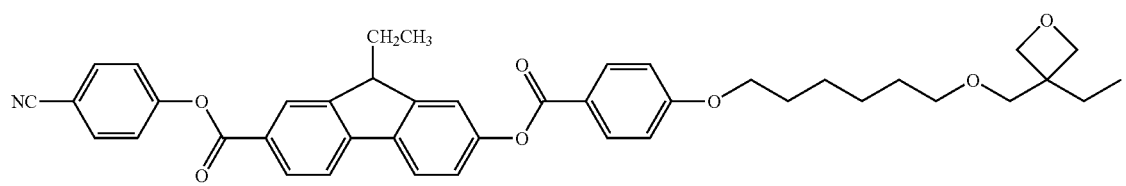
No. 77
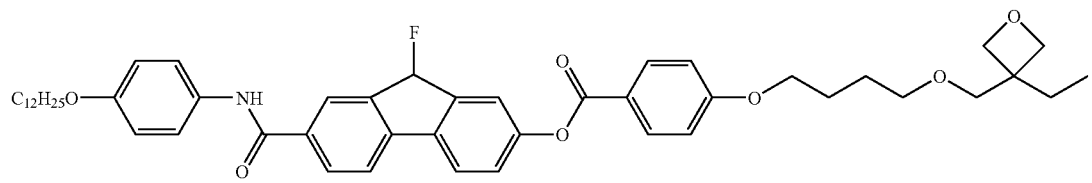
No. 78
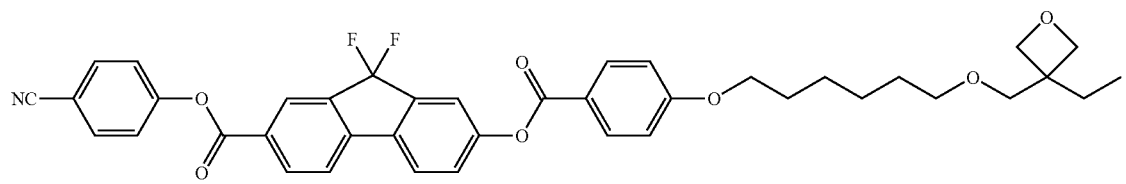
No. 79
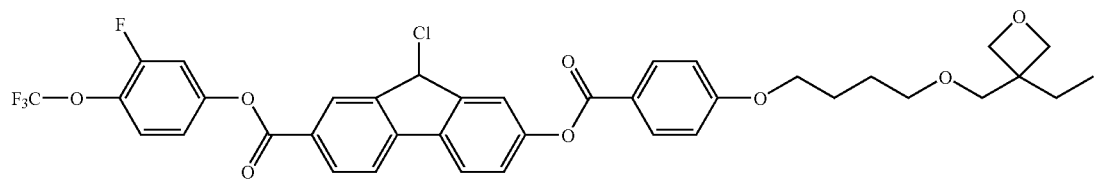
No. 80
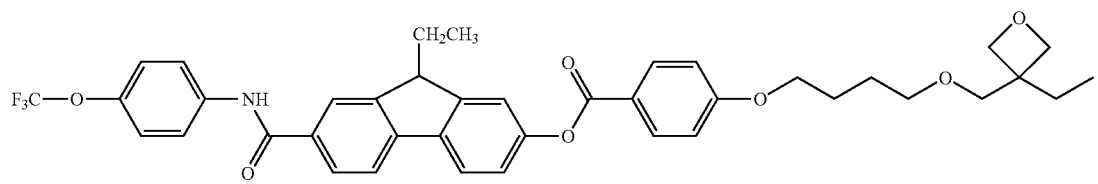
No. 81
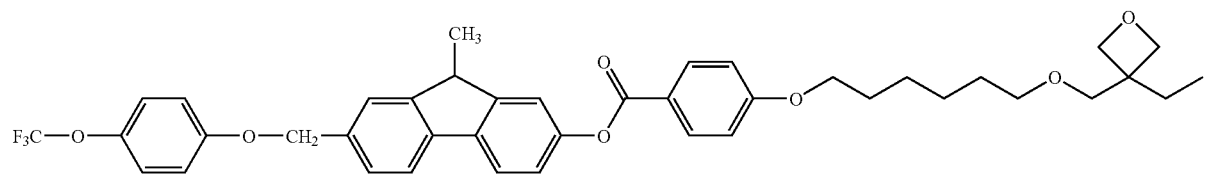

-continued
No. 82
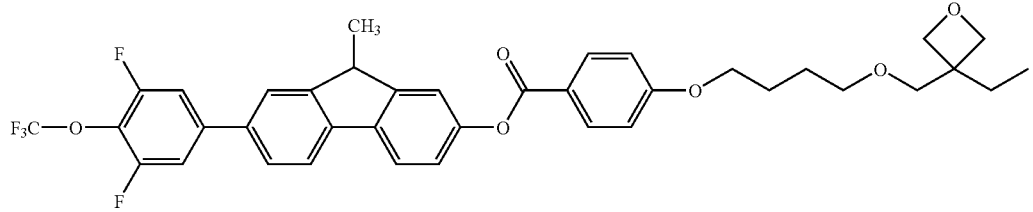
No. 83
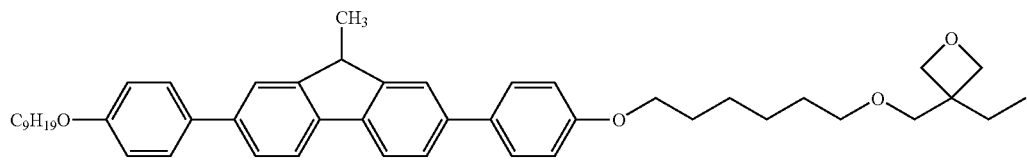
No. 84
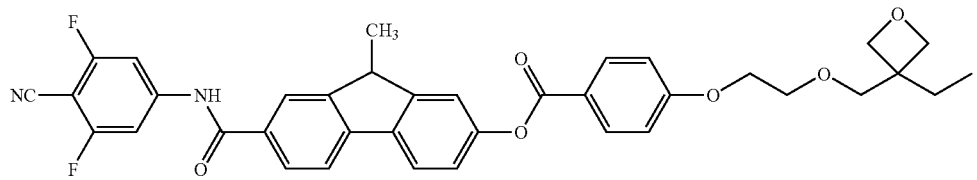
No. 85
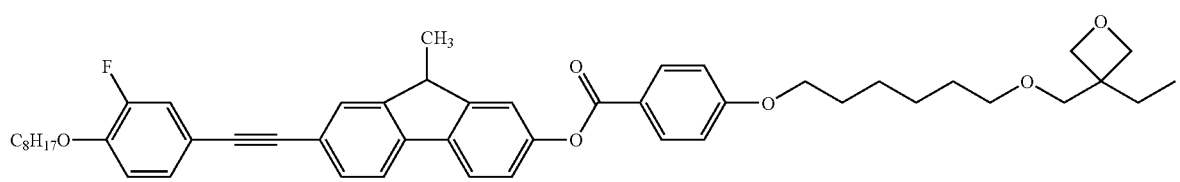
No. 86
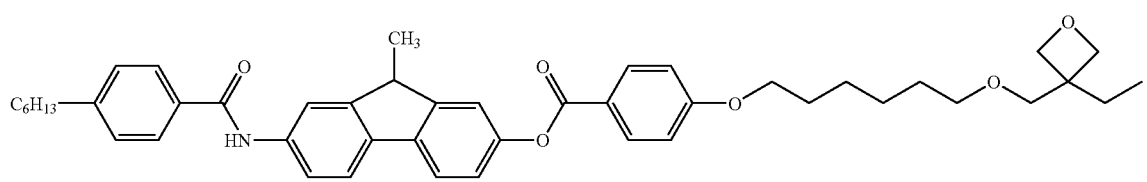
No. 87
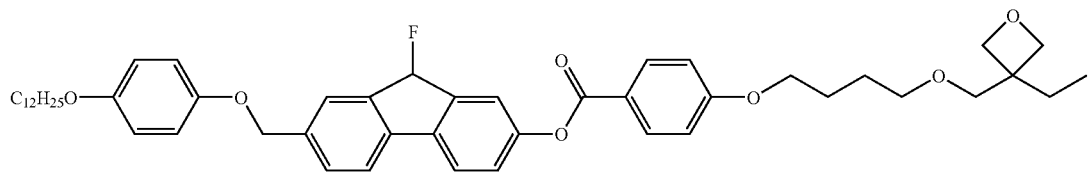
No. 88
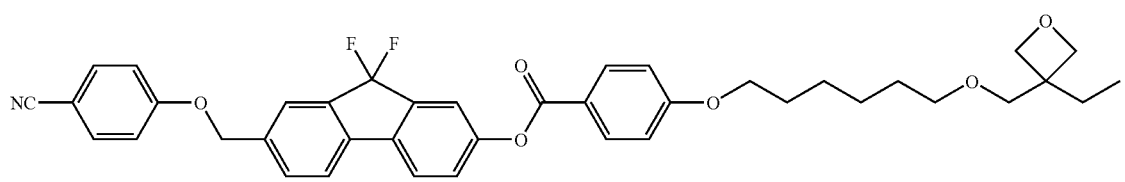
No. 89
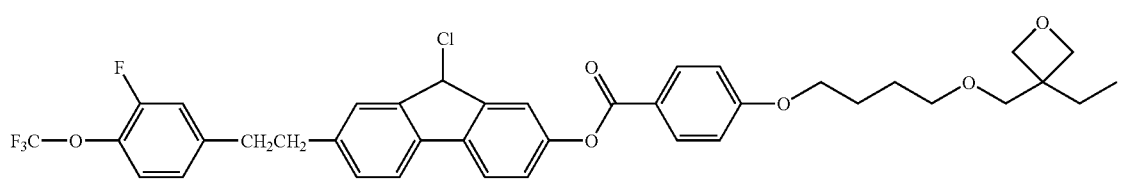

-continued
No. 90
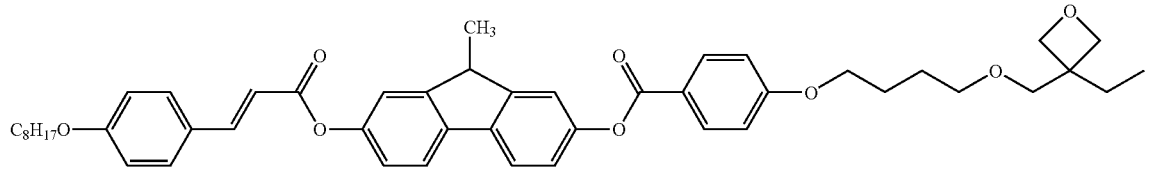
No. 91
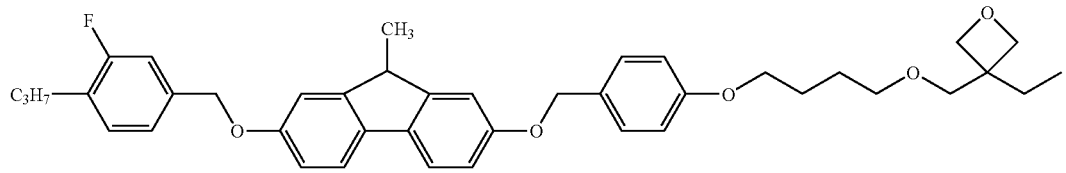
No. 92
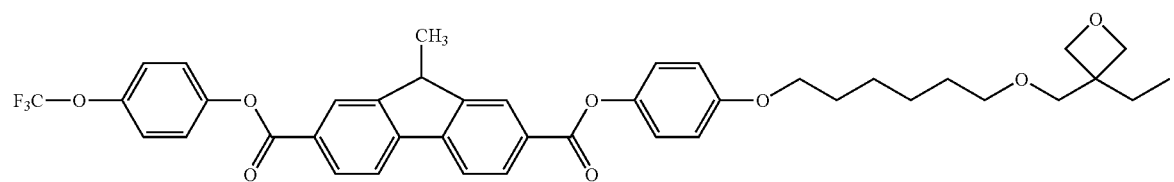
No. 93
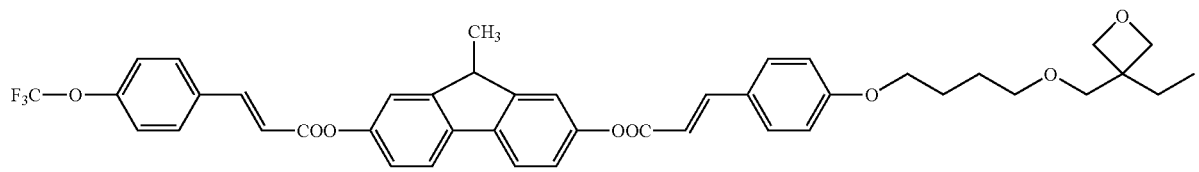
No. 94
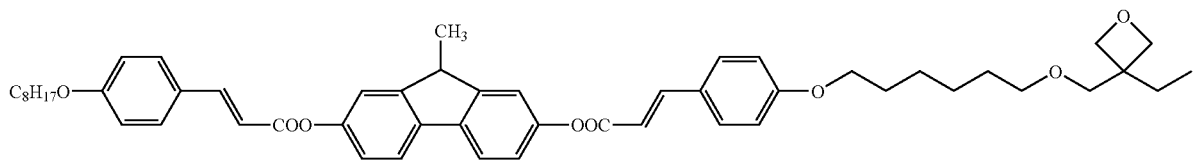
No. 95
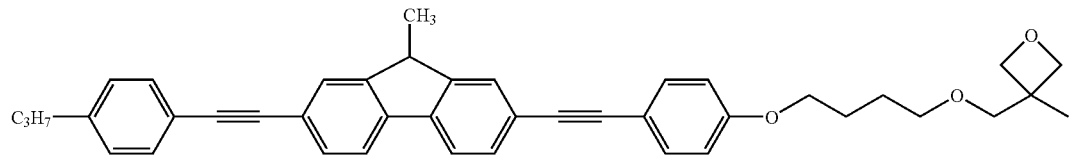
No. 96
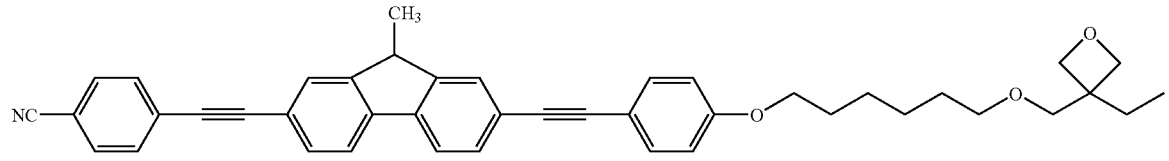
No. 97
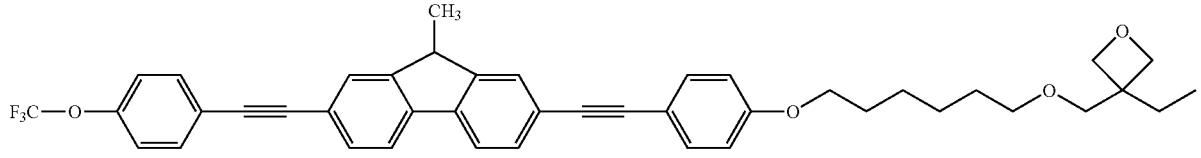

-continued
No. 98
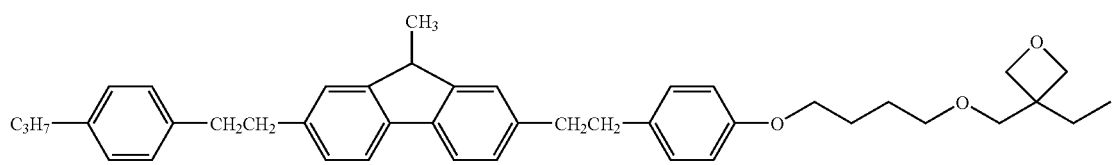
No. 99
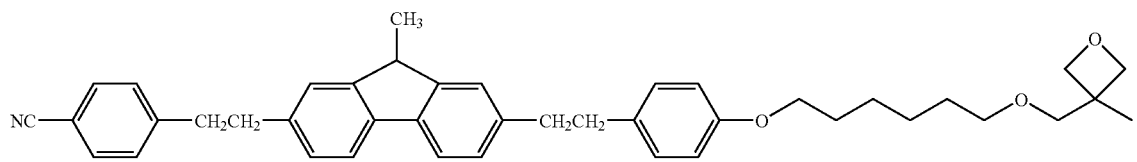
No. 100
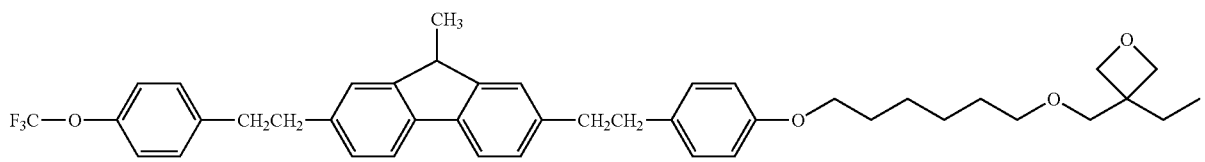
No. 101
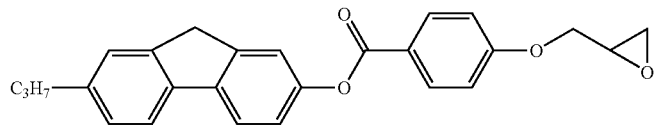
No. 102
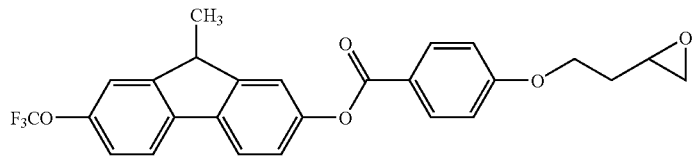
No. 103
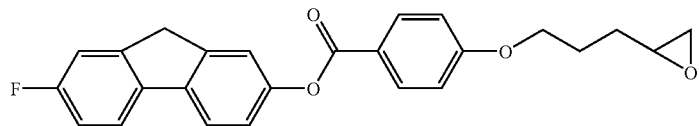
No. 104
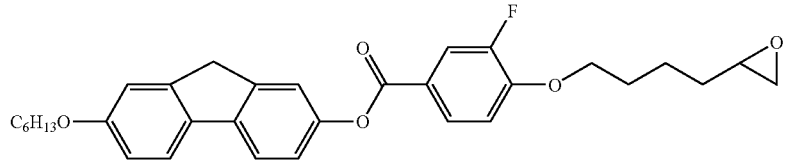
No. 105
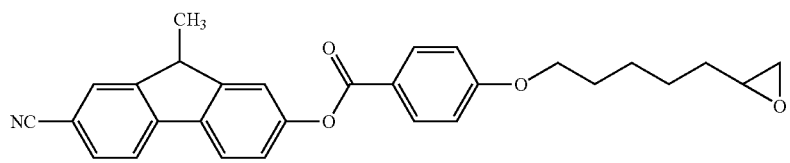
No. 106
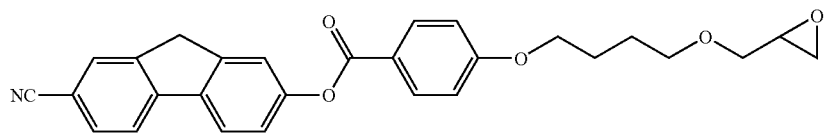

-continued
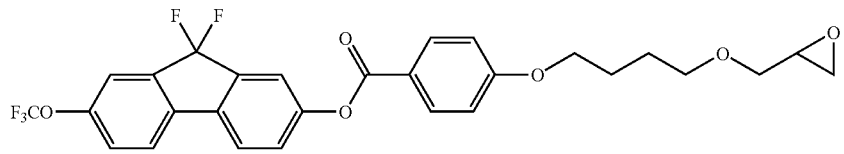
No. 107
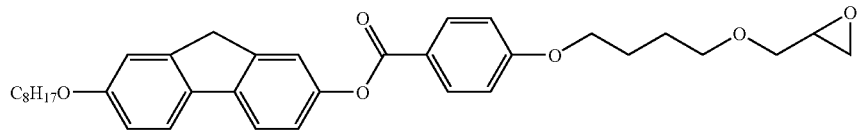
No. 108
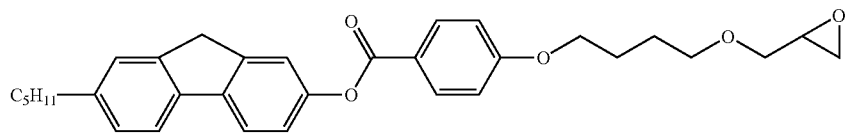
No. 109
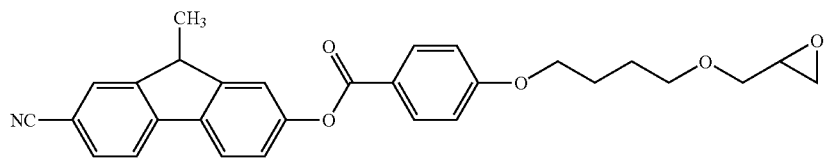
No. 110
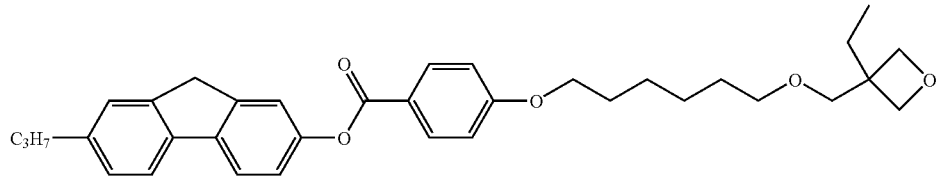
No. 111
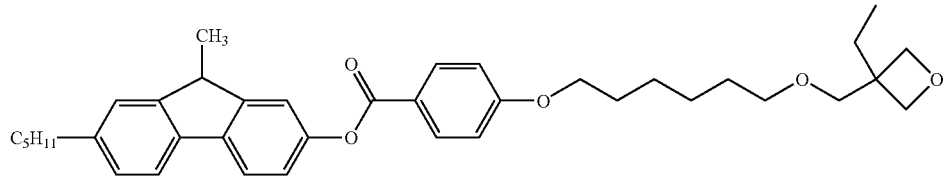
No. 112
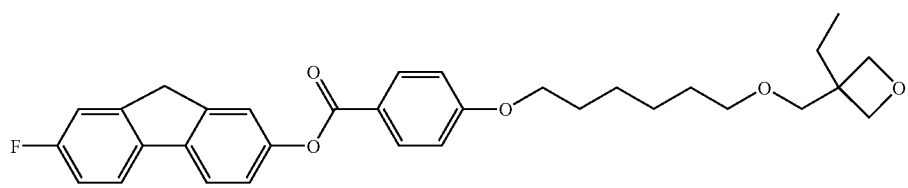
No. 113
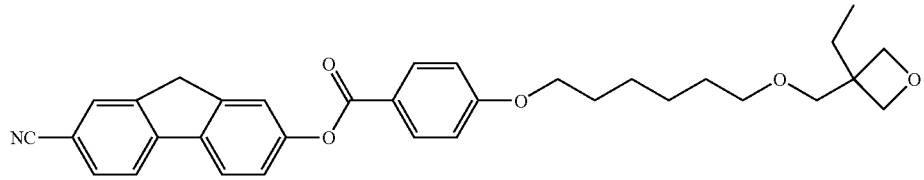
No. 114
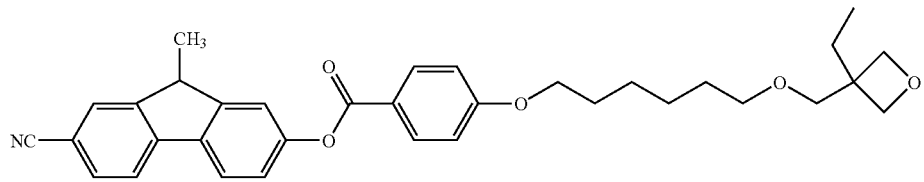
No. 115

-continued
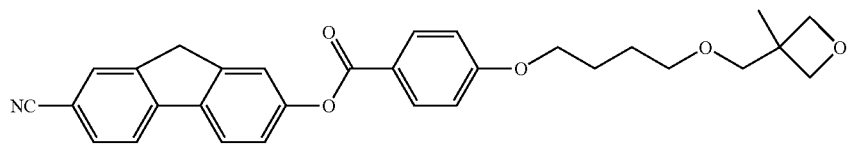
No. 116
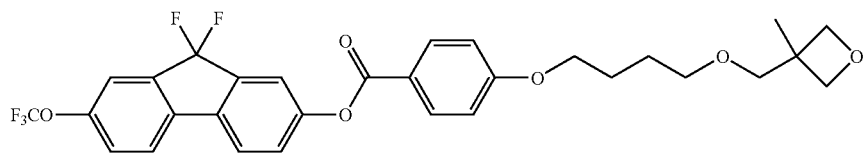
No. 117
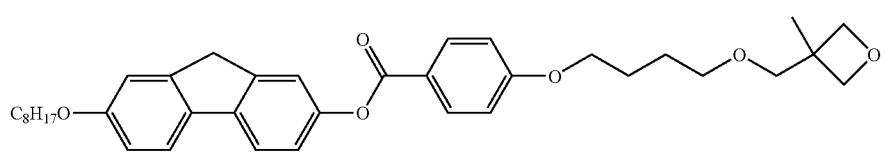
No. 118
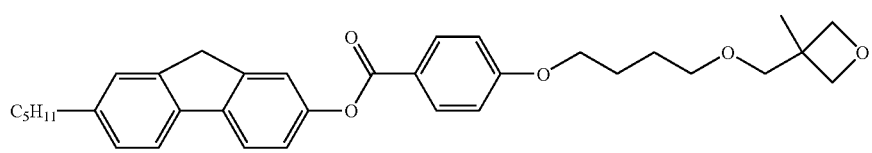
No. 119
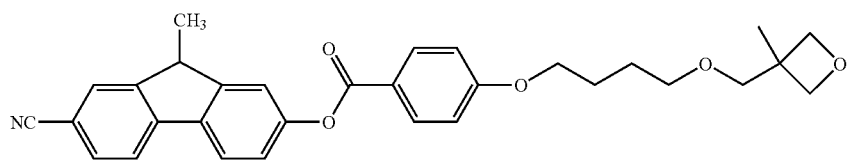
No. 120
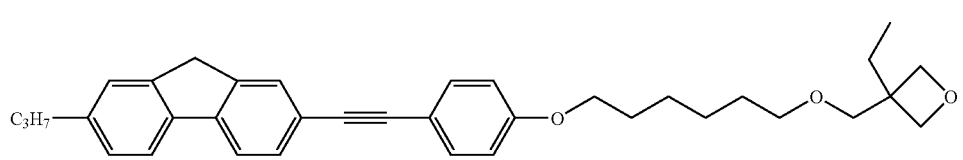
No. 121
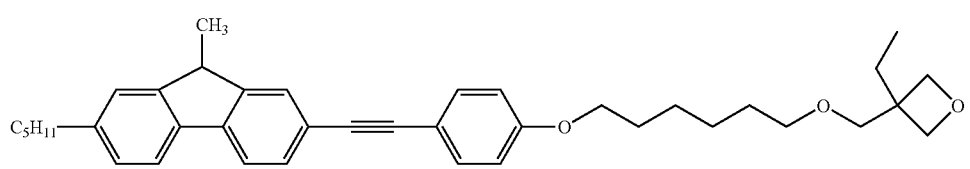
No. 122
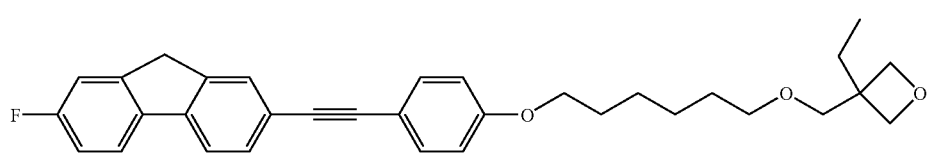
No. 123
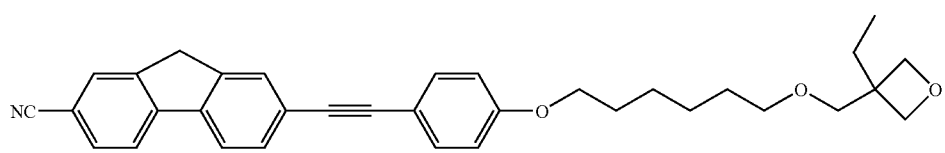
No. 124
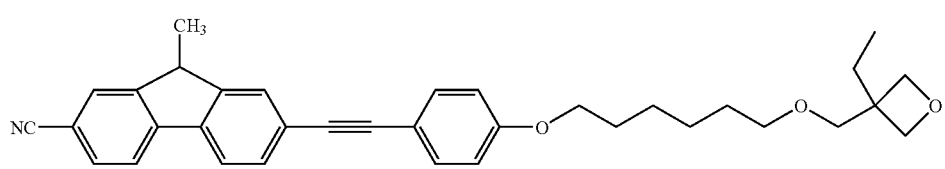
No. 125

-continued
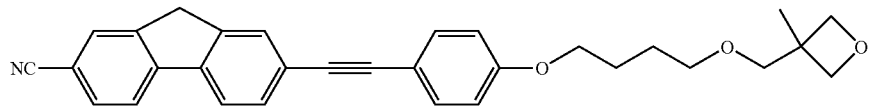
No. 126
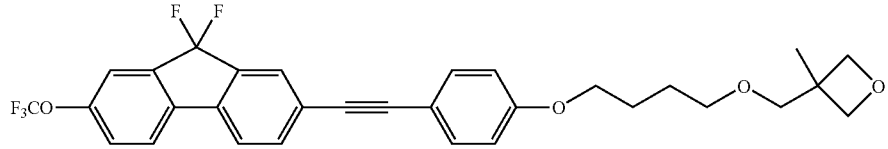
No. 127
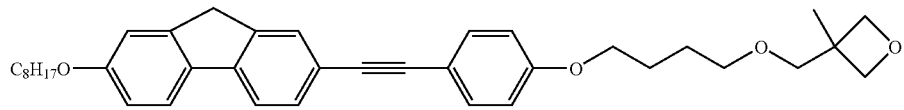
No. 128
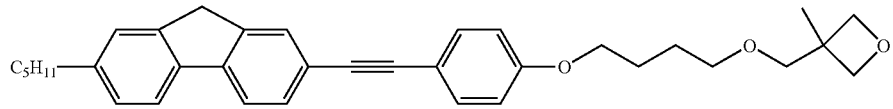
No. 129
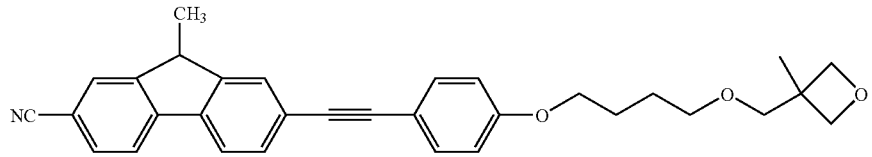
No. 130
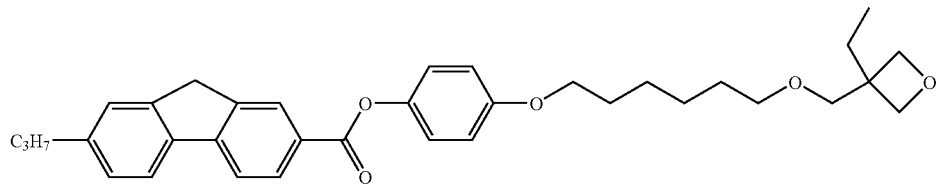
No. 131
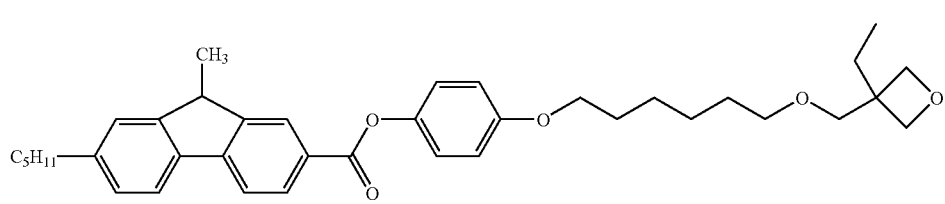
No. 132
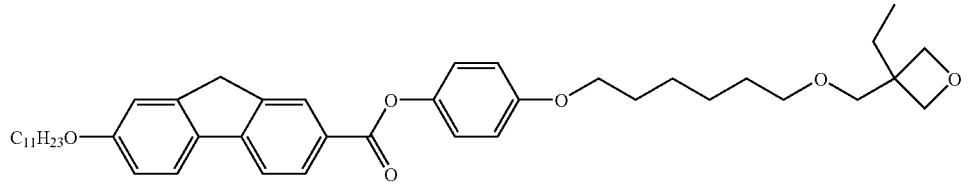
No. 133
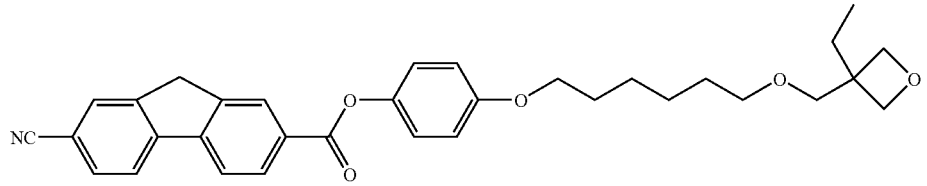
No. 134

-continued
No. 135
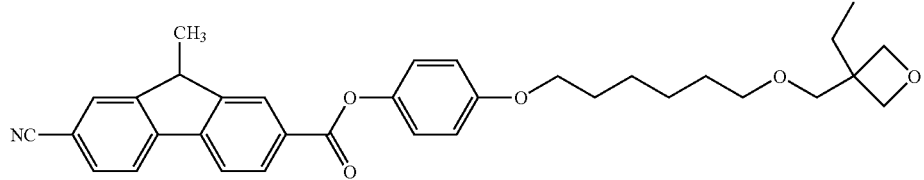
No. 136
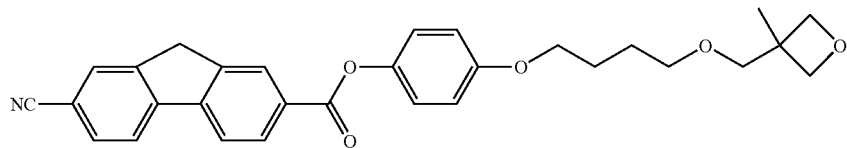
No. 137
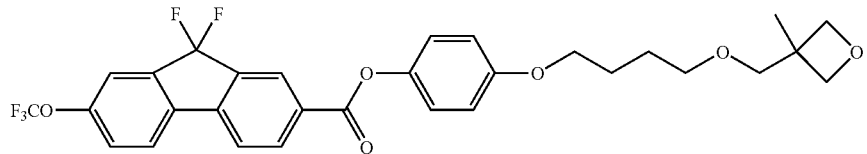
No. 138
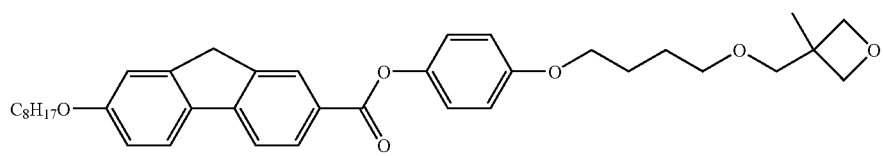
No. 139
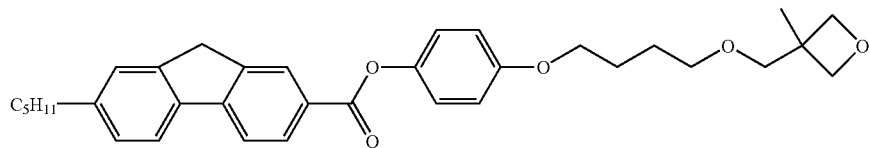
No. 140
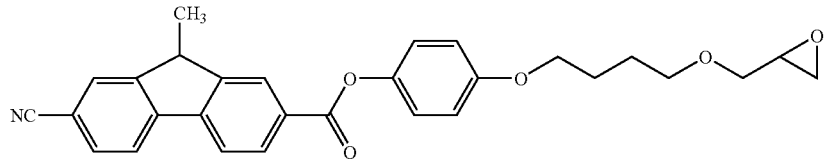
No. 141
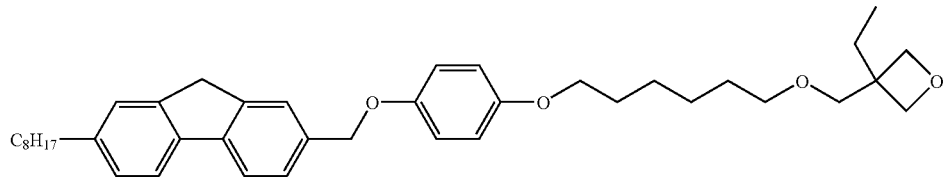
No. 142
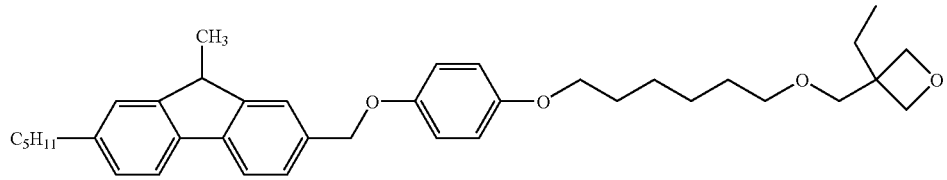
No. 143
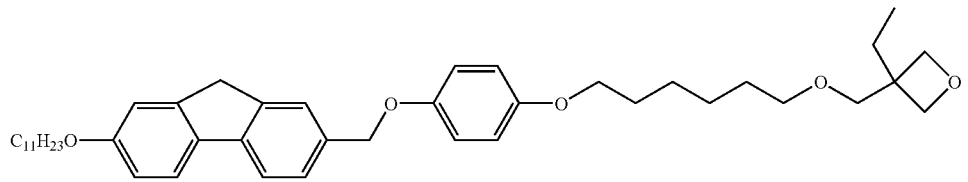

-continued
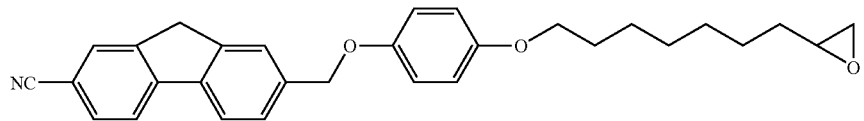
No. 144
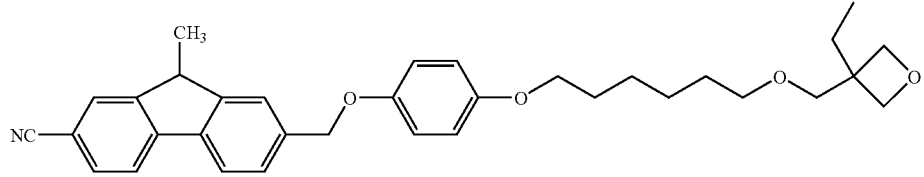
No. 145
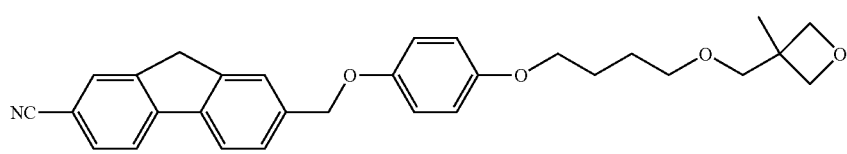
No. 146
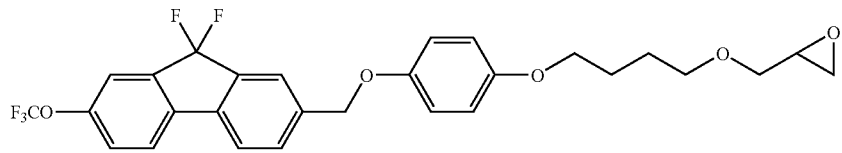
No. 147
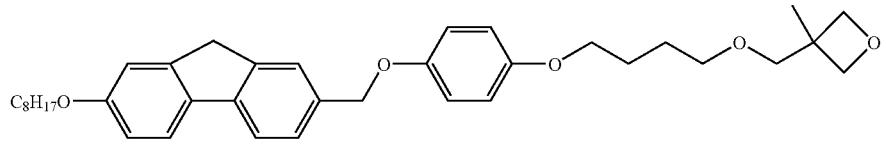
No. 148
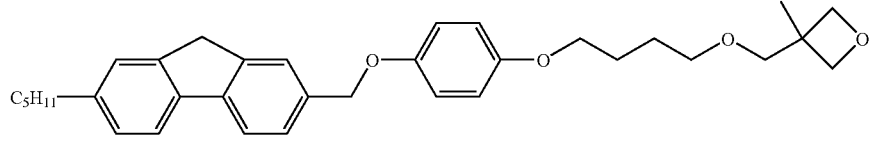
No. 149
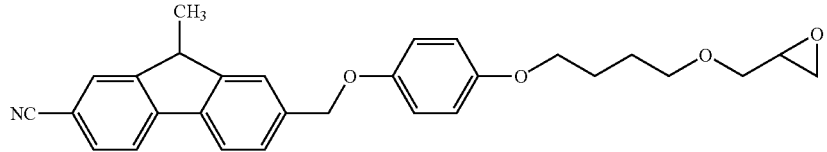
No. 150
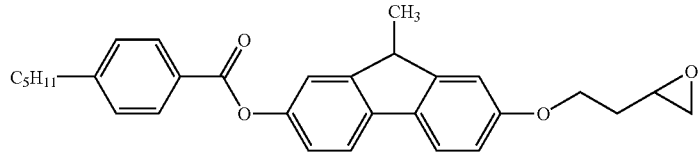
No. 151
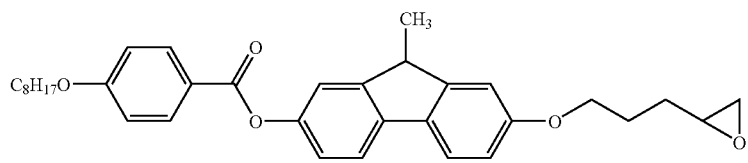
No. 152

-continued
No. 153
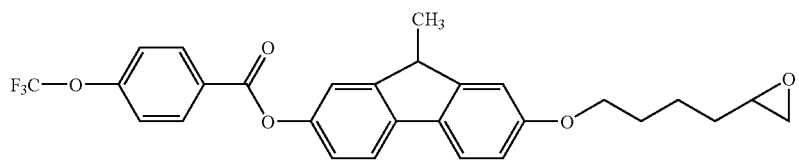
No. 154
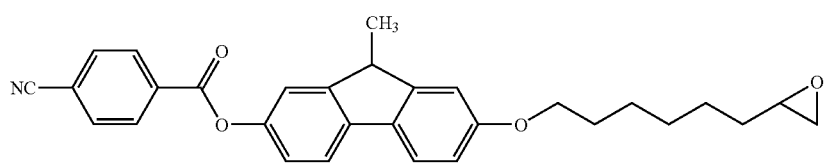
No. 155
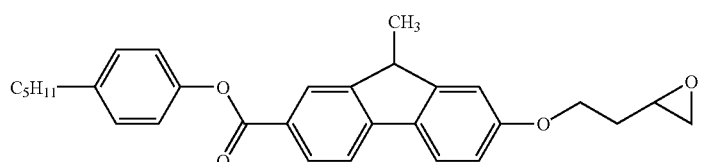
No. 156
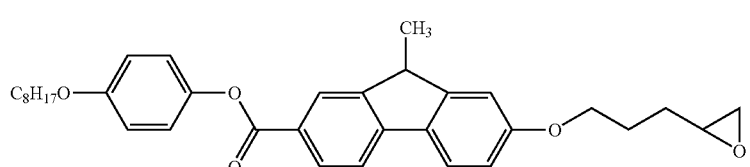
No. 157
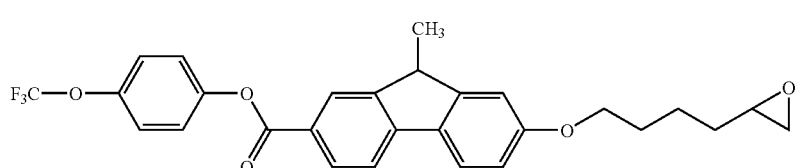
No. 158
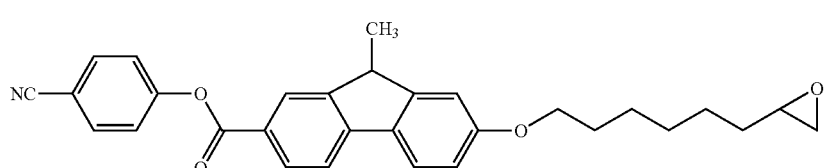
No. 159
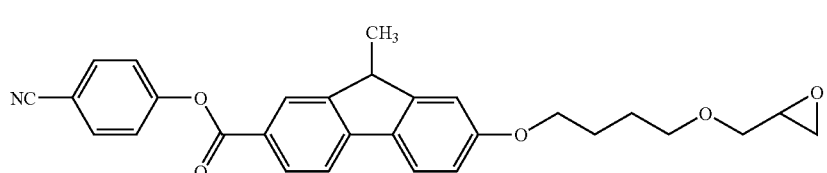
No. 160
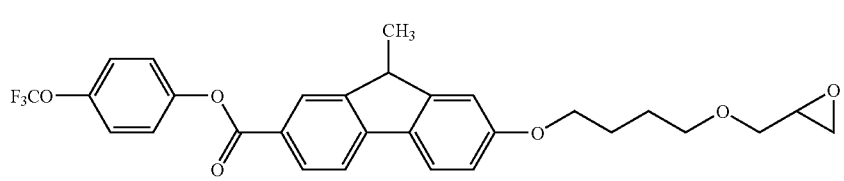

-continued
No. 161
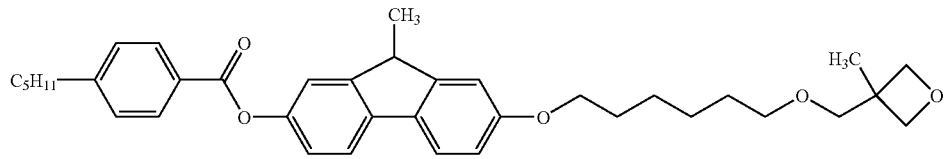
No. 162
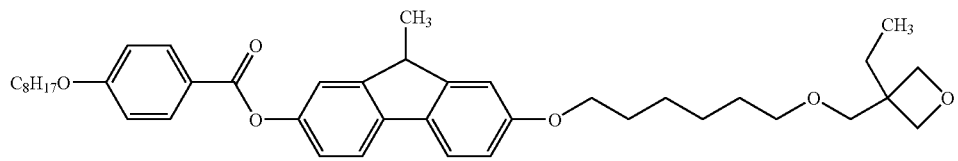
No. 163
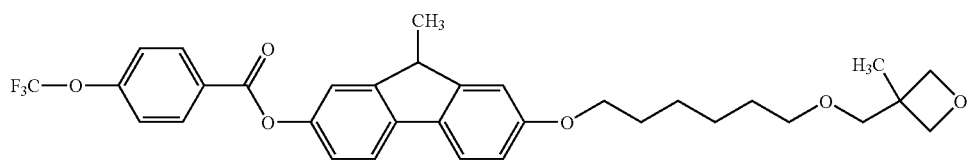
No. 164
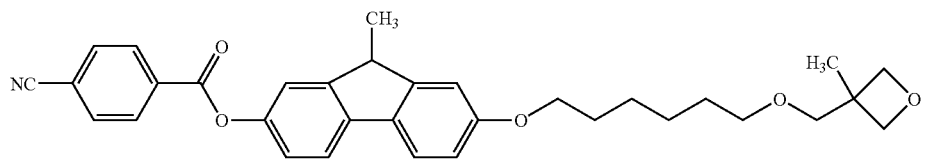
No. 165
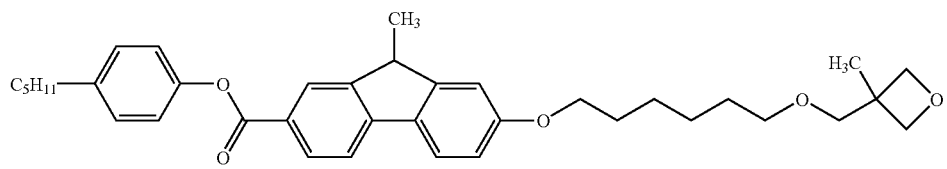
No. 166
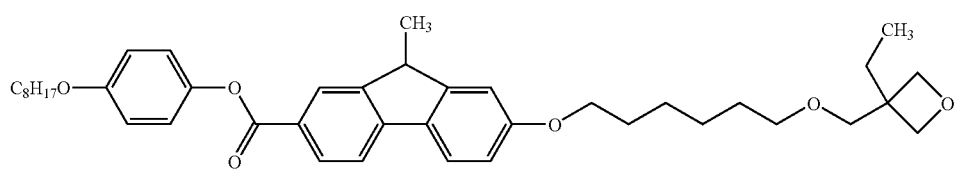
No. 167
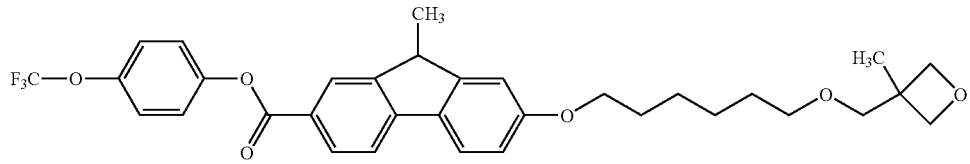
No. 168
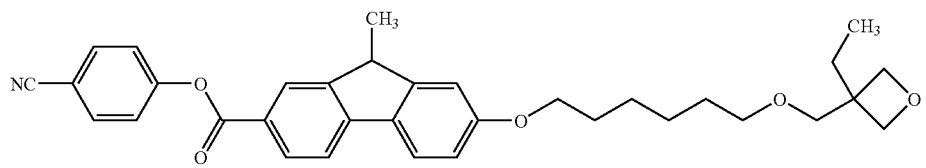
No. 169
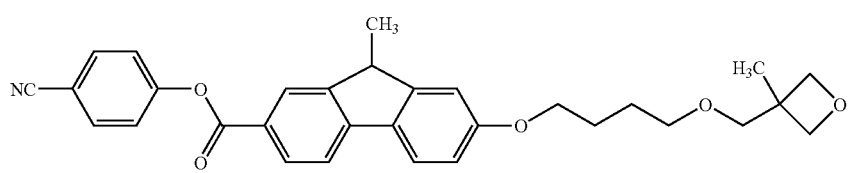

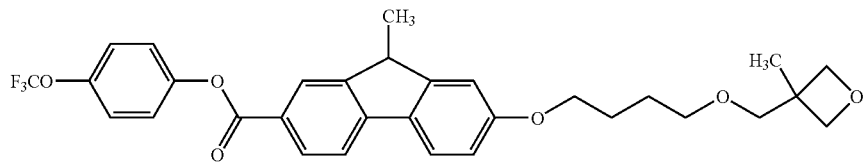
No. 170
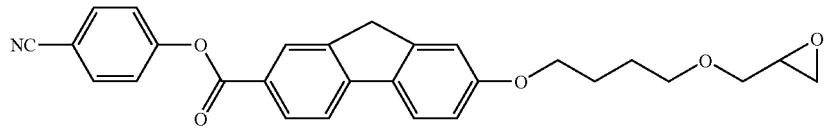
No. 171
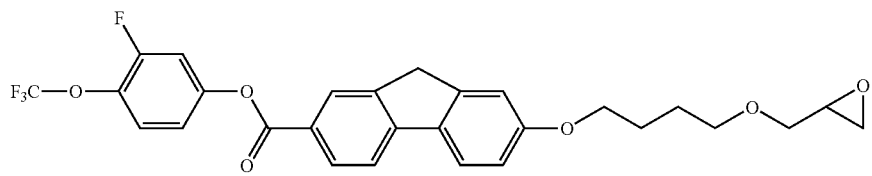
No. 172
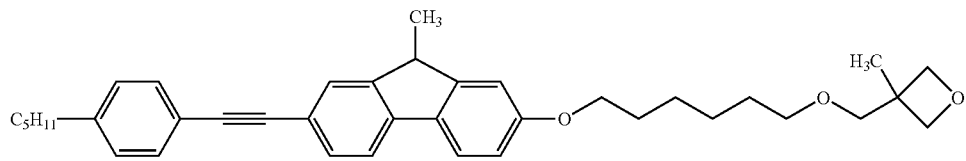
No. 173
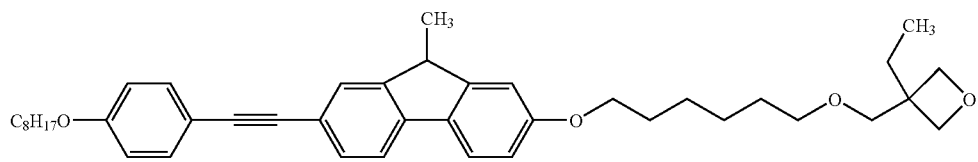
No. 174
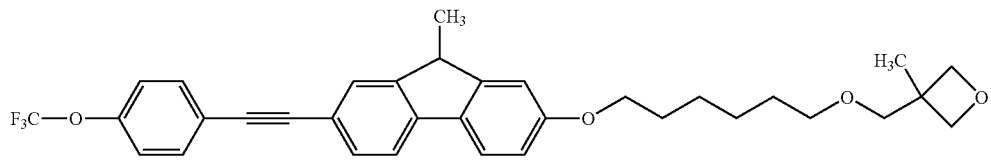
No. 175
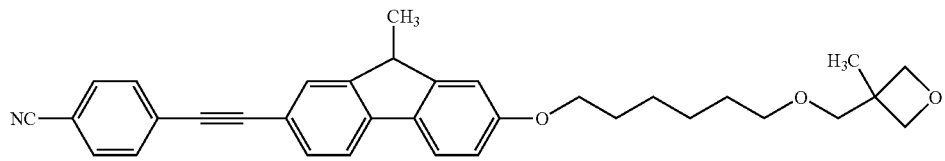
No. 176
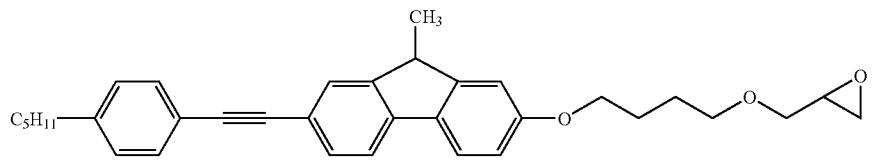
No. 177
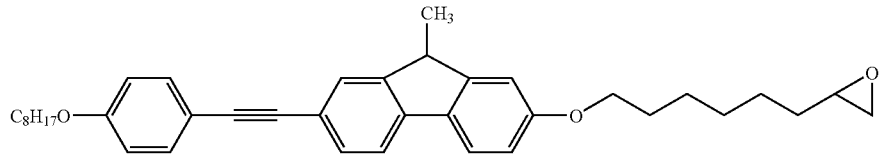
No. 178

-continued
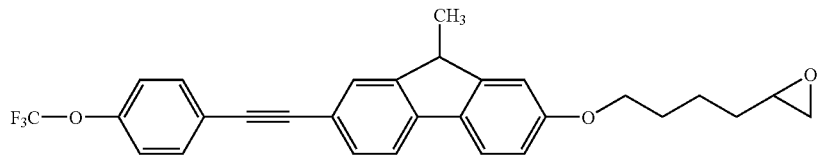
No. 179
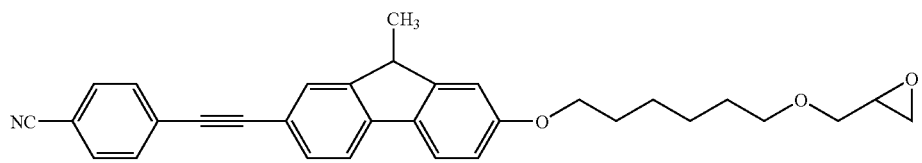
No. 180
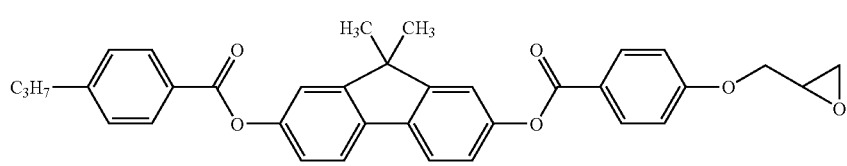
No. 181
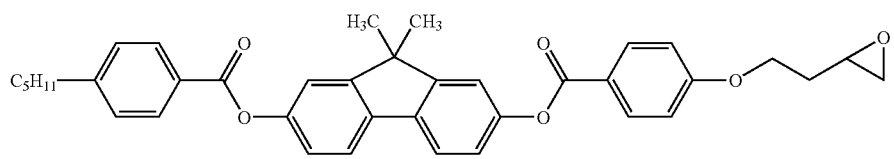
No. 182
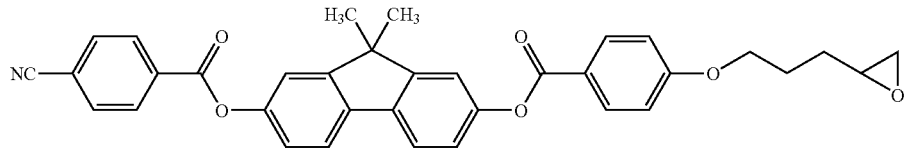
No. 183
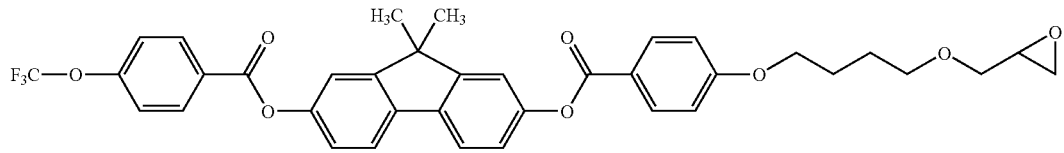
No. 184
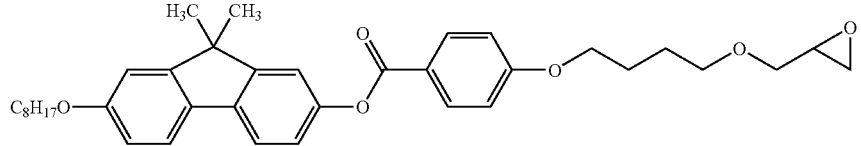
No. 185
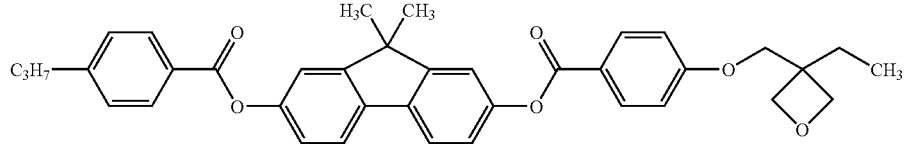
No. 186
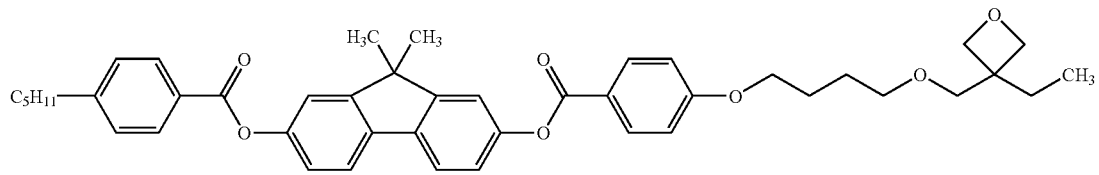
No. 187

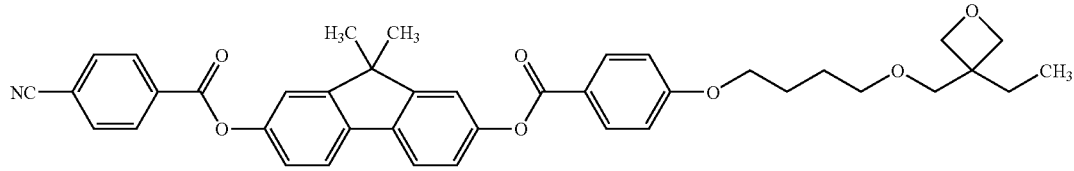

No. 188

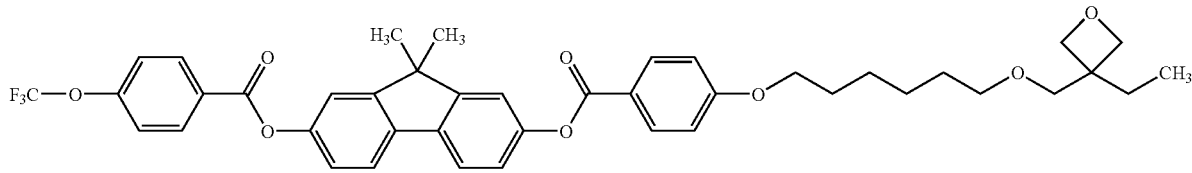

No. 189

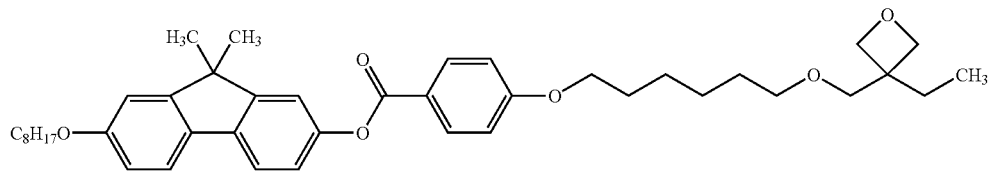

No. 190

Next, the compositions of the present invention shall be explained. The compositions contain at least one of the compounds of formulae (1) and (2) as the first component. Usually, the compositions include a mixture of at least two compounds, but even if it contains a single compound of formula (1) or a single compound of formula (2), it shall be referred to as the composition. This is because a polymerization catalyst and so forth are added to one compound for a polymerization, one compound is diluted with a solvent to prepare a thin film, and so forth. A polymer having an optical anisotropy is obtained by polymerizing the composition containing the first component. The polymerizable compound in this composition may be limited to the first component. This composition may contain both the first component and other polymerizable compounds that are different from the first component. This composition is classified into the following compositions A, B, C, D, and so forth. The composition A contains one compound selected from the group of the compounds of formulae (1) and (2). The composition B contains at least two compounds selected from the group of the compounds of formulae (1) and (2). The composition C contains at least one compound selected from the group of the compounds of formulae (1) and (2) as the first component and at least one other polymerizable compounds as the second component. The composition D is the composition A, B or C further containing a non-polymerizable compound.

The "other polymerizable compound" is a polymerizable compound (monomer) which is different from the compounds of formulae (1) and (2). The other polymerizable compound is used as the second component for the composition C. This second component is useful for improving and modifying the characteristics of the polymer obtained. This second component may be optically non-active or may be optically active. This second component may have liquid-crystallinity or may have non-liquid-crystallinity. The second component may be mixed with the same kind of compounds or may combined with different kind of compounds. The preferred examples of such polymerizable compounds are compounds having an oxiranyl group, an oxetanyl group, a vinyloxy group (—OCH═CH$_2$), a vinyl group (—CH═CH$_2$), an acryloyloxy group (—OCOCH═CH$_2$), a methacryloyloxy group (—OCOC(CH$_3$)═CH$_2$), and so forth. One example of these compounds is described in JP H8-003111 A/1996 and so forth. The example of the preferred second component is a liquid crystal compound, an optically active compound, and so forth. The preferred example of the liquid crystal compound is the compounds (M1) to (M6) which have already been described. The preferred example of an optically active compound is the compounds (OP1) to (OP14) described later.

The preferred composition C is exemplified. The initial example is the composition C containing at least one of the compounds of formulae (1) and (2) as the first component, and at least one of the compounds (M1) to (M6) as the second component. The compound of the second component has a polymerizable group suited for copolymerizing with the compounds of formulae (1) and (2). The preferred compounds (M1) to (M6) are compounds (M1a) to (M6f).

(M1a)

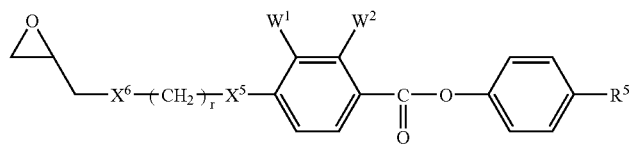

-continued
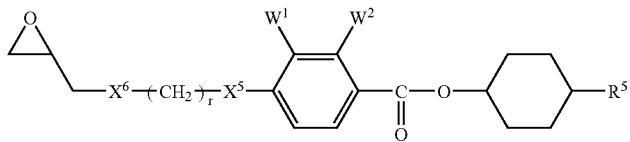
(M1b)
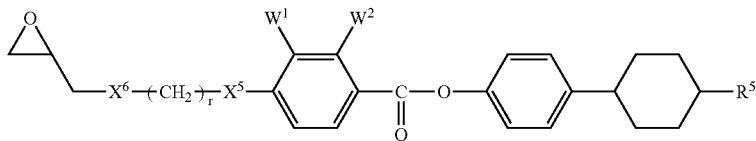
(M1c)
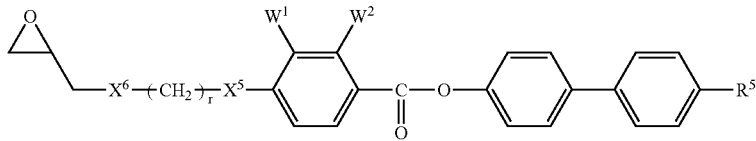
(M1d)
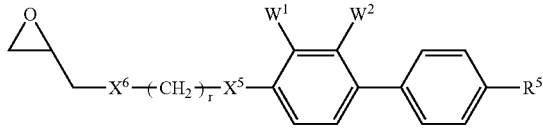
(M1e)
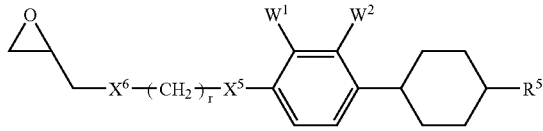
(M1f)
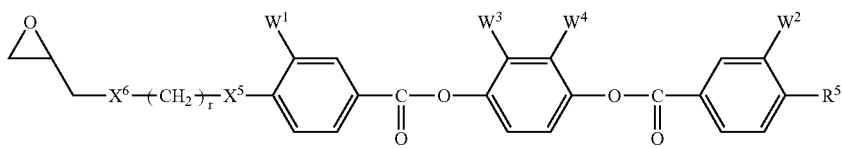
(M1g)
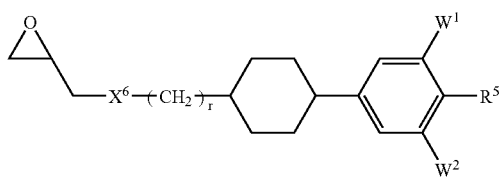
(M1h)
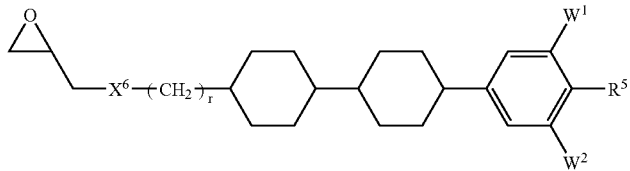
(M1i)
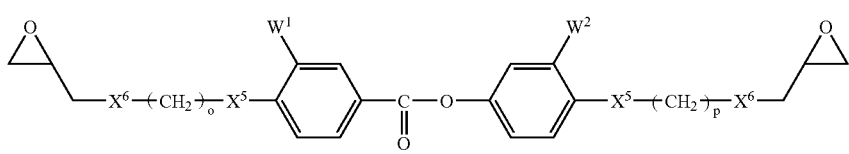
(M2a)
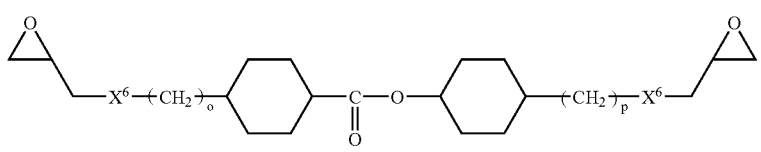
(M2b)

-continued
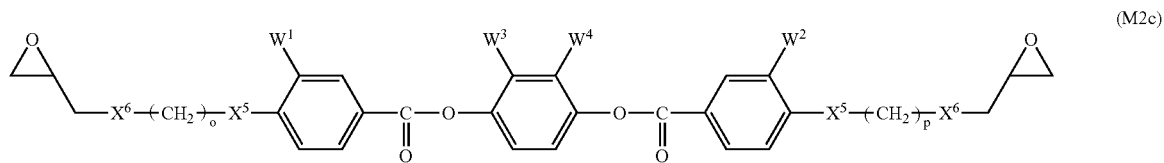
(M2c)
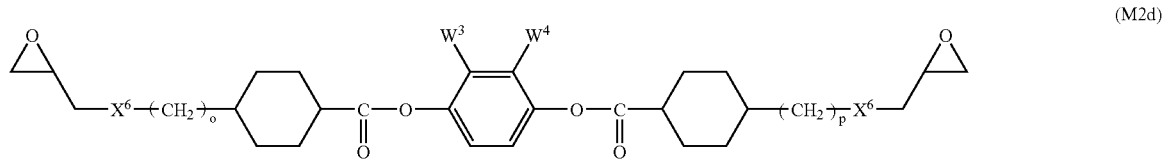
(M2d)
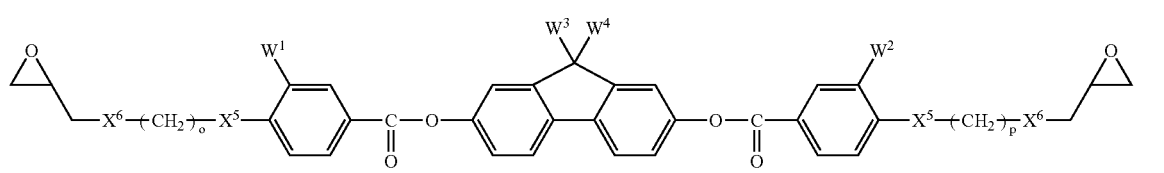
(M2e)
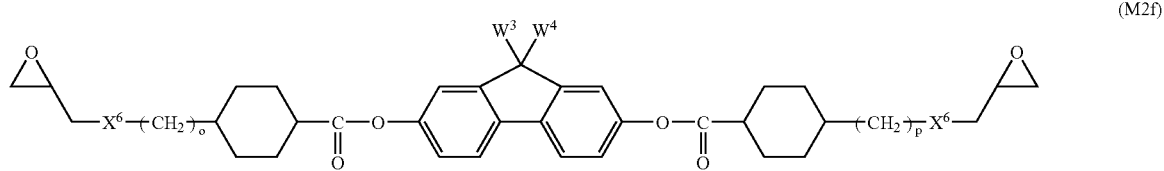
(M2f)
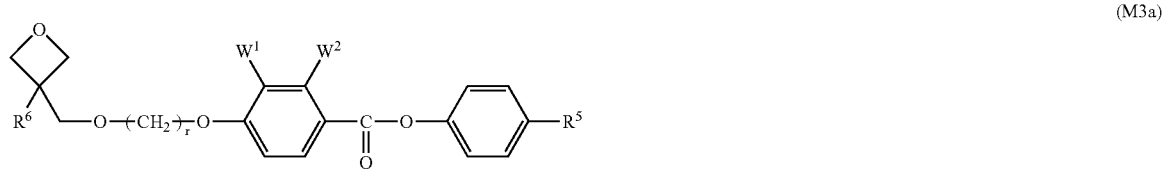
(M3a)
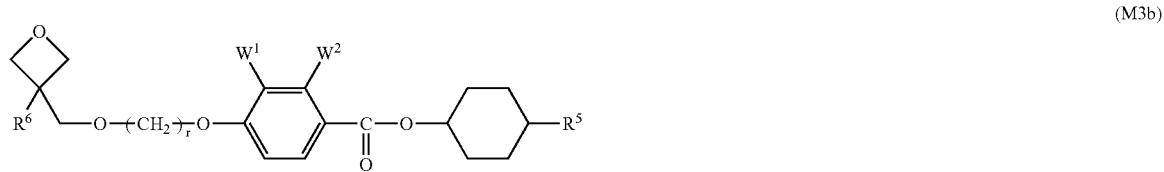
(M3b)
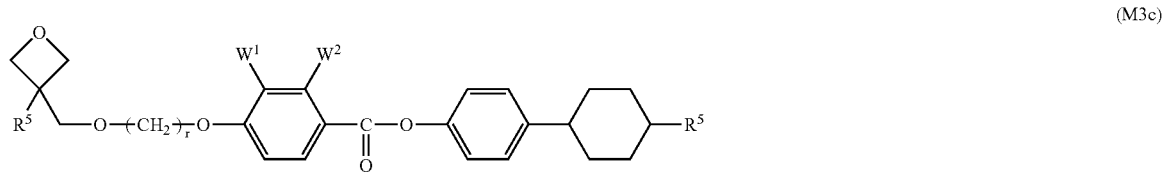
(M3c)
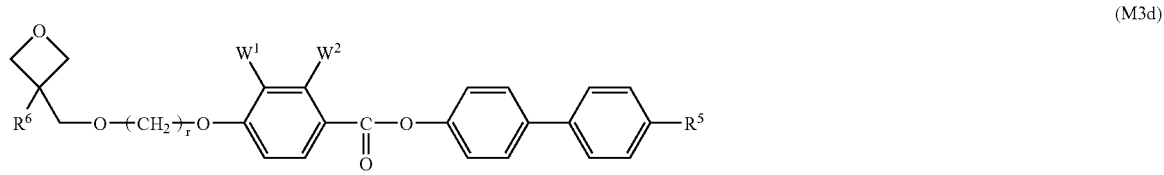
(M3d)
(M3e)

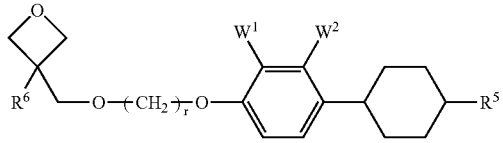
(M3f)
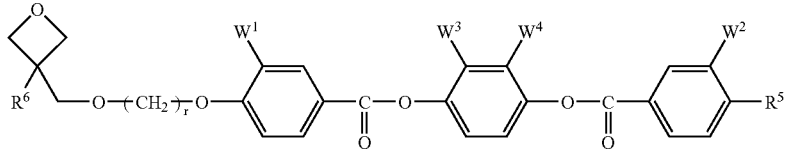
(M3g)
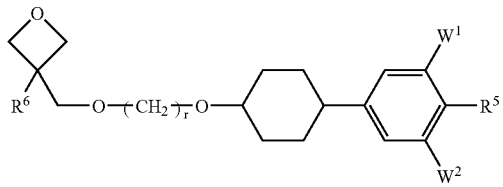
(M3h)
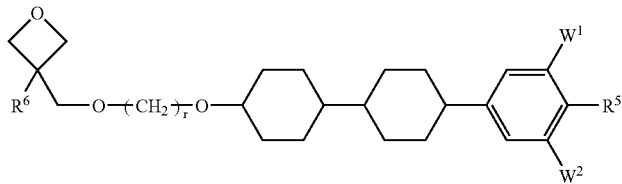
(M3i)
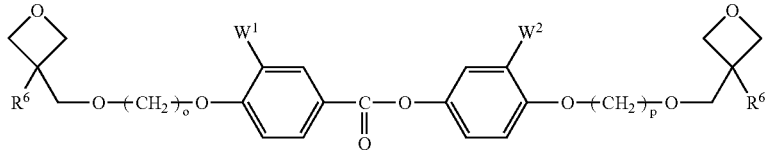
(M4a)
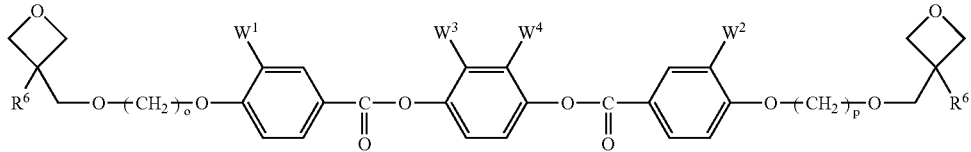
(M4b)
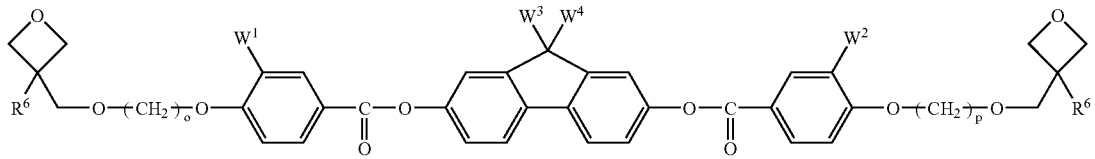
(M4c)
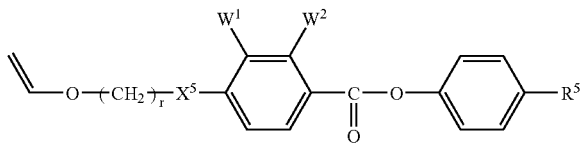
(M5a)
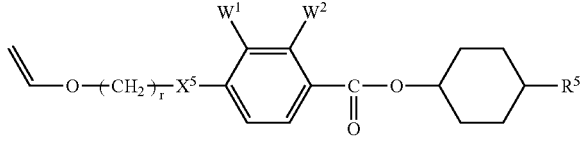
(M5b)

-continued
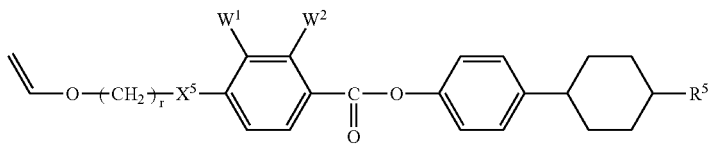
(M5c)
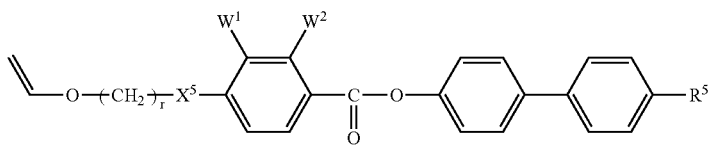
(M5d)
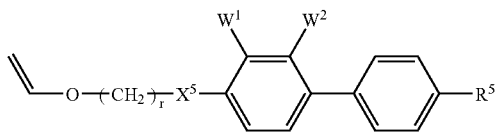
(M5e)
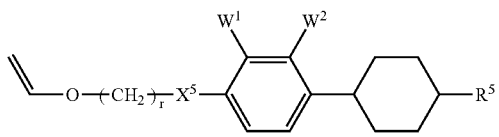
(M5f)
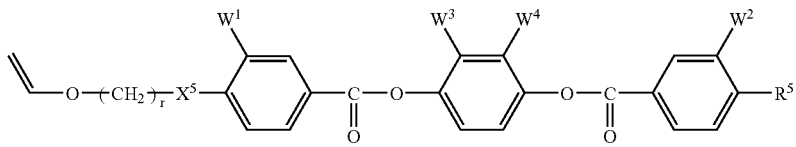
(M5g)
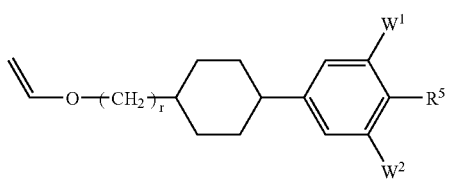
(M5h)
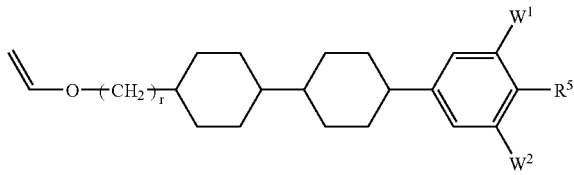
(M5i)
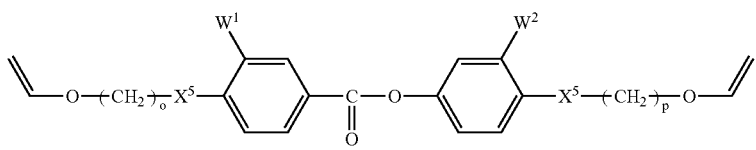
(M6a)
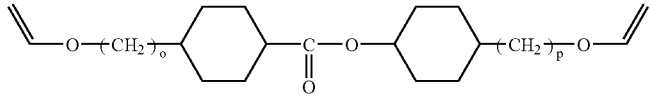
(M6b)
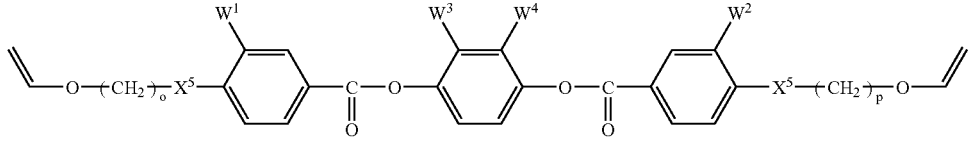
(M6c)

-continued

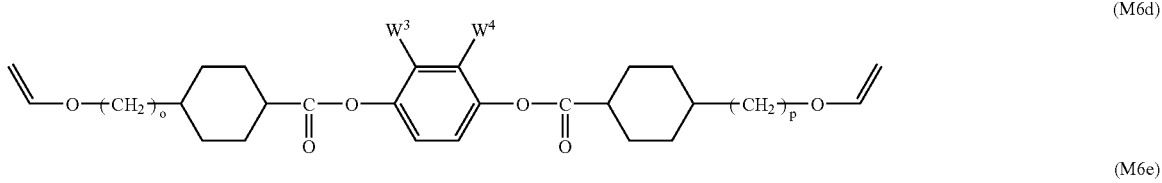
(M6d)

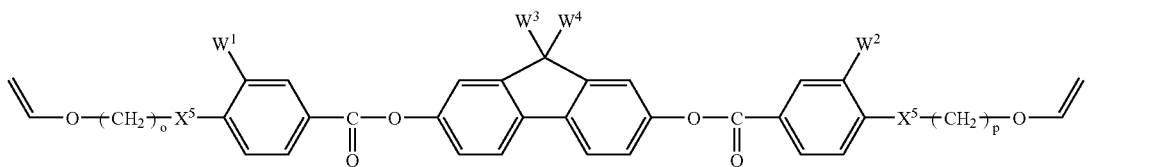
(M6e)

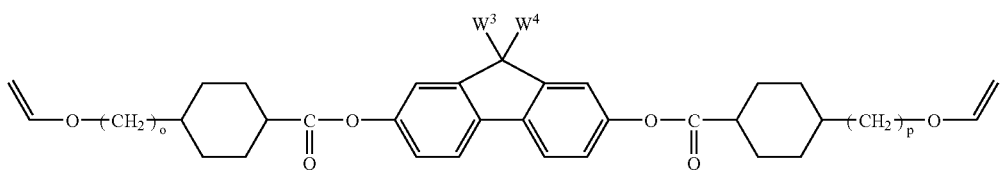
(M6f)

In the above formulae, $R^5$ is hydrogen, fluorine, chlorine, cyano, trifluoromethoxy, alkyl having 1 to 20 carbons or alkoxy having 1 to 20 carbons; $R^6$ is hydrogen or alkyl having a carbon number of 1 to 5; $W^1$ and $W^2$ are independently hydrogen, chlorine, fluorine, or cyano; $W^3$ and $W^4$ are independently hydrogen, chlorine, fluorine, cyano, methyl, ethyl, propyl, or trifluoromethyl; $X^5$ and $X^6$ are independently a single bond or —O—; and o and p are independently an integer of 1 to 20.

When the first component is at least one of the compounds (3) to (8) and the second component is at least one of the compounds (M1) to (M6), the examples of the preferred combinations thereof are compositions (C1) to (C12). The preferred compositions are summarized in Table 1. The compounds (M1) to (M6) are convenient for controlling characteristics such as a temperature range, a viscosity of a liquid crystal phase, orientation of the liquid crystal phase, and so forth in the composition, and characteristics such as a paint film forming property, a mechanical strength, an adhesion to a supporting substrate, and so forth in the polymer.

In such composition C, a ratio of the first component and the second component is in the following. The preferred ratio is that the first component is in the range of approximately 5% to approximately 95% by weight and the second component is in the range of approximately 5% to approximately 95% by weight. More preferred ratio is that the first component is in the range of approximately 20% to approximately 90% by weight and the second component is in the range of approximately 20% to approximately 80% by weight. The particularly preferred ratio is in the range of approximately 40% to approximately 80% by weight and the second component is in the range of approximately 20% to approximately 80% by weight.

TABLE 1

| Composition | Compound of First Component | Compound of Second Component |
|---|---|---|
| Composition C1 | (3), (5) or (7) | (M2) |
| Composition C2 | (3), (5) or (7) | (M4) |

TABLE 1-continued

| Composition | Compound of First Component | Compound of Second Component |
|---|---|---|
| Composition C3 | (3), (5) or (7) | (M6) |
| Composition C4 | (3), (5) or (7) | (M1) or (M2) |
| Composition C5 | (3), (5) or (7) | (M3) or (M4) |
| Composition C6 | (3), (5) or (7) | (M5) or (M6) |
| Composition C7 | (4), (6) or (8) | (M2) |
| Composition C8 | (4), (6) or (8) | (M4) |
| Composition C9 | (4), (6) or (8) | (M6) |
| Composition C10 | (4), (6) or (8) | (M1) or (M2) |
| Composition C11 | (4), (6) or (8) | (M3) or (M4) |
| Composition C12 | (4), (6) or (8) | (M5) or (M6) |

The compositions (C1) to (C12) have the following characteristics:

1. Polymers are readily obtained by irradiating the compositions with UV rays in the presence of a suitable photocationic polymerization catalyst.
2. The polymerization proceeds not only under an atmosphere of nitrogen but also even in the air.
3. When polymers (films) are obtained from the compositions, the sizes thereof are less liable to be reduced. Among the compositions (C1) to (C12), the particularly preferred examples are the compositions (C2), (C5), (C7), and (C10).
4. The polymerization is fast, and films having a high molecular weight are obtained in a short time.
5. Films having an excellent dimensional stability are obtained.
6. Films having an excellent heat resistance are obtained.

Next example is the composition C containing at least one of the compounds (1) and (2) as the first component, and an optically active polymerizable compound as the second component. The second component induces a helical structure to a liquid crystal phase. The second component is preferred to be the compounds having a large helical twist power. The examples of the optically active polymerizable compound are compounds (OP1) to (OP14).

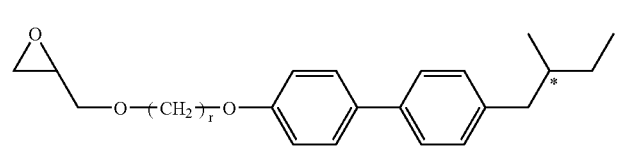
(OP1)
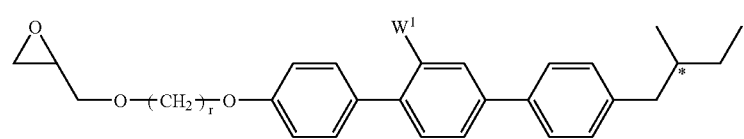
(OP2)
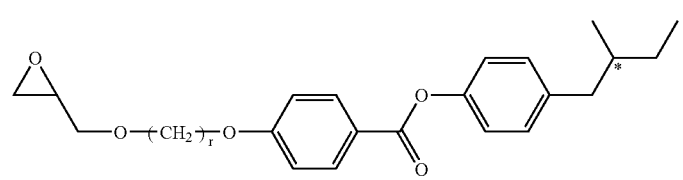
(OP3)
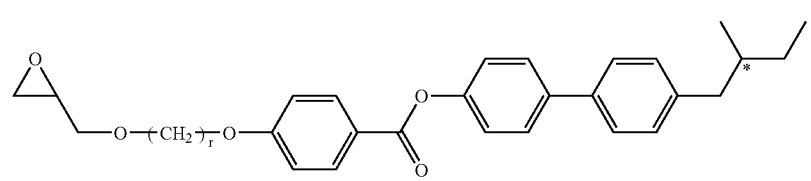
(OP4)
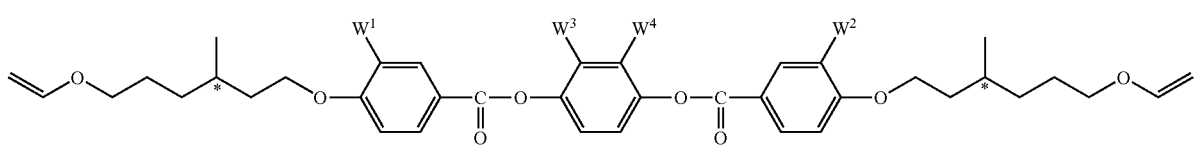
(OP5)
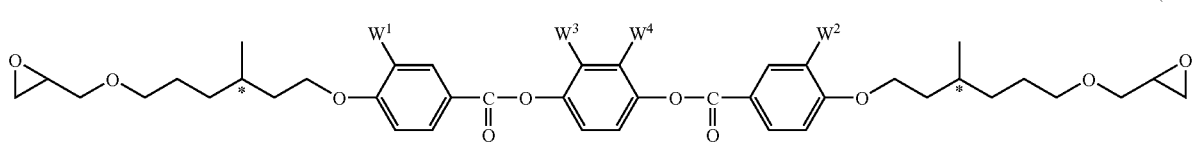
(OP6)
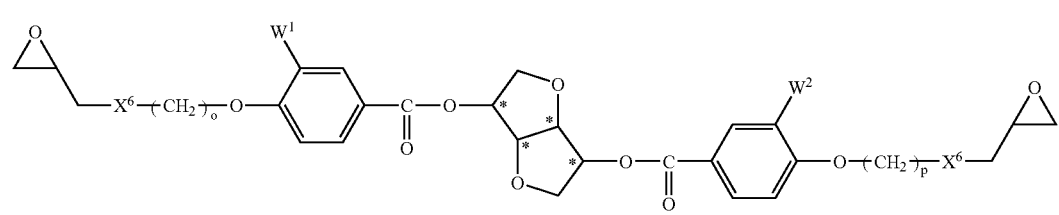
(OP7)
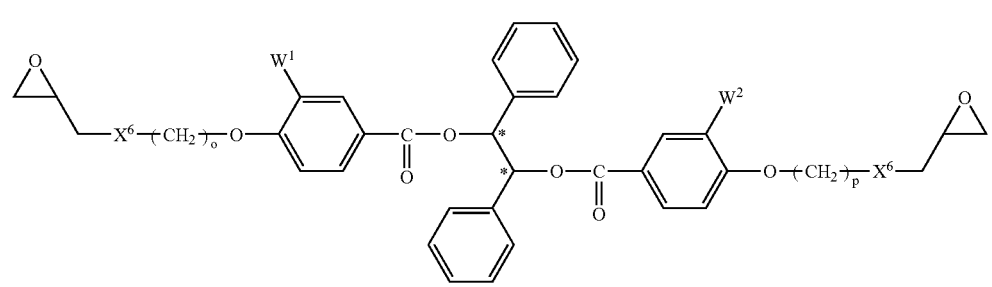
(OP8)

-continued

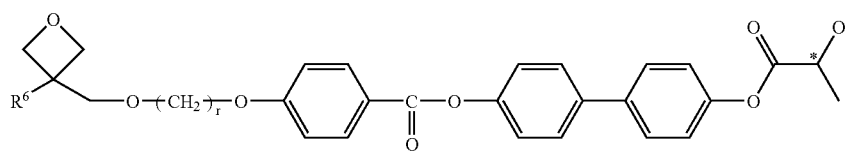
(OP9)

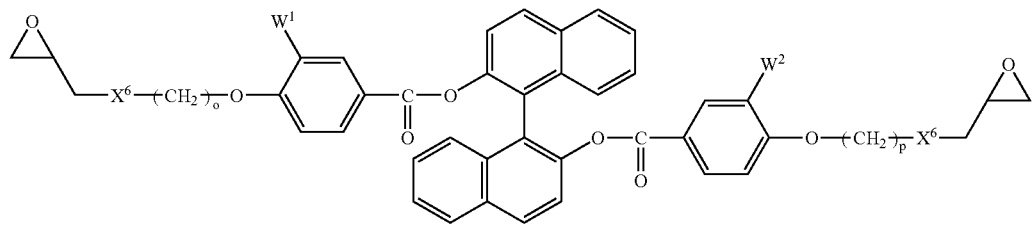
(OP10)

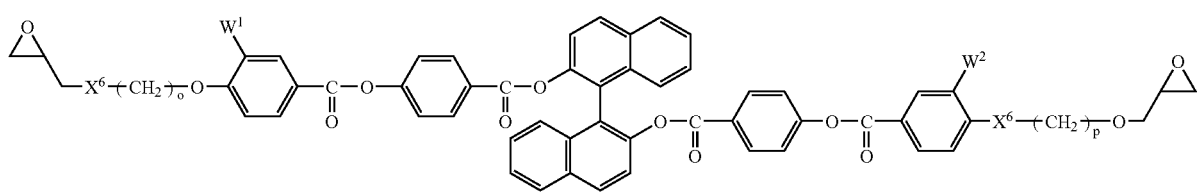
(OP11)

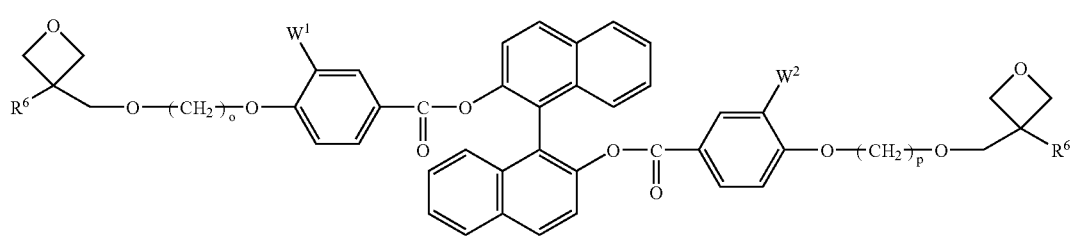
(OP12)

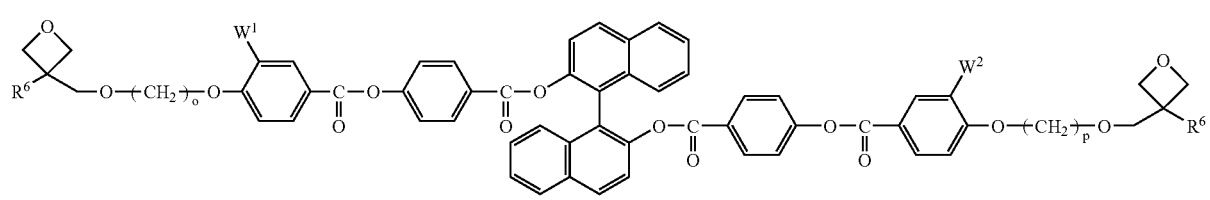
(OP13)

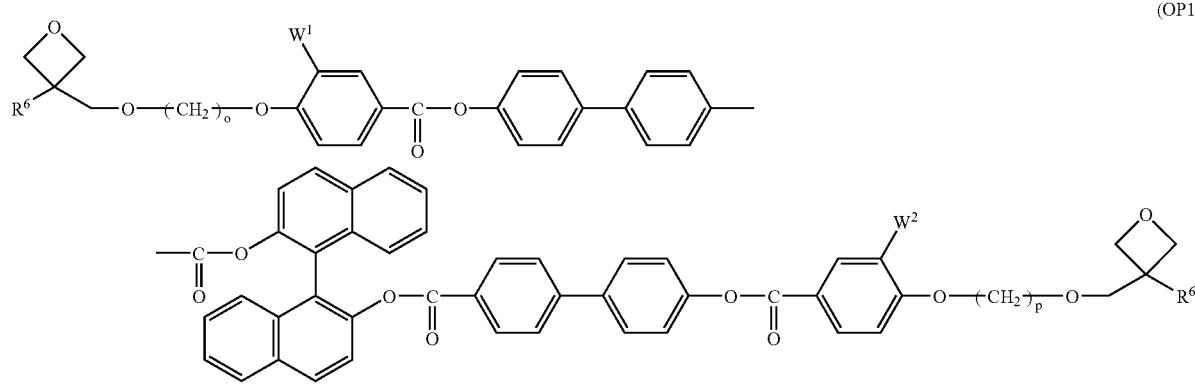
(OP14)

In the above formulae, $R^6$ is hydrogen or alkyl having 1 to 5 carbons; $W^1$ and $W^2$ are independently hydrogen, chlorine, fluorine, or cyano; $W^3$ and $W^4$ are independently hydrogen, chlorine, fluorine, cyano, methyl, ethyl, propyl, or trifluoromethyl; $X^6$ is a single bond or —O—; o, p and r are independently an integer of 1 to 20; and * is asymmetric carbon. The compounds (OP10) to (OP13) are axially asymmetric.

In such composition, a ratio of the first component and the second component is in the following. The preferred ratio is that the first component is in the range of approximately 5% to approximately 95% by weight and the second component is in the range of approximately 5% to approximately 95% by weight. More preferred ratio is that the first component is in the range of approximately 20% to approximately 90% by weight and the second component is in the range of approximately 20% to approximately 80% by weight. The particularly preferred ratio is in the range of approximately 40% to approximately 80% by weight and the second component is in the range of approximately 20% to approximately 80 approximately 5% to approximately 95% by weight and the second component is in the range of approximately 5% to approximately 95% by weight. More preferred ratio is that the first component is in the range of approximately 20% to approximately 90% by weight and the second component is in the range of approximately 20% to approximately 80% by weight. The particularly preferred ratio is in the range of approximately 40% to approximately 80% by weight and the second component is in the range of approximately 20% to approximately 80% by weight.

The composition A, B or C may further contain a polymerizable compound which is non-liquid crystallinity and optically non-active. Example of such compounds include ethyl vinyl ether, hydroxybutyl monovinyl ether, t-amyl vinyl ether, cyclohexanedimethanolmethyl vinyl ether, 3-ethyl-3-hydroxymethyloxetane, 3-methyl-3-hydroxymethyloxetane, di(3-ethyl-oxeta-3-ylmethyl), 3-ethyl-3-(2-ethylhexyloxymethyl)oxetane, and so forth. These compounds are suited for controlling a viscosity of the composition. These compounds have a large effect of uniformizing a thickness of the paint film.

The composition D is the composition which further contains a non-polymerizable compound. Examples of such compound include a liquid crystal compound, an optically active compound, and so forth. Examples of the liquid crystal compound include described in a liquid crystal compound data base (registered trade name: LiqCryst) marketed by Fujitsu Kyushu Engineering Co., Ltd. Such compounds are expected to have Roles controlling a viscosity of the compositions and controlling a temperature range of the liquid crystal phase. The optically active compound can be expected to have a role controlling a pitch of the compositions.

The compositions of A, B, C, and so forth may further contain additives if necessary. Examples of the additives for controlling the characteristics of the polymer include surfactants, antioxidants, UV absorbers, and fine particles. Examples of the additives for polymerizing the monomers include polymerizations initiator, sensitizers, and so forth. Organic solvents are preferred for diluting the compositions. An ratio of the additives is preferably such a small amount as an extent of achieving the purposes thereof.

The surfactant has the effects of making it easy to coat the composition on a supporting substrate, controlling an orientation of a liquid crystal phase. Examples of the surfactant include quaternary ammonium salts, alkylamine oxides, polyamine derivatives, polyoxyethylene-polyoxypropylene condensation products, polyethylene glycols and esters thereof, sodium laurylsulfate, ammonium laurylsulfate, laurylsulfaric acid amines, alkyl-substituted aromatic sulfonic acid salts, alkylphosphoric acid salts, perfluoroalkylsulfonic acid salts, perfluoroalkylcarboxylic acid salts, perfluoroalkylethylene oxide adducts, perfluoroalkyltrimethylammonium salts, and so forth. A preferred ratio of the surfactant depends on the kind of the surfactant, an component ratio of the composition, and so forth, and it falls in a range of approximately 100 ppm to approximately 5% by weight based on the weight of the photopolymerizable composition. More preferred ratio falls in a range of approximately 0.1 to approximately 1% by weight.

Examples of the antioxidant include hydroquinone, 2,6-di-t-butyl-p-cresol, 2,6-di-t-butyl butylphenol, triphenyl phosphite, trialkyl phosphite, and so forth. The preferred commercial products are Irganox 245, Irganox 1035, and so forth which are manufactured by Ciba Specialty Chemicals Inc.

Examples of the UV absorber include Tinuvin PS, Tinuvin 213, Tinuvin 109, Tinuvin 328, Tinuvin 384-2, Tinuvin 327, Tinuvin 400, Tinuvin 411L, and so forth which are manufactured by Ciba Specialty Chemicals Inc.

The preferred materials of the fine particles are inorganic matters, organic matters, metals, and so forth. A preferred particle diameter of the fine particles is approximately 0.001 µm to approximately 0.05 µm. More preferred particle diameter is approximately 0.001 µm to approximately 0.05 µm. The small particle diameter is preferred, though depending on the material, in order to prevent coagulation phenomenon. A sharp distribution of the particle diameter is preferred. The preferred ratio is approximately 0.1% to approximately 30% by weight. The smaller ratio is preferred as long as the purpose of addition is achieved. Fine particles may be added in order to control an optical anisotropy and increase a strength of the polymer.

Examples of the inorganic matters include ceramics, fluorine phlogopite, tetrasilicon fluoride mica, taeniolite, fluorinated vermiculite, fluorinated hectorite, hectorite, saponite, stibuncite, montmorillonite, beidellite, kaolinite, flipontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$, $Zr(OH)_4$, and so forth. The fine particles such as needle crystals of calcium carbonate have an optical anisotropy. An optical anisotropy of the polymer can be controlled by such fine particles. Examples of the organic matters include carbon nanotubes, fullerene, dendolimer, polyvinyl alcohol, polymethacrylates, polyimides, and so forth.

The preferred polymerization initiator is an initiator for photocationic polymerization. This initiator is particularly suited to the compositions (C1) to (C13). Examples of this initiator include diaryliodonium salts (hereinafter abbreviated as DAS) and triarylsulfonium salts (hereinafter abbreviated as TAS).

Examples of DAS include diphenyliodonium tetrafluoroborate, diphenyliodonium hexafluorophosphonate, diphenyliodonium hexafluoroarsenate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, bis(4-tert-butylphenyl)iodonium diphenyliodonium tetrafluoroborate, bis(4-tert-butylphenyl)iodonium diphenyliodonium hexafluoroarsenate, bis(4-tert-butylphenyl)iodonium diphenyliodonium trifluoromethanesulfonate, and so forth.

The combination of DAS and a photosensitizer is preferred. Examples of the photosensitizer include thioxanthone, phenothiazine, chlorothioxanthone, xanthone, anthracene, diphenylanthracene, rubrene, and so forth.

Examples of TAS include triphenylphosphonium hexafluorophosphonate, triphenylphosphonium hexafluoroarsenate, triphenylphosphonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium triphenylsulfonium tetra(pentafluorophenyl)borate, 4-phenylthiophenyldiphenylsulfonium tetrafluoroborate, 4-phenylthiophenyldiphenylsulfonium hexafluoroarsenate, 4-phenylthiophenyldiphenylsulfonium hexafluoroarsenate, and so forth.

Examples of the trade names of the initiator used for photocationic polymerization include DTS-102 of Midori Chemical Co., Ltd. and so forth. The examples are also Cylacure UVI-6990, Cylacure UVI-6974, Cylacure UVI-6992, and so forth of UCC Corp. The examples are also Adeka Optpmer SP-150, SP-152, SP-170, Sp-172, and so forth of Asahi Denka Kogyo K.K. The examples are also PHOTOINITIATOR 2074 of Rhodia Co., Ltd., Irgacure 250 of Ciba Specialty Chemicals Co., Ltd and Uv-9380, and so forth of GE Silicons Co., Ltd.

Examples of the solvent include benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, tetrachloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve, and so forth. The solvent may be either a single compound or a mixture.

Next, the polymer in the present invention shall be explained. The compounds (1) and (2) have a polymerizable group. A polymer is obtained by polymerizing the composition containing these compounds. The polymer obtained has an optical anisotropy. The kinds of the reaction are radical polymerization, anionic polymerization, cationic polymerization, coordination polymerization, living polymerization, and so forth. Considering the property of the polymerizable group, the cationic polymerization is preferred. When intending to obtain the polymer which is excellent in orientation, the cationic polymerization by irradiation with light is more preferred. This is because it is easy to carry out the polymerization under the condition that the composition has a liquid crystal phase.

The kinds of the preferred light are UV rays, visible rays and infrared rays. Electromagnetic waves such as electron beams and X rays may be used. Usually, UV rays or visible rays are preferred. A range of the preferred wavelength is approximately 150 nm to approximately 500 nm. More preferred range is approximately 250 nm to approximately 450 nm, and the most preferred range is approximately 300 nm to approximately 400 nm. The light source is a low voltage mercury lamp (a bactericidal lamp, a fluorescent chemical lamp and a black light), a high voltage discharge lamp (a high voltage mercury lamp and a metal halide lamp) or a short arc discharge lamp (a ultra high voltage mercury lamp, a xenon lamp and a mercury xenon lamp). The preferred light source is a ultra high voltage mercury lamp. The light emitted from the light source may be irradiated as it is onto the composition. A specific wavelength (or a specific wavelength region) selected through a filter may be irradiated onto the composition. The preferred irradiation energy density is approximately 2 mJ/cm$^2$ to approximately 5000 mJ/cm$^2$. More preferred range is approximately 10 mJ/cm$^2$ to approximately 3000 mJ/cm$^2$, and the particularly preferred range is approximately 100 mJ/cm$^2$ to approximately 2000 mJ/cm$^2$. The preferred illuminance is approximately 0.1 mW/cm$^2$ to approximately 5000 mW/cm$^2$, and more preferred illuminance is approximately 1 mW/cm$^2$ to approximately 2000 mW/cm$^2$. Temperature in irradiating with light is set up so that the composition has a liquid crystal phase. The preferred irradiating temperature is approximately 100° C. or lower. If the temperature is approximately 100° C. or higher, polymerization can be caused by heat, and therefore good orientation is not obtained in a certain case.

When the composition A is polymerized, a homopolymer is obtained. This homopolymer consists of one structural unit. When the composition B or the composition C is polymerized, a copolymer is obtained. This copolymer has at least two structural units. The arrangement of the structural units in the copolymer may be any of random, block and alternate. When the composition D is polymerized, a polymer heterogeneously containing a non-polymerizable compound is obtained. This polymer has at least one structural unit.

A thermoplastic resin is obtained by using the compound (1) or (2) as the monomer. This resin has a linear high molecular structure by using the compound having one polymerizable group as the principal component. A preferred weight average molecular weight of the thermoplastic resin is approximately 500 to approximately 1,000,000, preferably approximately 1,000 to approximately 500,000 and more preferably approximately 5,000 to approximately 100,000. When synthesizing the thermoplastic resin, the polymerization degree is controlled by regulating the reaction. When synthesizing the thermoplastic resin, the preferred second component in copolymerization is the compounds (M1), (M3) and (M5).

A thermosetting resin can be synthesized as well by using the compound (1) or (2) as the monomer. This resin is obtained from the composition containing the compound having two polymerizable groups as the principal component. This resin has a three dimensional cross-liking structure, and therefore it is neither dissolved in a solvent nor molten. Accordingly, the molecular weight can not be measured. When synthesizing the thermosetting resin, the preferred second component in copolymerization is the compounds (M2), (M4) and (M6).

The forms of the polymer are a film and a plate. The polymer may be molded. In general, a supporting substrate is used for obtaining the polymer of a film. The composition is coated on the supporting substrate, and a paint film having a liquid crystal phase is polymerized to thereby obtain a film. A preferred thickness of the polymer depends on a value of an optical anisotropy of the polymer and uses thereof. Accordingly, the range thereof can not strictly be determined, and the preferred thickness falls in a range of approximately 0.05 μm to approximately 50 μm. More preferred thickness falls in a range of approximately 0.1 μm to approximately 20 μm, and the particularly preferred thickness falls in a range of approximately 0.5 μm to approximately 10 μm. In general, a haze value of these polymers is approximately 1.5% or less. A transmittance of these polymers is usually approximately 80% or more in a visible light region. Accordingly, these polymers are suited for an optically anisotropic thin film used for a liquid crystal display element.

The examples of the supporting substrate are triacetyl cellulose, polyvinyl alcohol, polyimide, polyester, polyallylate, polyetherimide, polyethylene terephthalate and polyethylene naphthalate. The examples of the trade names are "Arton" of JSR Co., Ltd., "Zeonex" and "Zeonoa" of Zeon Corporation and "Apel" of Mitsui Chemicls, Inc. The supporting substrate is a uniaxially oriented film and a biaxially oriented film. The preferred supporting substrate is a triacetyl cellulose film. This film may be used as it is without being subjected to pre-treatment. This film may be subjected, if necessary, to surface treatment such as saponification treatment, corona discharge treatment, plasma treatment and UV-ozone treatment. The other examples thereof are supporting substrates made of metals such as aluminum, iron and copper and supporting substrates made of glasses such as alkali glass, borosilicate glass and flint glass.

A paint film on the supporting substrate is prepared by coating the composition as it is. The paint film is prepared as well by coating the composition dissolved in a suitable solvent and then removing the solvent. Methods for coating are spin coating, roll coating, curtain coating, flow coating, printing, micro gravure coating, gravure coating, wire bar coating, dip coating, spray coating, meniscus coating and a casting film-forming method.

Factors for determining the orientation of liquid crystal are 1) the chemical structure of the polymerizable compound, 2) the kind of the supporting substrate and 3) a method for orientation treatment. In the item 1), the orientation depends on the kinds of the side chains, the rings, the bonding groups and the polymerizable groups of the polymerizable compound. In the item 2), the orientation depends on the material of the supporting substrate such as polymers, glasses and metals. The item 3) includes methods such as rubbing with rayon cloth in one direction, obliquely depositing silicon oxide and etching processing in a slit form. In the rubbing treatment, the supporting substrate may directly be rubbed. The supporting substrate may be coated with a thin film of polyimide and polyvinyl alcohol, and this film may be rubbed. Specific thin films providing good orientation without carrying out rubbing treatment are known as well.

The classification of orientation in a liquid crystal compound is homogeneous, homeotropic, hybrid, tilt and twist. The homogeneous means the state that oriented vectors are parallel to a substrate and stay in a single direction. The homeotropic means the state that oriented vectors are vertical to a substrate. The hybrid means the state that oriented vectors stand up vertically from a parallel state as the vectors are apart from a substrate. The tilt means the state that oriented vectors stand up in a fixed gradient angle to a substrate. These orientations are observed in the compositions having a nematic phase. On the other hand, twist orientation is observed in the compositions having a chiral nematic phase and a cholesteric phase. The twist means the state that oriented vectors are parallel to a substrate but gradually twisted as the vectors are apart from the substrate. This twist is brought about by the action of an optically active group.

The uses of the polymer shall be explained. This polymer can be used for a molded matter having an optical anisotropy. The examples of the uses of this polymer are optical films such as phase difference plates, (½ wavelength plate, ¼ wavelength plate and the like), reflection-reducing films, selective reflection films and viewing angle-compensating films. The polymers having orientations such as homogeneous, hybrid and homeotropic can be used for phase difference plates, polarizing elements, liquid crystal-orienting films, reflection-reducing films, selective reflection films and viewing angle-compensating films. The polymers having orientation such as twist can be used for phase difference plates, polarizing elements, selective reflection films and viewing angle-compensating films. Such polymers can be used for phase difference plates and viewing angle-compensating films for liquid crystal displays for the purpose of optical compensation. Such polymers can be used as well for pyrogenetic conductive epoxy resins, adhesives, synthetic polymers having a mechanical anisotropy, cosmetics, ornaments, non-linear optical materials and information storage materials.

The thermoplastic resin is suited to uses such as polymers having a mechanical anisotropy, cosmetics, ornaments, non-linear optical materials and information storage materials. The thermosetting resin is suited to uses such as phase difference plates, polarizing elements, liquid crystal-orienting films, reflection-reducing films, selective reflection films and viewing angle-compensating films which are structural elements for liquid crystal display devices.

A phase difference plate has a function to change the state of polarized light. A ½ wavelength function plate has a function to rotate a vibrating direction of linearly polarized light by 90 degree. The composition is coated on a supporting substrate so that an equation of $d=\lambda/2\times\Delta n$ is satisfied. In this case, d is a thickness of the composition; $\lambda$ is a wavelength; and $\Delta n$ is an optical anisotropy. This composition is oriented and then photopolymerized, whereby a ½ wavelength function plate is obtained. On the other hand, a ¼ wavelength function plate has a function to change linearly polarized light to circularly polarized light or circularly polarized light to linearly polarized light. In this case, a paint film of the composition may be formed so that a condition of $d=\lambda/4\times\Delta n$ is satisfied. A thickness (d) of the polymer is controlled in the following manner. In a method in which the composition is diluted by a solvent and then coated on a supporting substrate, a paint film having the intended thickness can be obtained by suitably selecting a concentration of the composition, a method for coating and conditions of coating. A method making use of a liquid crystal cell is preferred as well. The liquid crystal cell has an orienting film of polyimide and the like and therefore is convenient. When injecting the composition into this liquid crystal cell, a thickness of the paint film can be controlled by an interval between the liquid crystal cells.

The polymer having twist orientation is useful as a phase difference plate. When a pitch of the helixes is 1/n (n is an average refractive index of the polymer) of a wavelength, light of this wavelength is reflected according to a Bragg's rule and changed to circularly polarized light. The direction of circularly polarized light depends on the direction of the helixes, that is, the configuration of the optically active compound. The direction of circularly polarized light can be determined by suitably selecting the configuration of the optically active compound. This polymer is useful as a circularly polarized light-separating function element.

This polymer is also useful as a luminance-improving film. According to a method disclosed in, for example, Japanese Patent Application Laid-Open No. 281814/1994, a polymer in which helical pitches continuously extend in a thickness direction is obtained. This polymer can reflect light of a broad wavelength region according to the pitches. This polymer can selectively reflect light in a region of 100 to 350 nm (or a wavelength of 350 to 750 nm).

EXAMPLES

The present invention shall be explained in details with reference of examples after explaining measuring methods of the characteristics, but the present invention shall not be restricted by the following examples. A unit of proportion in the compositions is % by weight.

1. Phase Transition Temperature:

A sample was put on a hot plate of a melting point-measuring apparatus equipped with a polarization microscope and heated at a rate of 1° C./minute to measure a temperature at which the liquid crystal phase was transferred to another liquid crystal phase. C means crystal; N means a nematic phase; SA means a smectic A phase; and I means an isotropic liquid. An NI point is an upper limit temperature of a nematic phase or a transition temperature from a nematic phase to an isotropic liquid. "C50N63I" shows transition from crystal to a nematic phase at 50° C. and transition from a nematic phase to an isotropic liquid at 63° C.

2. Cellotape® Peeling Test:

Measured according to a test method of "JIS-K-5400, 8.5, adhesion (8.5.2, cross-cut tape test method" which is described in the Japanese Industrial Standards. That is, the results were evaluated by the number of cross-cuts which were not peeled off among 100 cross-cuts.

3. Pencil Hardness:

Measured according to a test method of "JIS-K-5400, 8.4, pencil scratching test" which is described in the Japanese Industrial Standards. The results were shown by a hardness of a pencil feed.

4. Heat Resistance Test:

This test was carried out under the conditions of 100° C. and 500 hours, and the results were evaluated by a variation in retardation. Polyamic acid (PIA 5310 of Chisso Corporation) was coated on a glass substrate and then heated at 210° C. for 30 minutes to obtain a supporting substrate. The surface of polyimide produced by heating was rubbed with a rayon cloth. The composition of the sample was diluted by a mixed solvent (2:1 in terms of a weight ratio) of toluene and cyclopentane to prepare a solution of 30% by weight. The solution was coated on the supporting substrate by means of a spin coater and heated at 70° C. for 3 minutes, and then the resulting paint film was irradiated with UV rays at 60° C. for 10 seconds by means of a ultra high voltage mercury lamp (250 W/cm). A retardation of the polymer obtained was measured at 25° C. The polymer was heated at 1000° C. for 500 hours, and then the retardation was measured again at 25° C. Two values were compared to evaluate the heat resistance. The retardation was measured by means of a Senarmont compensator according to a method of reference. A wavelength of 550 nm was used. The reference is "Polarization Microscope Guide for High molecular Material", p. 94, published by Agne Technical Center, 2001.

5. Optical Anisotropy (Δn):

The value of a retardation (25° C.) of the polymer was measured according to the method of the heat resistance test described above. A thickness (d) of the polymer was measured as well. The retardation is Δn×d, and therefore the value of the optical anisotropy was calculated from the above relation.

6. Orientation:

Orientation was observed under a polarization microscope. The polymer was formed on a TAC film (supporting film) subjected to saponification treatment. This sample was sandwiched between two polarizing plates disposed in cross nicol. The kind of orientation was judged from angle dependency of the transmitted light intensity.

Example 1

Synthesis of Compound No. 18

A. First Stage:

A dimethylformamide (50 ml) solution of allyl(4-chlorobutyl) ether 14 g, 4-hydroxybenzoic acid 14 g and potassium carbonate 14 g was stirred at 90° C. for 3 hours. Water was added thereto, and the solution was extracted with toluene. The toluene layer was washed well with water, and then toluene was distilled off. Sodium hydroxide 20 g, water 50 ml and ethanol 200 ml were added to the resulting residue and refluxed for 2 hours. Ethanol was distilled off, and then hydrochloric acid was added to the residue to acidify the solution. The solution was extracted with diethyl ether, and the extract was dried on anhydrous magnesium sulfate. A residue obtained by distilling the solvent off was recrystallized from a mixed solvent of ethanol and water to obtain 29 g of 4-(4-allyloxybutyloxy)benzoic acid. Phase transition temperature: C94N107I.

B. Second Stage:

Octyloxybenzoic acid chloride 12.5 g was added dividing into several times to a tetrahydrofuran (100 ml) solution of 2,7-dihydroxy-9-methylfluorene 10 g and pyridine 8 g, and the solution was refluxed for 5 hours. 5% hydrochloric acid 50 ml was added to the reaction mixture, and the solution was extracted with methylene chloride. The extract was washed with 5% hydrochloric acid until pH became acidic, and then it was washed with a saturated sodium hydrogencarbonate aqueous solution and dried on anhydrous magnesium sulfate. A residue obtained by distilling the solvent off was refined by silica gel column chromatography (eluent solvent: methylene chloride) to obtain 10 g of 2-(4-octyloxybenzoyloxy)-7-hydroxy-9-methylfluorene (J1). Melting point: 140 to 143° C.

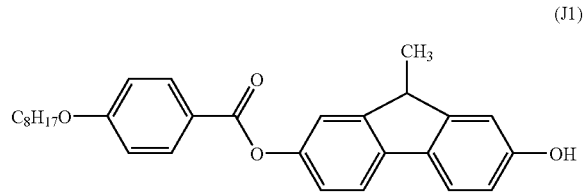

(J1)

C. Third Stage:

Dimethylaminopyridine 0.01 g and 1-ethyl-3-(3-dimethylaminopropyl)carbodiimide hydrochloride 0.8 g were added to a methylene chloride (50 ml) solution of 4-(4-allyloxybutyloxy)benzoic acid 0.84 g and 2-(4-octyloxybenzoyloxy)-7-hydroxy-9-methylfluorene (J1) 1.5 g while maintaining 5° C., and the mixture was further stirred at room temperature for 12 hours. Water 50 ml was added thereto, and the resulting organic layer was dried on anhydrous magnesium sulfate. A residue obtained by distilling the solvent off was refined by silica gel column chromatography to obtain 0.5 g of 2-[4-(4-allyloxybutyloxy)benzoyloxy]-7-(4-octyloxybenzoyloxy)-9-methylfluorene (J2).

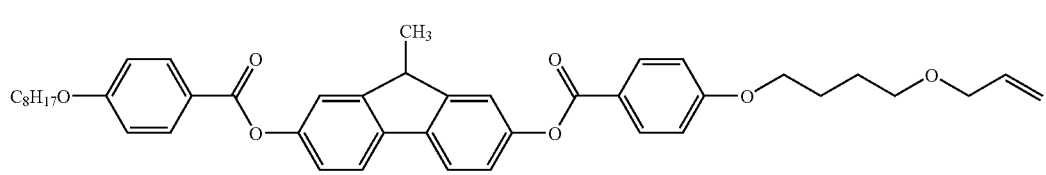
(J2)

D. Fourth Stage:

m-Chlorobenzoic acid 1 g was added to a methylene chloride (50 ml) solution of 2-[4-(4-allyloxybutyloxy)benzoyloxy]-7-(4-octyloxybenzoyloxy)-9-methylfluorene (J2) 0.5 g, and the mixture was stirred at room temperature for 2 days. The reaction mixture was washed with a 5% sodium hydroxide aqueous solution, a sodium hydrogensulfite aqueous solution and a sodium hydrogencarbonate aqueous solution in this order and then dried on anhydrous magnesium sulfate. A residue obtained by distilling the solvent off was refined by silica gel column chromatography and recrystallized from a mixed solvent of ethanol and ethyl acetate to obtain 0.1 g of Compound No. 18. The phase transition temperature was shown below.

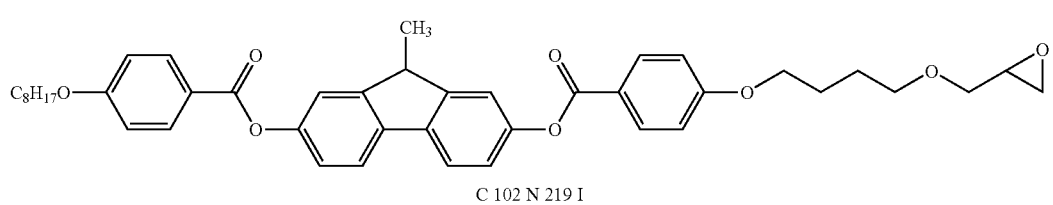
(No. 18)

C 102 N 219 I

Example 2

Synthesis of Compound No. 19

A. First Stage:

The compound (J3) shown below was synthesized by the same method as in the second stage of Example 1. The phase transition temperature was shown below. p-Cyanobenzoic acid chloride and 2,7-dihydroxy-9-methylfluorene were used for the raw materials.

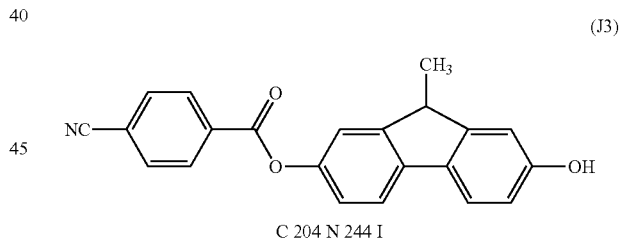
(J3)

C 204 N 244 I

B. Second Stage:

The compound (J4) shown below was synthesized by the same method as in the third stage of Example 1. The compound (J3) and 4-(4-allyloxybutyloxy)benzoic acid were used for the raw materials.

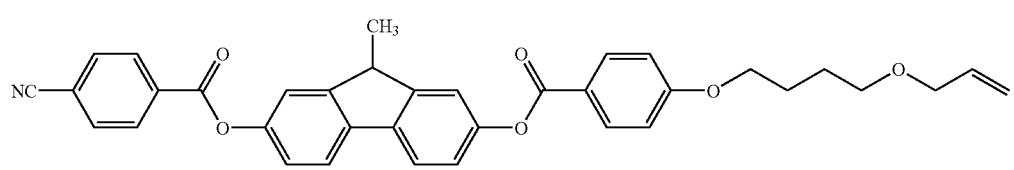
(J4)

C. Third Stage:

Compound No. 19 shown below was synthesized by the same method as in the fourth stage of Example 1. The phase transition temperature was shown below.

benzoic acid (melting point: 61° C.); 4-[4-(3-ethyloxetane-3-ylmethoxy)butyloxy]benzoic acid (melting point: 75.3 to 77.7° C.); 2-fluoro-4-[4-(3-ethyloxetane-3-ylmethoxy)butyloxy]benzoic acid (melting point: 75 to 80° C.); and 4-(3-

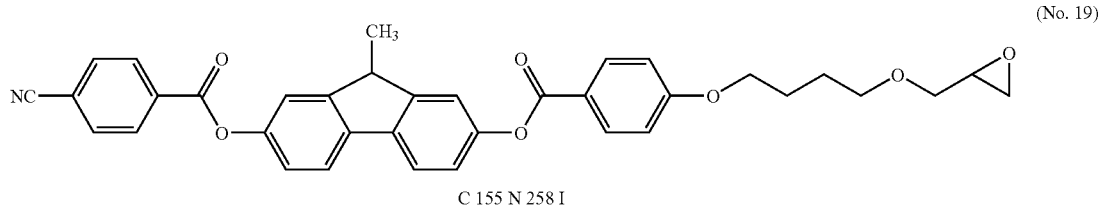

(No. 19)

C 155 N 258 I

Example 3

Synthesis of Compound No. 68

A. First Stage:

A dimethylformamide (3 L) solution of 3-[(6-bromohexyloxy)methyl]-3-ethyloxetane 500 g, 4-hydroxybenzoic acid 297 g and potassium carbonate 490 g was stirred at 90° C. for 8 hours. Water 4 L was added to the reaction mixture, and then it was extracted with toluene 4 L. The organic layer was washed with water, and the solvent was distilled off. Sodium hydroxide 200 g, water 1 L and ethanol 2.5 L were added to the resulting residue and refluxed for 4 hours. Ethanol (1 L) was distilled off at atmospheric pressure, and then the solution was acidified by hydrochloric acid to obtain a ethyloxetane-3-ylmethoxy)benzoic acid (melting point: 127.5° C.).

B. Second Stage:

A methylene chloride (50 ml) of 4-[6-(3-ethyloxetane-3-ylmethoxy)hexyloxy]benzoic acid 0.76 g and the compound (J3) was cooled down to 5° C., and then dimethylaminopyridine 0.05 g and 1-ethyl-3-(3-dimethylaminopropyl)carbodiimide hydrochloride 0.5 g were added thereto and stirred at room temperature for 12 hours. Water 50 ml was added to the reaction mixture, and the organic layer was separated and dried on anhydrous magnesium sulfate. A residue obtained by distilling the solvent off was refined by silica gel column chromatography and further recrystallized from ethanol to obtain 3 g of Compound No. 68. The phase transition temperature was shown below.

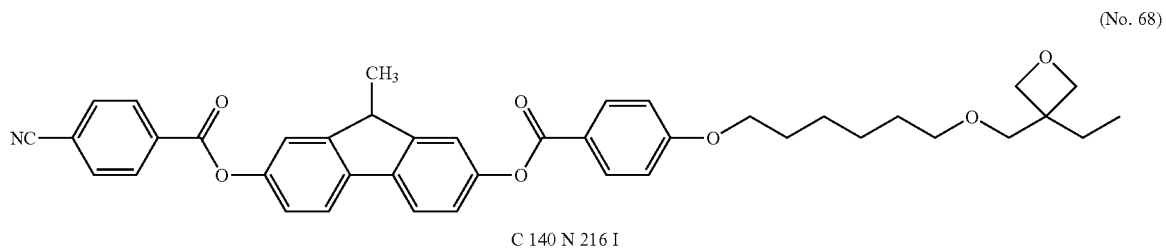

(No. 68)

C 140 N 216 I slurry. The slurry was filtered and dried to thereby obtain 400 g of 4-[6-(3-ethyloxetane-3-ylmethoxy)hexyloxy]benzoic acid. Melting point: 58.5° C.

The following compounds were synthesized by the same method: 4-[6-(3-methyloxetane-3-ylmethoxy)hexyloxy]

Example 4

The compound (J2) was used in the second stage of Example 3 to synthesize Compound No. 65. The phase transition temperature was shown below.

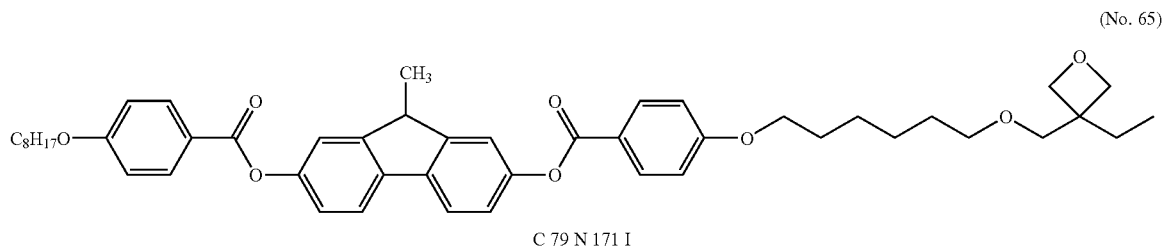

(No. 65)

C 79 N 171 I

Comparative Example 1

Compound No. 65 prepared in Example 4 has one oxetane ring. This compound is compared with the following compound having two oxetane rings. A temperature range of a nematic phase in Compound No. 65 was 92° C. extending from 79° C. to 171° C. That of the following compound was 71.7° C. extending from 59° C. to 130.7° C. Accordingly, it has been concluded that the compound of the present invention has a broader temperature range of the nematic phase.

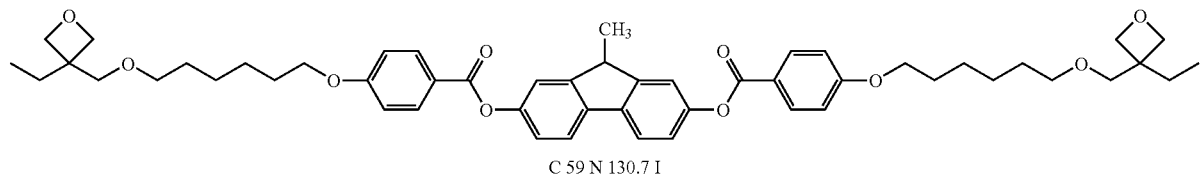

C 59 N 130.7 I

Example 5

Synthesis of Compound No. 171

A. First Stage:

2-Acetyl-7-hydroxyfluorene 22.4 g, allyl(4-chlorobutyl) ether 18 g and potassium carbonate 20 g were added to dimethylformamide 150 ml and stirred at 90° C. for 8 hours. The reaction mixture was poured into 6N hydrochloric acid 300 ml to obtain a solid matter. The solid matter was filtered and dried, and then it was recrystallized from ethanol to obtain 22 g of 2-acetyl-7-(allyloxybutyloxy)fluorene. The melting point was 77° C.

B. Second Stage:

A dioxane (380 ml) solution of 2-acetyl-7-(4-allyloxybutyloxy)fluorene 22 g was cooled to 8° C. Sodium hypobromite prepared from water 209 ml, sodium hydroxide 42.7 g and bromine 15.2 ml was dropwise added thereto, and after finishing dropwise adding, the solution was stirred at 40° C. for 15 minutes. The reaction mixture was cooled to 10° C., and then a saturated sodium thiosulfate aqueous solution was added thereto. A solid matter deposited by acidifying the solution with hydrochloric acid was filtered and then dried. The solid matter was recrystallized from acetic acid to obtain 15 g of 2-(4-allyloxybutyloxy)fluorene-7-carboxylic acid. Phase transition temperature: C164N222I.

C. Third Stage:

A methylene chloride (50 ml) solution of 2-(4-allyloxybutyloxy)fluorene-7-carboxylic acid 2 g and 4-cyanophenol 1.17 g was cooled to 5° C., and dimethylaminopyridine 0.05 g and 1-ethyl-3-(3-dimethylaminopropyl)carbodiimide hydrochloride 1.4 g were added thereto and stirred at room temperature for 12 hours. Water 50 ml was added to the reaction mixture, and the organic layer was separated and dried on anhydrous magnesium sulfate. A residue obtained by distilling the solvent off was refined by silica gel column chromatography and further recrystallized from ethanol to obtain 2.3 g of the compound (J5).

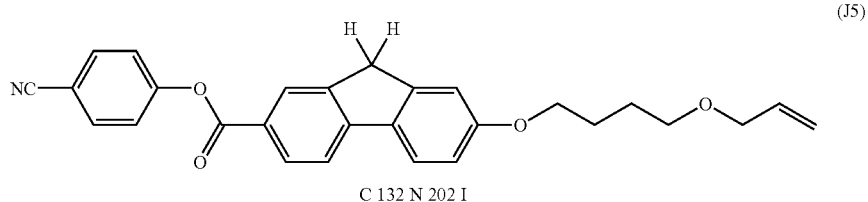

C 132 N 202 I

D. Fourth Stage:

m-Chlorobenzoic acid 1.5 g was added to a methylene chloride (50 ml) solution of the compound (J5), and the mixture was stirred at room for 2 days. The reaction mixture was washed with a 5% sodium hydroxide aqueous solution, a sodium hydrogensulfite aqueous solution and a sodium hydrogencarbonate aqueous solution in this order and then dried on anhydrous magnesium sulfate. A residue obtained by distilling the solvent off was refined by silica gel column chromatography and recrystallized from a mixed solvent of ethanol and ethyl acetate to obtain 1.4 g of Compound No. 17.

No. 171

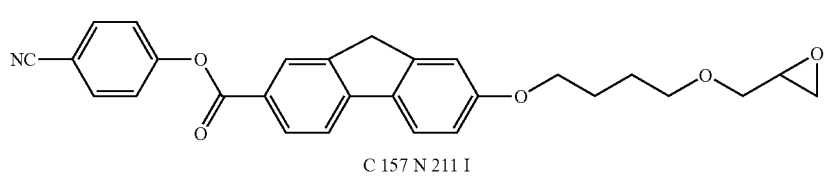

C 157 N 211 I

Example 6

3-Fluoro-4-trifluoromethoxyphenol was substituted for 4-cyanophenol in the third stage of Example 4 to synthesize the compound (J6). Phase transition temperature: C110N176I. Next, it was oxidized by the method used in the third stage of Example 3 to synthesize Compound No. 172.

(J6)

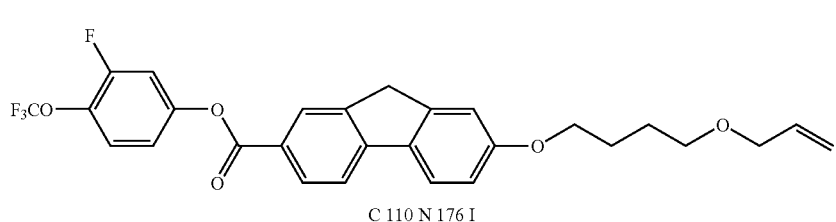

C 110 N 176 I

No. 172

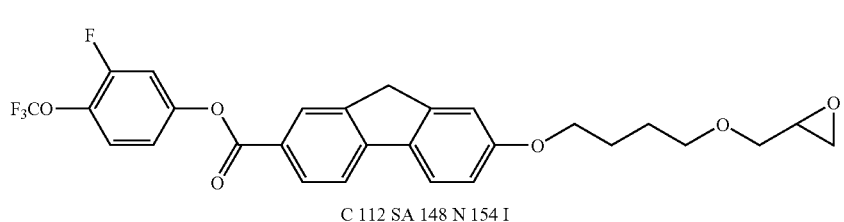

C 112 SA 148 N 154 I

Example 7

A composition (CL1) was prepared from 50 wt % of Compound No. 68 and 50 wt % of Compound (K1). This composition had a nematic phase at room temperature. Compound No. 68 had a good miscibility and did not cause phase separation. The composition (CL1) was coated on a TAC film subjected to rubbing to show homogeneous orientation.

No. 68

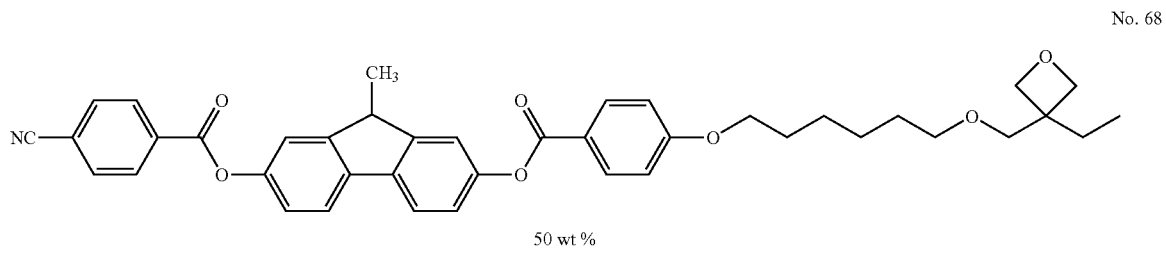

50 wt %

(K1)

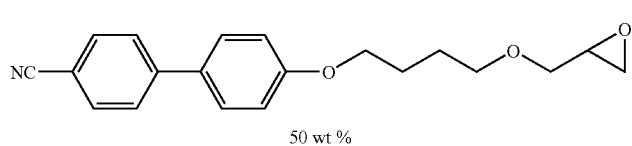

50 wt %

A TAC film was subjected to saponification treatment, and then the surface thereof was rubbed with a rayon cloth. A cyclopentanone (4 g) and toluene (4 g) solution of the composition (CL1) 1 g and DTS-102 (polymerization initiator of Midori Chemical Co., Ltd.) 0.03 g was coated on the above film by means of a spin coater. After coating, the film was heated in an oven set to 60° C. for 5 minutes. This heat treatment allowed the solvent to be removed and the liquid crystal molecules to be oriented. The film was irradiated with UV rays at 60° C. for 10 seconds by means of a ultra high voltage mercury lamp (250 W/cm) to obtain a liquid crystal-oriented film (F1). The homogeneous orientation of the composition was maintained even after polymerization. In the Cellotape peeling test of this film, no cross-cuts were peeled off. This film had a pencil hardness of 2H.

Example 8

A composition (CL2) was prepared from 70 wt % of Compound No. 18 and 30 wt % of Compound (K2). This composition had a nematic phase at room temperature. Compound No. 18 had a good miscibility and did not cause phase separation. The composition (CL2) was coated on a TAC film subjected to rubbing to show hybrid orientation.

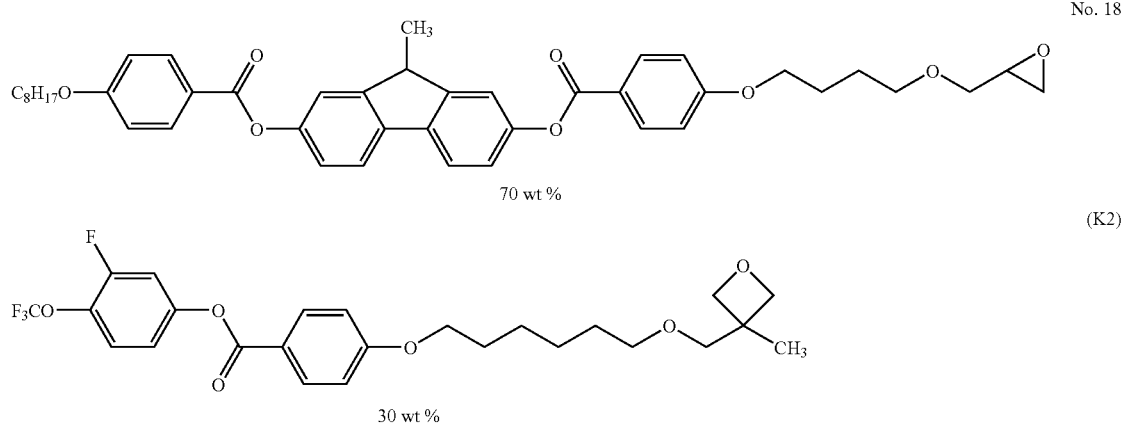

A TAC film was subjected to saponification treatment, and then the surface thereof was rubbed with a rayon cloth. A cyclopentanone (8 g) solution of the composition (CL2) 1 g and DTS-102 (polymerization initiator of Midori Chemical Co., Ltd.) 0.03 g was coated on the above film by means of a spin coater. After coating, the film was heated in an oven set to 60° C. for 5 minutes. This heat treatment allowed the solvent to be removed and the liquid crystal molecules to be oriented. The film was irradiated with UV rays at 60° C. for 10 seconds by means of a ultra high voltage mercury lamp (250 W/cm) to obtain a liquid crystal-oriented film (F2). The hybrid orientation of the composition was maintained even after polymerization. In the Cellotape peeling test of this film, no cross-cuts were peeled off. This film had a pencil hardness of 2H.

The evaluation results of the above films are summarized in Table 2. It has been found from these results that 1) the polymers are less liable to be peeled off from the supporting substrate and that 2) the polymers are hard.

TABLE 2

| Film No. | Cellotape peeling test | Pencil hardness | Orientation |
|---|---|---|---|
| F1 | 100/100 | 2H | homogeneous |
| F2 | 100/100 | 2H | hybrid |

What is claimed is:

1. A compound having one of formulae (1) or (2):

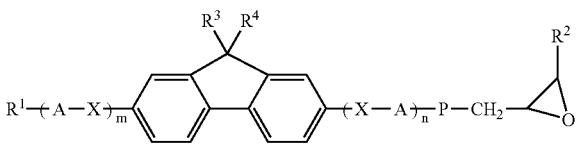

(1)

-continued

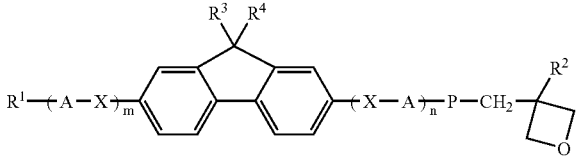

(2)

wherein $R^1$ is hydrogen, fluorine, chlorine, cyano, nitro, or alkyl having 1 to 20 carbons; wherein any hydrogen in the alkyl may be replaced by fluorine or chlorine, and wherein any one or two —$CH_2$— may be replaced by —O—, —S—, —COO—, —OCO—, —CO—, —CH=CH—, or —C≡C—; $R^2$ is hydrogen or alkyl having 1 to 8 carbons, wherein any hydrogen in the alkyl may be replaced by fluorine or chlorine; $R^3$ and $R^4$ are independently hydrogen, fluorine, chlorine, or alkyl having 1 to 10 carbons, wherein any hydrogen in the alkyl may be replaced by fluorine or chlorine, and wherein any one or two —CH₂— in the alkyl may be replaced by —O—, —S—, —COO—, —OCO—, —CO—, —CH=CH—, or —C≡C—; A is 1,4-cyclohexylene, 1,4-phenylene, pyridine-2,5-diyl, pyridazine-3,6-diyl, pyrimidine-2,5-diyl, naphthalene-2,6-diyl, or tetrahydronaphthalene-2,6-diyl; wherein any hydrogen in the 1,4-phenylene may be replaced by fluorine or chlorine, and wherein any one or two hydrogens in the 1,4-phenylene may be replaced by cyano, methyl, ethyl, methoxy, hydroxy, formyl, acetoxy, acetyl, trifluoroacetyl, difluoromethyl, or trifluoromethyl; X is a single bond, —(CH₂)₂—, —CH=CH—, —C≡C—, —CH₂O—, —OCH₂—, —CF₂O—, —OCF₂—, —COO—, —OCO—, —CONH—, —NHCO—, —(CH₂)₄—, —(CH₂)₂COO—, —OCO(CH₂)₂—, —CH=CH—COO—, or —OCO—CH=CH—; P is alkylene having 1 to 20 carbons, wherein any hydrogen in the alkylene may be replaced by fluorine or chlorine, wherein any —CH₂— in the alkylene may be replaced by —O—, wherein any one or two —CH₂— in the alkylene may be replaced by —COO— or —OCO—, and wherein any one —CH₂— in the alkylene may be replaced by —CH=CH— or —C≡C—; and wherein m and n are independently 0, 1 or 2, and the sum of m and n is 1, 2, 3, or 4.

2. The compound according to claim 1, wherein, R¹ is hydrogen, fluorine, chlorine, cyano, nitro, trifluoromethoxy, difluoromethoxy, fluoromethoxy, tetrafluoroethyl, hexafluoropropyl, alkyl having 1 to 15 carbons, alkoxy having 1 to 15 carbons, or alkoxyalkyl having 2 to 15 carbons; wherein R² is hydrogen or alkyl having 1 to 5 carbons; wherein R³ and R⁴ are independently hydrogen, fluorine, chlorine, or alkyl having 1 to 8 carbons; wherein A is 1,4-cyclohexylene, 1,4-phenylene or pyridine-2,5-diyl, wherein any hydrogen in the 1,4-phenylene may be replaced by fluorine, and wherein any one hydrogen in the 1,4-phenylene may be replaced by methyl, ethyl, methoxy, acetoxy, or acetyl; wherein X is a single bond, —(CH₂)₂—, —CH=CH—, —CH₂O—, —OCH₂—, —CF₂O—, —OCF₂—, —COO—, —OCO—, or —(CH₂)₄—; wherein P is alkylene having 1 to 10 carbons, wherein any —CH₂— in the alkylene may be replaced by —O—, and wherein any one —CH₂— in the alkylene may be replaced by —COO— or —OCO—; wherein m and n are independently 0, 1 or 2; and wherein the sum of m and n is 1, 2 or 3.

3. The compound according to claim 2, wherein P is —O—, —(CH₂)_d—, —O—(CH₂)_d—, —(CH₂)_d—O—, —O—(CH₂)_d—O—, —COO—(CH₂)_d—O—, —OCO(CH₂)_d—O—, or —O—(CH₂CH₂O)_s—, wherein d is an integer of 2 to 10, wherein s is an integer of 2 to 5; wherein m and n are independently 0, 1 or 2, and wherein the sum of m and n is 1 or 2.

4. A compound having one of formulae (3) to (8):

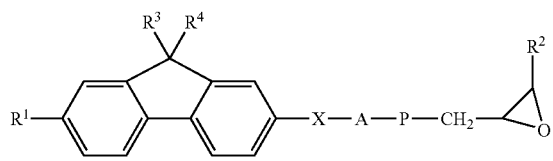
(3)

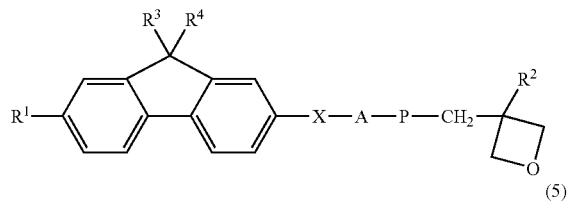
(4)

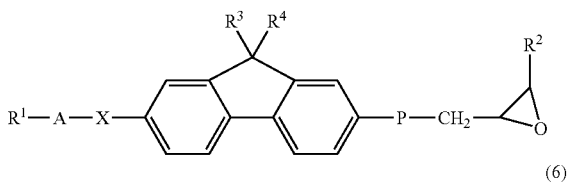
(5)

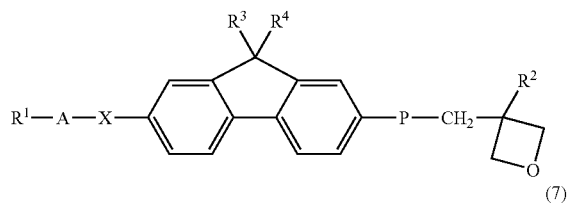
(6)

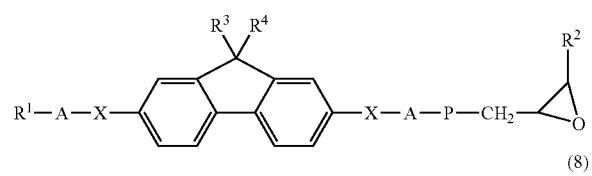
(7)

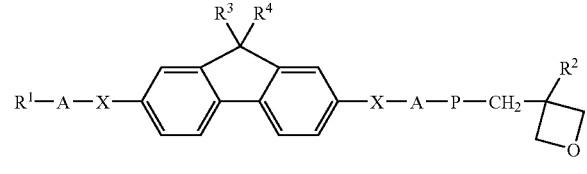
(8)

wherein R¹ is fluorine, chlorine, cyano, trifluoromethoxy, difluoromethoxy, fluoromethoxy, tetrafluoroethyl, hexafluoropropyl, alkyl having 1 to 15 carbons, alkoxy having 1 to 15 carbons, or alkoxyalkyl having 2 to 15 carbons; wherein R² is hydrogen or alkyl having 1 to 4 carbons; wherein R³ and R⁴ are independently hydrogen, fluorine, chlorine, or alkyl having 1 to 4 carbons; wherein A is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, or 2,3,5,6-tetrafluoro-1,4-phenylene; wherein X is a single bond, —C≡C—, —COO— or —OCO—; wherein P is —O—, —O—(CH₂)_d—, —O—(CH₂)_d—O—, or —O—(CH₂CH₂O)_s—; wherein d is an integer of 1 to 15, and wherein s is an integer of 2 to 5.

5. The compound according to claim 4, wherein R¹ is cyano, trifluoromethoxy, alkyl having 1 to 13 carbons, alkoxy having 1 to 13 carbons, or alkoxyalkyl having 2 to 13 carbons; wherein R² is hydrogen, methyl or ethyl; wherein the combination of R³ and R⁴ is hydrogen and hydrogen, hydrogen and fluorine, fluorine and hydrogen, hydrogen and chlorine, hydrogen and methyl, hydrogen and ethyl, methyl and methyl, methyl and ethyl, or ethyl and ethyl; wherein A is 1,4-cyclohexylene, 1,4-phenylene, 2-fluoro-1,4-phenylene, 2,3-difluoro-1,4-phenylene, 2,5-difluoro-1,4-phenylene, or 2,6-difluoro-1,4-phenylene; wherein X is a single bond, —COO— or —OCO—; wherein P is —O—, —O—(CH$_2$)$_d$—, —O—(CH$_2$)$_d$—O—, or —O—(CH$_2$CH$_2$O)$_s$—; wherein d is an integer of 1 to 10, and wherein s is an integer of 2 to 5.

6. The compound represented by one of formulae (3), (5) or (8) according to claim 5, wherein R$^1$ is alkyl having 1 to 10 carbons; wherein R$^2$ is hydrogen; wherein the combination of R$^3$ and R$^4$ is hydrogen and hydrogen, hydrogen and methyl, hydrogen and ethyl, methyl and methyl, methyl and ethyl, or ethyl and ethyl; wherein A is 1,4-phenylene; X is —COO— or —OCO—; wherein P is —O—, —O—(CH$_2$)$_d$—, or —O—(CH$_2$)$_d$—O—; and wherein d is an integer of 2 to 10.

7. The compound represented by one of formulae (3), (5) or (8) according to claim 5, wherein P is —O—(CH$_2$)$_d$— or —O—(CH$_2$)$_d$—O—, and wherein d is an integer of 2 to 10.

8. The compound represented by one of formulae (3), (5) or (8) according to claim 6, wherein P is —O—(CH$_2$)$_d$— or —O—(CH$_2$)$_d$—O—, and wherein d is an integer of 2 to 10.

9. The compound represented by one of formulae (3), (5) or (8) according to claim 7, wherein the combination of R$^3$ and R$^4$ is hydrogen and hydrogen, hydrogen and methyl, or methyl and methyl.

10. The compound represented by one of formulae (3), (5) or (8) according to claim 8, wherein the combination of R$^3$ and R$^4$ is hydrogen and hydrogen, hydrogen and methyl, or methyl and methyl.

11. The compound represented by one of formulae (4), (6) or (8) according to claim 5, wherein R$^1$ is alkyl having 1 to 10 carbons; wherein R$^2$ is methyl or ethyl; wherein the combination of R$^3$ and R$^4$ is hydrogen and hydrogen, hydrogen and methyl, hydrogen and ethyl, methyl and methyl, methyl and ethyl, or ethyl and ethyl; wherein A is 1,4-phenylene; X is —COO— or —OCO—; wherein P is —O—, —O—(CH$_2$)$_d$— or —O—(CH$_2$)$_d$—O—; and wherein r is an integer of 2 to 10.

12. The compound represented by one of formulae (4), (6) and (8) according to claim 5, wherein P is —O—(CH$_2$)$_d$— or —O—(CH$_2$)$_d$—O—, and wherein d is an integer of 2 to 10.

13. The compound represented by one of formulae (4), (6) and (8) according to claim 11, wherein P is —O—(CH$_2$)$_d$— or —O—(CH$_2$)$_d$—O—, and wherein d is an integer of 2 to 10.

14. The compound represented by one of formulae (4), (6) and (8) according to claim 12, wherein the combination of R$^3$ and R$^4$ is hydrogen and hydrogen, hydrogen and methyl, or methyl and methyl.

15. The compound represented by one of formulae (4), (6) and (8) according to claim 13, wherein the combination of R$^3$ and R$^4$ is hydrogen and hydrogen, hydrogen and methyl, or methyl and methyl.

16. A compound having one of formulae (1A) to (2F):

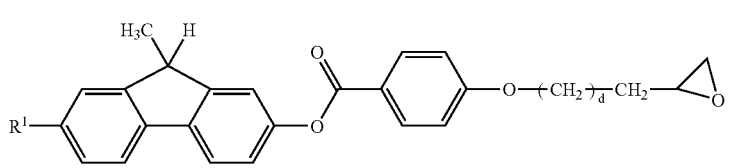

(1A)

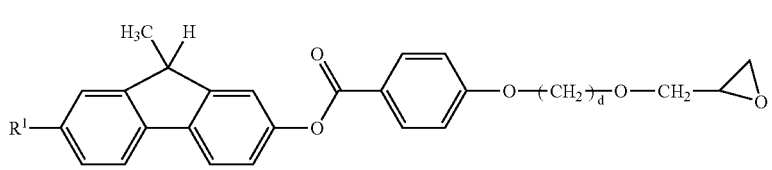

(1B)

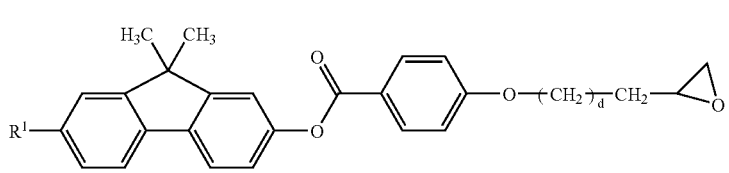

(1C)

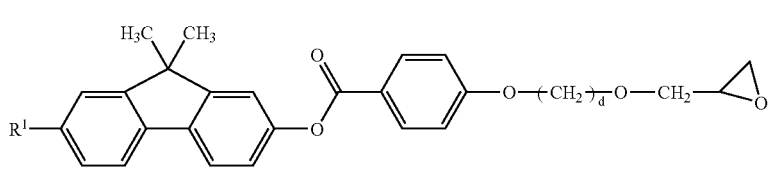

(1D)

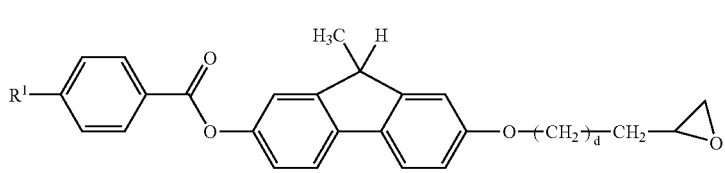

(1E)

-continued
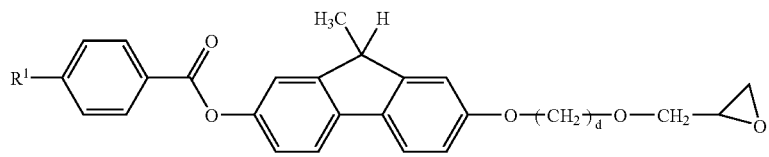
(1F)
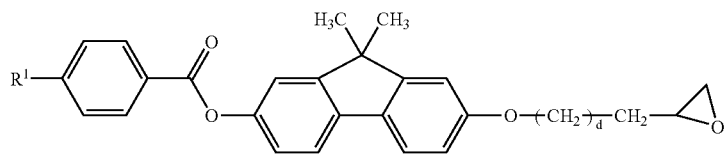
(1G)
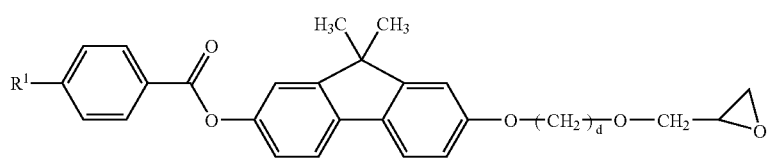
(1H)
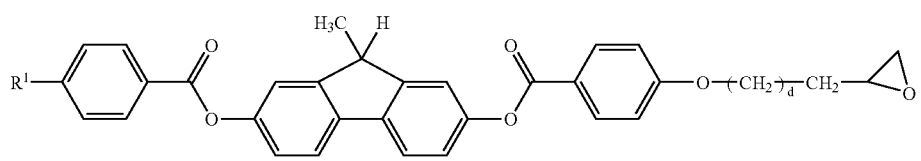
(1I)
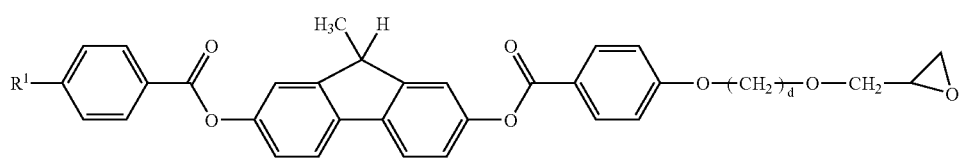
(1J)
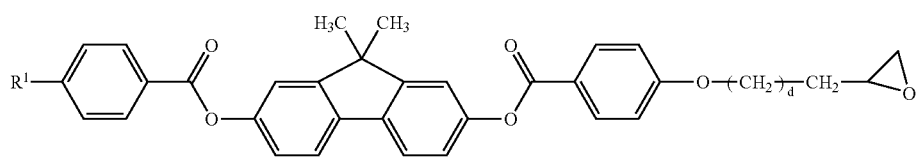
(1K)
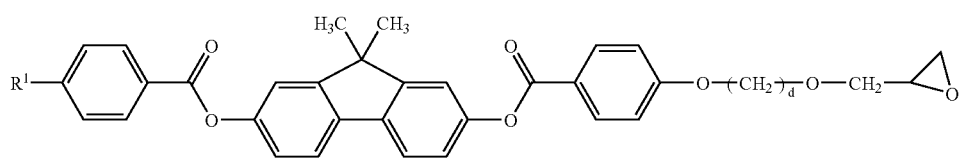
(1L)
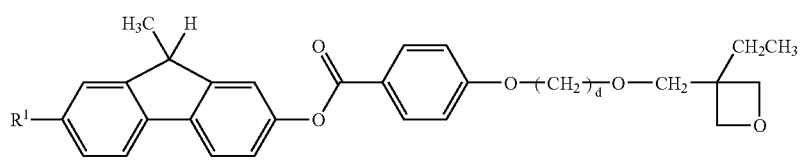
(2A)
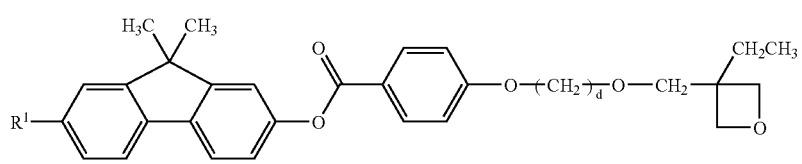
(2B)
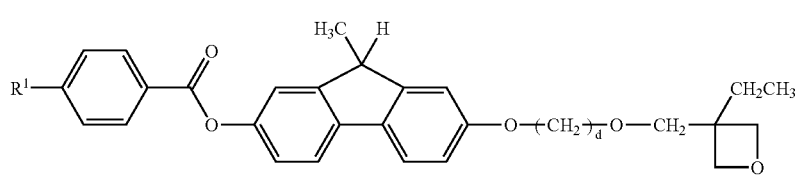
(2C)

-continued

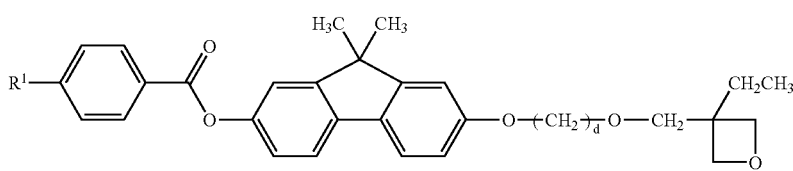
(2D)

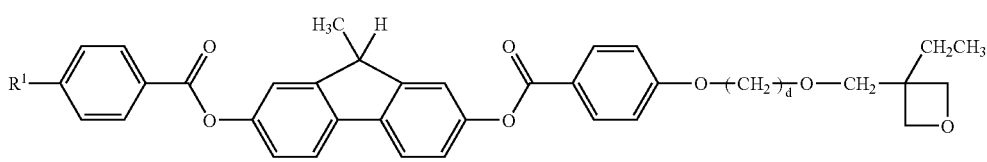
(2E)

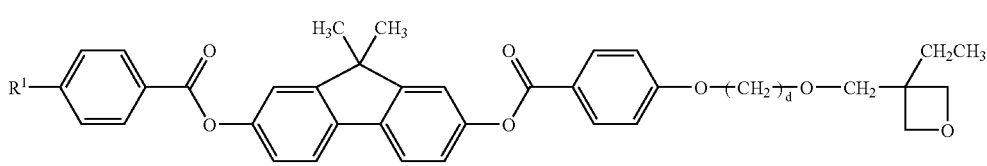
(2F)

wherein, R¹ is cyano, trifluoromethoxy, alkyl having 1 to 10 carbons, or alkoxy having 1 to 15 carbons, and wherein d is an integer of 2 to 10.

17. A composition comprising at least one compound according to claim 1 as a first component.

18. A composition comprising at least one compound according to claim 4 as a first component.

19. The composition of claim 18 further comprising at least one second component.

20. The composition according to claim 19, wherein the second component is at least one compound represented by formula (M1), formula (M2), formula (M3), formula (M4), formula (M5) and formula (M6):

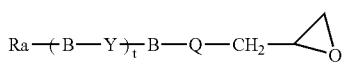
(M1)

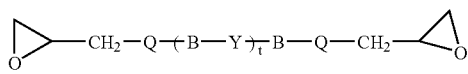
(M2)

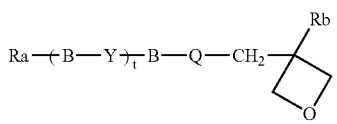
(M3)

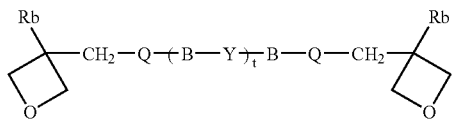
(M4)

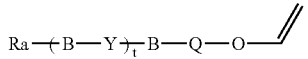
(M5)

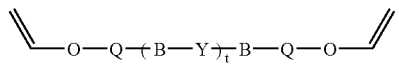
(M6)

wherein, Ra is hydrogen, fluorine, chlorine, cyano, trifluoromethoxy, alkyl having 1 to 20 carbons, alkoxy having 1 to 20 carbons, alkoxyalkyl having 2 to 20 carbons, alkenyl having 2 to 20 carbons, or alkenyloxy having 2 to 20 carbons; wherein Rb is hydrogen or alkyl having 1 to 5 carbons; wherein B is 1,4-cyclohexylene or 1,4-phenylene; wherein any hydrogen in the 1,4-phenylene may be replaced by fluorine, and wherein any one or two hydrogens in the 1,4-phenylene may be replaced by methyl or trifluoromethyl; wherein Y is a single bond, —COO—, —OCO—, —(CH$_2$)$_2$—, or —C≡C—; wherein Q is a single bond or alkylene having 1 to 20 carbons, and wherein one or two —CH$_2$— in the alkylene may be replaced by —O—; and wherein t is 1 or 2.

21. The composition according to claim 20, wherein Ra is fluorine, cyano, trifluoromethoxy, alkyl having 1 to 20 carbons, or alkoxy having 2 to 20 carbons; wherein Rb is hydrogen or alkyl having 1 to 2 carbons; wherein B is 1,4-cyclohexylene or 1,4-phenylene; wherein any hydrogen in the 1,4-phenylene may be replaced by fluorine, and wherein any one or two hydrogens in the 1,4-phenylene may be replaced by methyl or trifluoromethyl; Y is a single bond, —COO—, —OCO—, or —C≡C—; Q is a single bond or alkylene having 1 to 10 carbons, and wherein one or two —CH$_2$— in the alkylene may be replaced by —O—; and wherein t is 1 or 2.

22. The composition according to claim 21, wherein the second component is at least one compound selected from the group of the compounds represented by formulae (M1) and (M2) or at least one compound selected from the group of the compounds represented by formulae (M3) and (M4) or at least one compound selected from the group of the compounds represented by formulae (M5) and (M6).

23. The composition according to claim 21, wherein the second component is at least one compound represented by formula (M1) and at least one compound represented by formula (M3), or at least one compound represented by formula (M1) and at least one compound represented by formula (M4), or at least one compound represented by formula (M2) and at least one compound represented by formula (M3), or at least one compound represented by formula (M2) and at least one compound represented by formula (M4).

24. A polymer comprising at least one compound of claim 1.

25. A polymer comprising at least one compound of claim 18.

26. An element comprising the polymer according to claim 25.

27. The polymer according to claim 25, wherein it is used as a molded matter having an optical anisotropy.

* * * * *